(12) United States Patent
Kang et al.

(10) Patent No.: US 10,827,351 B2
(45) Date of Patent: Nov. 3, 2020

(54) NETWORK AUTHENTICATION METHOD, RELAY NODE, AND RELATED SYSTEM

(71) Applicant: Huawei Technologies Co., Ltd., Shenzhen, Guangdong (CN)

(72) Inventors: Xin Kang, Singapore (SG); Haiguang Wang, Singapore (SG); Yanjiang Yang, Singapore (SG)

(73) Assignee: Huawei Technologies Co., Ltd., Shenzhen (CN)

( * ) Notice: Subject to any disclaimer, the term of this patent is extended or adjusted under 35 U.S.C. 154(b) by 118 days.

(21) Appl. No.: 16/239,409

(22) Filed: Jan. 3, 2019

(65) Prior Publication Data
US 2019/0141533 A1 May 9, 2019

Related U.S. Application Data

(63) Continuation of application No. PCT/CN2017/074883, filed on Feb. 25, 2017.

(30) Foreign Application Priority Data

Jul. 4, 2016 (CN) .......................... 2016 1 0522433

(51) Int. Cl.
*H04L 9/32* (2006.01)
*H04W 12/06* (2009.01)
(Continued)

(52) U.S. Cl.
CPC ............... *H04W 12/06* (2013.01); *H04L 9/32* (2013.01); *H04L 29/06* (2013.01); *H04L 63/067* (2013.01);
(Continued)

(58) Field of Classification Search
CPC ........... H04W 12/06; H04W 12/04071; H04W 12/0013; H04W 8/04; H04W 12/0609;
(Continued)

(56) References Cited

U.S. PATENT DOCUMENTS

| 2005/0262353 A1 | 11/2005 | Gentry et al. |
| 2009/0109925 A1* | 4/2009 | Nakamura ........ H04W 36/0033 370/331 |

(Continued)

FOREIGN PATENT DOCUMENTS

CN        103039053 A      4/2013

OTHER PUBLICATIONS

Huawei et al., "Aggregate Authentication for massive IoT", 3GPP TSG SA WG3 (Security) Meeting #85, Sep. 27-29, 2016, San Diego, USA, 4 pages, S3-161371.

(Continued)

*Primary Examiner* — Trong H Nguyen
*Assistant Examiner* — Amie C. Lin
(74) *Attorney, Agent, or Firm* — Slater Matsil, LLP

(57) ABSTRACT

Embodiments of the present disclosure disclose a network authentication method, a relay node, and a related system. The system includes user equipment, a relay node, and a cellular network authentication network element. The user equipment is configured to send a first authentication message to the relay node; the relay node is configured to receive first authentication messages, and generate first encrypted information by using an aggregation algorithm based on first encrypted identifiers in the first authentication; the cellular network authentication network element is configured to receive a first aggregation message, and when verifying, by using the first encrypted information, that information in the first aggregation message is correct, send a first response message to the relay node; and the user equipment is configured to generate a session key between the user equipment and the cellular network authentication network element when verifying that information in the first response message is correct.

20 Claims, 37 Drawing Sheets

(51) Int. Cl.
*H04W 8/04* (2009.01)
*H04L 29/06* (2006.01)
*H04W 12/04* (2009.01)
*H04W 12/00* (2009.01)

(52) U.S. Cl.
CPC ............... *H04L 63/12* (2013.01); *H04W 8/04* (2013.01); *H04W 12/0013* (2019.01); *H04W 12/04071* (2019.01); *H04W 12/0609* (2019.01)

(58) Field of Classification Search
CPC .... H04W 84/047; H04L 29/06; H04L 63/067; H04L 63/12; H04L 9/32
See application file for complete search history.

(56) References Cited

U.S. PATENT DOCUMENTS

| | | | |
|---|---|---|---|
| 2011/0307694 A1 | 12/2011 | Broustis et al. | |
| 2012/0213366 A1 | 8/2012 | Brown et al. | |
| 2013/0163762 A1* | 6/2013 | Zhang | H04B 7/155 380/270 |
| 2014/0075509 A1 | 3/2014 | Holtmanns et al. | |
| 2015/0149767 A1 | 5/2015 | Oualha et al. | |
| 2015/0319172 A1 | 11/2015 | Zhang et al. | |
| 2016/0094542 A1* | 3/2016 | Lee | H04L 63/0853 726/7 |
| 2018/0184297 A1* | 6/2018 | Mohamed | H04W 12/06 |

OTHER PUBLICATIONS

"3rd Generation Partnership Project; Technical Specification Group Services and System Aspects; Feasibility Study on New Services and Markets Technology Enablers for Massive Internet of Things; Stage 1 (Release 14)", 3GPP TR 22.861 V14.0.0 (Jun. 2016), 28 pages.

"3rd Generation Partnership Project; Technical Specification Group Services and System Aspects; Study on the security aspects of the next generation system (Release 14)", 3GPP TR 33.899 V0.2.0 (May 2016), 75 pages.

Craig Gentry, Zulfikar Ramzan, "Identity-based Aggregate Signatures", In Proc. Public Key Cryptography—PKC 2006, LNCS 3958, pp. 257-273.

Ali Bagherzandi, Stanislaw Jarecki, "Identity-Based Aggregate and Multi-Signature Schemes based on RSA", Proc. Public Key Cryptography—PKC 2010, LNCS 6056, 19 pages.

Lai, Chengzhe et al, "LGTH: A Lightweight Group Authentication Protocol for Machine-Type Communication in LTE Networks", 2013 IEEE Global Communications Conference (GLOBECOM), Jun. 12, 2014, 6 pages.

Wang, Daxing et al., "Efficient Aggregate Signature Algorithm and Its Application in MANET", World Academy of Science, Engineering and Technology, International Journal of Mathematical and Computational Sciences, Nov. 11, 2013, 6 pages, vol. 7.

Cao, Jin et al., "A Group-based Authentication and Key Agreement for MTC in LTE Networks", 2012 IEEE Global Communications Conference (GLOBECOM), Apr. 23, 2013, 6 pages.

* cited by examiner

NETWORK AUTHENTICATION METHOD, RELAY NODE, AND RELATED SYSTEM

CROSS-REFERENCE TO RELATED APPLICATIONS

This application is a continuation of International Application No. PCT/CN2017/074883 filed on Feb. 25, 2017, which claims priority to a continuation of Chinese Application No. 201610522433.2 filed on Jul. 4, 2016. The disclosures of the aforementioned applications are hereby incorporated by reference in their entireties.

TECHNICAL FIELD

The present application relates to the field of computer technologies, and in particular, to a network authentication method, a relay node, and a related system.

BACKGROUND

The Internet of Things (IoT) is an important application scenario of a 5th-Generation (5G) mobile communications technology. User equipment on the IoT needs to perform network authentication when accessing a 5G network. FIG. 1 is a schematic diagram of interactions when user equipment performs network authentication in the prior art. The authentication process is as follows:

Step S101: User equipment (UE) sends a network access request to a mobility management entity (MME).

Step S102: The MME receives the network access request and sends a network access data request to a home subscriber server (HSS).

Step S103: The HSS receives the network access data request, determines a key K corresponding to the network access request, and then calculates an authentication vector based on the key K, where the authentication vector includes a network-side authentication token ( ) an expected response (XRES), and a key of an access security management entity ($K_{ASME}$).

Step S104: The HSS sends the authentication vector to the MME.

Step S105: The MME receives and stores the authentication vector.

Step S106: The MME initiates a user authentication request to the UE, where the user authentication request includes a random number RAND, the $AUTN_{HSS}$, and the $K_{ASME}$.

Step S107: The UE receives the RAND and the $AUTN_{HSS}$ and performs an operation by using the Authentication and Key Agreement Protocol (AKA) key derivation algorithm of a third generation mobile communications network of an evolved packet system (EPS), where input parameters for the operation include a root key K, a RAND, a serving network (SN) identifier, and a sequence number (English: Sequence Number, SQN for short), and output parameters for the operation include a user-side authentication token $AUTN_{UE}$, a response (English: Response, RES for short), and a $K_{ASME}$.

Step S108: The UE generates a session key between the UE and the network side when confirming that the $AUTN_{UE}$ is the same as the $AUTN_{HSS}$.

Step S109: The UE sends the RES obtained through the operation to the MME.

Step S110: The MME receives the RES, and generates a session key between the network side and the user equipment when confirming that the received RES is the same as the XRES in the authentication vector.

A disadvantage of the prior art lies in that, when performing network authentication, numerous user equipments on the IoT need to perform a large quantity of interactions with the network side to generate session keys, and therefore load of the network side is relatively heavy.

SUMMARY

Embodiments of the present disclosure disclose a network authentication method, a relay node, and a related system, to reduce overheads in a network authentication process and reduce load of a network side.

According to a first aspect, an embodiment of the present disclosure provides a network authentication system, where the system includes user equipment, a relay node, and a cellular network authentication network element, where the user equipment is configured to send a first authentication message to the relay node, where the first authentication message includes a first verification identifier and a first encrypted identifier, the first verification identifier is used to verify an identity of the cellular network authentication network element, and the first encrypted identifier is an encrypted sequence of information other than the first encrypted identifier in the first authentication message; it should be noted that, the first encrypted identifier includes an encrypted sequence of the first verification identifier, that is, information based on which the first encrypted identifier is generated includes at least the first verification identifier;

the relay node is configured to receive the first authentication messages sent by a plurality of user equipments, and generate first encrypted information by using an aggregation algorithm based on the first encrypted identifiers in the first authentication messages sent by the plurality of user equipments;

the relay node is further configured to send a first aggregation message to the cellular network authentication network element, where the first aggregation message includes the first encrypted information and the first verification identifiers in the first authentication messages sent by the plurality of user equipments;

the cellular network authentication network element is configured to receive the first aggregation message, and verify, by using the first encrypted information, whether information in the first aggregation message is correct;

the cellular network authentication network element is further configured to send a first response message to the relay node when verifying that the information in the first aggregation message is correct, where the first response message includes a second verification identifier, a second encrypted identifier, and the first verification identifiers in the first authentication messages sent by the plurality of user equipments, the second verification identifier is used to verify identities of the user equipments, and the second encrypted identifier is an encrypted sequence of information other than the second verification identifier in the first response message;

the relay node is configured to receive the first response message, and relay the first response message to the plurality of user equipments;

the user equipment is further configured to receive the first response message relayed by the relay node, verify, by using the second encrypted identifier, whether the information in the first response message is correct, and verify whether the first response message carries the first verification identifier of the user equipment; and the user equipment is further configured to generate a session key between the user equipment and the cellular network authentication network element when verifying that the information in the first response message is correct and carries the first verification identifier of the user equipment.

By running the network authentication system, the user equipment sends the first authentication message required for network authentication to the relay node first; the relay node performs an aggregation operation on the signatures or the message authentication codes in the first authentication messages sent by the plurality of user equipments, to obtain the aggregated signature or the aggregated authentication code; and the relay node sends, to the cellular network authentication network element in a unified manner, the information in the first authentication messages sent by the plurality of user equipments other than the signatures and the authentication codes. For the messages sent in the unified manner, message correctness is ensured based on the aggregated signature and the aggregated authentication code. Correspondingly, the cellular network synchronously authenticates the plurality of user equipments based on the received information. Therefore, data overheads in the authentication process are reduced.

With reference to the first aspect, in a first possible implementation of the first aspect, the user equipment is further configured to send a second authentication message to the relay node when verifying that the information in the first response message is correct and carries the first verification identifier of the user equipment, where the second authentication message includes the second verification identifier and a third encrypted identifier, and the third encrypted identifier is an encrypted sequence of information other than the third encrypted identifier in the second authentication message;

the relay node is configured to receive the second authentication messages sent by the plurality of user equipments, and generate third encrypted information by using the aggregation algorithm based on the third encrypted identifiers in the second authentication messages sent by the plurality of user equipments;

the relay node is further configured to send a second aggregation message to the cellular network authentication network element, where the second aggregation message includes the third encrypted information and the second verification identifier that is carried in the second authentication message;

the cellular network authentication network element is further configured to receive the second aggregation message, verify, by using the third encrypted information, whether information in the second aggregation message is correct, and verify whether the second aggregation message carries the second verification identifier of the cellular network authentication network element; and the cellular network authentication network element is further configured to generate a session key between the cellular network authentication network element and each user equipment in the plurality of user equipments when verifying that the information in the second aggregation message is correct and carries the second verification identifier of the cellular network authentication network element.

With reference to the first possible implementation of the first aspect, in a second possible implementation of the first aspect, the first response message includes a first identity of the cellular network authentication network element, and the second verification identifier in the second authentication message is encrypted by using the first identity of the cellular network authentication network element.

With reference to the first possible implementation of the first aspect, in a third possible implementation of the first aspect, the cellular network authentication network element is further configured to generate a symmetric key between the cellular network authentication network element and the user equipment, and the second verification identifier in the second authentication message is encrypted by using the symmetric key between the cellular network authentication network element and the user equipment.

With reference to the first aspect, or the first possible implementation of the first aspect, or the second possible implementation of the first aspect, or the third possible implementation of the first aspect, in a fourth possible implementation of the first aspect, the first verification identifier is a DH public key of the user equipment, and the first encrypted identifier is a signature affixed to the information other than the first encrypted identifier in the first authentication message by using a private key of the user equipment; and that the user equipment generates a session key between the user equipment and the cellular network authentication network element is specifically:

the user equipment generates the session key between the user equipment and the cellular network authentication network element based on a random number of the user equipment and the second verification identifier in the first response message.

With reference to the fourth possible implementation of the first aspect, in a fifth possible implementation of the first aspect, the second verification identifier is a DH public key of the cellular network authentication network element, and the second encrypted identifier is a signature affixed to the information other than the second encrypted identifier in the first response message by using a private key of the cellular network authentication network element.

With reference to the first aspect, or the first possible implementation of the first aspect, or the second possible implementation of the first aspect, or the third possible implementation of the first aspect, in a sixth possible implementation of the first aspect, the first verification identifier is a fresh parameter nonce of the user equipment, and the first encrypted identifier is a signature affixed to the information other than the first encrypted identifier in the first authentication message by using a private key of the user equipment; and that the user equipment generates a session key between the user equipment and the cellular network authentication network element is specifically:

the user equipment generates the session key between the user equipment and the cellular network authentication network element based on the private key of the user equipment and the second verification identifier in the first response message.

With reference to the sixth possible implementation of the first aspect, in a seventh possible implementation of the first aspect, the second verification identifier is a fresh parameter nonce of the cellular network authentication network element, and the second encrypted identifier is a signature affixed to the information other than the second encrypted identifier in the first response message by using a private key of the cellular network authentication network element.

With reference to the first aspect, or the first possible implementation of the first aspect, or the second possible implementation of the first aspect, or the third possible implementation of the first aspect, in an eighth possible implementation of the first aspect, the first verification identifier is a fresh parameter nonce of the user equipment, the first aggregation message includes a second identity of each user equipment in the plurality of user equipments, the first authentication message includes the first identity of the cellular network authentication network element, and that the relay node is further configured to send a first aggregation message to the cellular network authentication network element is specifically:

the relay node is configured to send, based on the first identity, the first aggregation message to the cellular network authentication network element corresponding to the first identity;

the first verification identifier in the first authentication message is encrypted by using the first identity of the cellular network authentication network element, and the cellular network authentication network element is further configured to decrypt the first verification identifier in the first authentication message by using the first identity of the cellular network authentication network element;

the first verification identifier in the first response message is encrypted by using the second identity of the user equipment, and the user equipment is further configured to decrypt the first verification identifier in the first response message by using the second identity of the user equipment;

the first encrypted identifier is a signature affixed to the information other than the first encrypted identifier in the first authentication message by using a private key of the user equipment; and that the user equipment generates a session key between the user equipment and the cellular network authentication network element is specifically:

the user equipment generates the session key between the user equipment and the cellular network authentication network element based on the private key of the user equipment, the first verification identifier of the user equipment, the second verification identifier in the first response message, and the first identity.

With reference to the eighth possible implementation of the first aspect, in a ninth possible implementation of the first aspect, the second verification identifier is the nonce of the cellular network authentication network element, and the second encrypted identifier is a signature affixed to the information other than the second encrypted identifier in the first response message by using a private key of the cellular network authentication network element.

With reference to the first aspect, or the first possible implementation of the first aspect, or the second possible implementation of the first aspect, or the third possible implementation of the first aspect, in a tenth possible implementation of the first aspect, the first verification identifier is a nonce of the user equipment, the first authentication message includes the first identity of the cellular network authentication network element, and that the relay node is further configured to send a first aggregation message to the cellular network authentication network element is specifically:

the relay node is configured to send, based on the first identity, the first aggregation message to the cellular network authentication network element corresponding to the first identity;

the first verification identifier in the first authentication message is encrypted by using a prestored symmetric key between the user equipment and the cellular network authentication network element, and the cellular network authentication network element is configured to decrypt the first verification identifier by using the prestored symmetric key between the user equipment and the cellular network authentication network element;

the first verification identifier in the first response message is encrypted by using the prestored symmetric key between the user equipment and the cellular network authentication network element, and the user equipment is configured to decrypt the first verification identifier by using the prestored symmetric key between the user equipment and the cellular network authentication network element;

the first encrypted identifier is a signature affixed to the information other than the first encrypted identifier in the first authentication message by using a private key of the user equipment; and that the user equipment generates a session key between the user equipment and the cellular network authentication network element is specifically:

the user equipment generates the session key between the user equipment and the cellular network authentication network element based on the private key of the user equipment, the first verification identifier of the user equipment, the second verification identifier in the first response message, and the first identity.

With reference to the tenth possible implementation of the first aspect, in an eleventh possible implementation of the first aspect, the second verification identifier is the nonce of the cellular network authentication network element, and the second encrypted identifier is a signature affixed to the information other than the second encrypted identifier in the first response message by using a private key of the cellular network authentication network element.

With reference to the first aspect, or the first possible implementation of the first aspect, or the second possible implementation of the first aspect, or the third possible implementation of the first aspect, in a twelfth possible implementation of the first aspect, the first verification identifier is a fresh parameter nonce of the user equipment, the first authentication message includes the first identity of the cellular network authentication network element, and that the relay node is further configured to send a first aggregation message to the cellular network authentication network element is specifically:

the relay node is configured to send, based on the first identity, the first aggregation message to the cellular network authentication network element corresponding to the first identity;

the first verification identifier in the first authentication message is encrypted by using a prestored symmetric key between the user equipment and the cellular network authentication network element, and the cellular network authentication network element is configured to decrypt the first verification identifier by using the prestored symmetric key between the user equipment and the cellular network authentication network element;

the first verification identifier in the first response message is encrypted by using the prestored symmetric key between the user equipment and the cellular network authentication network element, and the user equipment is configured to decrypt the first verification identifier by using the prestored symmetric key between the user equipment and the cellular network authentication network element;

the first encrypted identifier is a message authentication code MAC of the first authentication message; and that the user equipment generates a session key between the user equipment and the cellular network authentication network element is specifically:

the user equipment generates the session key between the user equipment and the cellular network authentication network element based on a private key of the user equipment, the first verification identifier, the second verification identifier in the first response message, and the first identity.

With reference to the twelfth possible implementation of the first aspect, in a thirteenth possible implementation of the first aspect, the second verification identifier is the nonce of the cellular network authentication network element, and the second encrypted identifier is a signature affixed to the information other than the second encrypted identifier in the first response message by using a private key of the cellular network authentication network element.

With reference to the first aspect, or the first possible implementation of the first aspect, or the second possible implementation of the first aspect, or the third possible implementation of the first aspect, or the fourth possible implementation of the first aspect, or the fifth possible implementation of the first aspect, or the sixth possible implementation of the first aspect, or the seventh possible implementation of the first aspect, or the eighth possible implementation of the first aspect, or the ninth possible implementation of the first aspect, or the tenth possible implementation of the first aspect, or the eleventh possible implementation of the first aspect, or the twelfth possible implementation of the first aspect, or the thirteenth possible implementation of the first aspect, in a fourteenth possible implementation of the first aspect, the first authentication message includes an aggregation indicator used to represent whether to perform an aggregation operation based on the first encrypted identifier, and the relay node is further configured to determine, based on the aggregation indicator, whether the aggregation operation needs to be performed on the first encrypted identifier; and if the aggregation operation needs to be performed, the relay node is configured to perform the operation of generating the first encrypted information by using the aggregation algorithm based on the first encrypted identifiers in the first authentication messages sent by the plurality of user equipments; or if the aggregation operation does not need to be performed, the relay node is further configured to relay the first authentication message to the cellular network authentication network element;

the cellular network authentication network element is further configured to receive the first authentication message, and verify, by using the first encrypted identifier, whether the information in the first authentication message is correct;

the cellular network authentication network element is further configured to send a second response message to the relay node when verifying that the information in the first authentication message is correct, where the second response message includes a fourth encrypted identifier, the second verification identifier, and the first verification identifier of the user equipment, and the fourth encrypted identifier is an encrypted sequence of information other than the fourth encrypted identifier in the second response message;

the relay node is further configured to receive the second response message, and relay the second response message to the user equipment;

the user equipment is further configured to receive the second response message relayed by the relay node, verify, by using the fourth encrypted identifier, whether the information in the second response message is correct, and verify whether the second response message carries the first verification identifier of the user equipment; and the user equipment is further configured to generate the session key between the user equipment and the cellular network authentication network element when verifying that the information in the second response message is correct and carries the first verification identifier of the user equipment.

With reference to the fourteenth possible implementation of the first aspect, in a fifteenth possible implementation of the first aspect, the user equipment is further configured to send the second authentication message to the relay node when verifying that the information in the second response message is correct and carries the first verification identifier of the user equipment;

the relay node is further configured to receive the second authentication message, and relay the second authentication message to the cellular network authentication network element;

the cellular network authentication network element is further configured to receive the second authentication message, verify, by using the third encrypted identifier, whether the information in the second authentication message is correct, and verify whether the second authentication message carries the second verification identifier of the cellular network authentication network element; and the cellular network authentication network element is further configured to generate a session key between the cellular network authentication network element and the user equipment when verifying that the information in the second authentication message is correct and carries the second verification identifier of the cellular network authentication network element.

With reference to the first possible implementation of the first aspect, or the second possible implementation of the first aspect, or the third possible implementation of the first aspect, in a sixteenth possible implementation of the first aspect, the cellular network authentication network element is further configured to send a verification failure message to the relay node when verifying that the information in the first aggregation message is incorrect;

the relay node is further configured to receive the verification failure message, and separately relay, to the cellular authentication network element based on the verification failure message, the first authentication messages sent by the plurality of user equipments; and the cellular network authentication network element is further configured to separately verify each user equipment in the plurality of user equipments based on the first authentication messages.

With reference to the first possible implementation of the first aspect, or the second possible implementation of the first aspect, or the third possible implementation of the first aspect, in a seventeenth possible implementation of the first aspect, the cellular network authentication network element is further configured to send a verification failure message to the relay node when verifying that the information in the first aggregation message is incorrect;

the relay node is further configured to receive the verification failure message, and generate fourth encrypted information by using the aggregation algorithm based on the verification failure message and based on the third encrypted identifiers in a part of the first authentication messages sent by the plurality of user equipments;

the relay node is further configured to send a third aggregation message to the cellular network authentication network element, where the third aggregation message includes the fourth encrypted information and the first verification identifiers in the part of the first authentication messages; and the cellular network authentication network element is further configured to receive the third aggregation message, and verify, by using the fourth encrypted information, whether information in the third aggregation message is correct.

According to a second aspect, an embodiment of the present disclosure provides a relay node, where the relay node includes:

a first receiving unit, configured to receive a first authentication message sent by each user equipment in a plurality of user equipments, where the first authentication message sent by each user equipment includes a first verification identifier of the user equipment and a first encrypted identifier, the first verification identifier is used by a cellular network authentication network element to verify an identity of the user equipment, and the first encrypted identifier is an encrypted sequence of information other than the first encrypted identifier in the first authentication message;

a first aggregation unit, configured to generate first encrypted information by using an aggregation algorithm based on the first encrypted identifiers in the first authentication messages sent by the plurality of user equipments;

a first sending unit, configured to send a first aggregation message to the cellular network authentication network element, where the first aggregation message includes the first encrypted information and the first verification identifiers in the first authentication messages sent by the plurality of user equipments;

a second receiving unit, configured to receive a first response message sent by the cellular network authentication network element, where the first response message is generated by the cellular network authentication network element after the cellular network authentication network element verifies, based on the first encrypted message, that information in the first aggregation message is correct, the first response message includes a second verification identifier of the cellular network authentication network element, a second encrypted identifier, and the first verification identifiers in the first authentication messages sent by the plurality of user equipments, and the second encrypted identifier is an encrypted sequence of information other than the second verification identifier in the first response message; and a second sending unit, configured to relay the first response message to the user equipment, where the first verification identifier in the first response message is used by the user equipment to verify whether an identity of the cellular network authentication network element is secure, and the user equipment relays the second verification identifier in the first response message to the cellular network authentication network element, so that the cellular network authentication network element verifies whether an identity of the user equipment is secure.

By running the foregoing units, the user equipment sends the first authentication message required for network authentication to the relay node first; the relay node performs an aggregation budget on the signatures or the message authentication codes in the first authentication messages sent by the plurality of user equipments, to obtain the aggregated signature or the aggregated authentication code; and the relay node sends, to the cellular network authentication network element in a unified manner, the information in the first authentication messages sent by the plurality of users other than the signatures and the authentication codes. For the messages sent in the unified manner, message correctness is ensured based on the aggregated signature and the aggregated authentication code. Correspondingly, the cellular network synchronously authenticates the plurality of user equipments based on the received information. Therefore, data overheads in the authentication process are reduced.

With reference to the second aspect, in a first possible implementation of the second aspect, the relay node further includes:

a third receiving unit, configured to receive second authentication messages sent by the plurality of user equipments, where the second authentication message is generated by the user equipment after the user equipment determines that the first response message includes the first verification identifier of the user equipment and verifies, based on the second encrypted identifier, that the information in the first response message is correct, the second authentication message includes the second verification identifier and a third encrypted identifier, and the third encrypted identifier is an encrypted sequence of information other than the third encrypted identifier in the second authentication message;

a second aggregation unit, configured to generate third encrypted information by using the aggregation algorithm based on the third encrypted identifiers in the second authentication messages sent by the plurality of user equipments; and a third sending unit, configured to send a second aggregation message to the cellular network authentication network element, where the second aggregation message includes the third encrypted information and the second verification identifier that is carried in the second authentication message, and the second verification identifier in the second aggregation message is used by the cellular network authentication network element to verify whether identities of the plurality of user equipments are secure.

With reference to the first possible implementation of the second aspect, in a second possible implementation of the second aspect, the first response message includes a first identity of the cellular network authentication network element, and the second verification identifier in the second authentication message is encrypted by using the first identity of the cellular network authentication network element.

According to a third aspect, an embodiment of the present disclosure provides a network authentication method, where the method includes:

receiving, by a relay node, a first authentication message sent by each user equipment in a plurality of user equipments, where the first authentication message sent by each user equipment includes a first verification identifier of the user equipment and a first encrypted identifier, the first verification identifier is used by a cellular network authentication network element to verify an identity of the user equipment, and the first encrypted identifier is an encrypted sequence of information other than the first encrypted identifier in the first authentication message;

generating, by the relay node, first encrypted information by using an aggregation algorithm based on the first encrypted identifiers in the first authentication messages sent by the plurality of user equipments;

sending, by the relay node, a first aggregation message to the cellular network authentication network element, where the first aggregation message includes the first encrypted information and the first verification identifiers in the first authentication messages sent by the plurality of user equipments;

receiving, by the relay node, a first response message sent by the cellular network authentication network element, where the first response message is generated by the cellular network authentication network element after the cellular network authentication network element verifies, based on the first encrypted message, that information in the first aggregation message is correct, the first response message includes a second verification identifier of the cellular network authentication network element, a second encrypted identifier, and the first verification identifiers in the first authentication messages sent by the plurality of user equipments, and the second encrypted identifier is an encrypted sequence of information other than the second verification identifier in the first response message; and relaying, by the relay node, the first response message to the user equipment, where the first verification identifier in the first response message is used by the user equipment to verify whether an identity of the cellular network authentication network element is secure, and the user equipment relays the second verification identifier in the first response message to the cellular network authentication network element, so that the cellular network authentication network element verifies whether an identity of the user equipment is secure.

By performing the foregoing steps, the user equipment sends the first authentication message required for network authentication to the relay node first; the relay node performs an aggregation budget on the signatures or the message authentication codes in the first authentication messages sent by the plurality of user equipments, to obtain the aggregated signature or the aggregated authentication code; and the relay node sends, to the cellular network authentication network element in a unified manner, the information in the first authentication messages sent by the plurality of users other than the signatures and the authentication codes. For the messages sent in the unified manner, message correctness is ensured based on the aggregated signature and the aggregated authentication code. Correspondingly, the cellular network synchronously authenticates the plurality of user equipments based on the received information. Therefore, data overheads in the authentication process are reduced.

With reference to the third aspect, in a first possible implementation of the third aspect, after the relaying, by the relay node, the first response message to the user equipment, the method further includes:

receiving, by the relay node, second authentication messages sent by the plurality of user equipments, where the second authentication message is generated by the user equipment after the user equipment determines that the first response message includes the first verification identifier of the user equipment and verifies, based on the second encrypted identifier, that the information in the first response message is correct, the second authentication message includes the second verification identifier and a third encrypted identifier, and the third encrypted identifier is an encrypted sequence of information other than the third encrypted identifier in the second authentication message;

generating, by the relay node, third encrypted information by using the aggregation algorithm based on the third encrypted identifiers in the second authentication messages sent by the plurality of user equipments; and sending, by the relay node, a second aggregation message to the cellular network authentication network element, where the second aggregation message includes the third encrypted information and the second verification identifier that is carried in the second authentication message, and the second verification identifier in the second aggregation message is used by the cellular network authentication network element to verify whether identities of the plurality of user equipments are secure.

With reference to the first possible implementation of the third aspect, in a second possible implementation of the third aspect, the first response message includes a first identity of the cellular network authentication network element, and the second verification identifier in the second authentication message is encrypted by using the first identity of the cellular network authentication network element.

With reference to the first possible implementation of the third aspect, in a third possible implementation of the third aspect, the second verification identifier in the second authentication message is encrypted by using a symmetric key between the cellular network authentication network element and the user equipment.

According to a fourth aspect, an embodiment of the present disclosure provides another relay node, where the relay node includes a processor, a memory, and a transceiver; the memory is configured to store a program and data; by invoking the program in the memory, the processor may control the transceiver to receive and send data; and the processor invokes the program in the memory to perform the network authentication method in the third aspect.

According to a fifth aspect, an embodiment of the present disclosure provides a computer readable storage medium, where the computer readable storage medium is configured to store an instruction; and when the instruction runs on a computer, the computer performs the method described in the third aspect or any one of the possible implementations of the third aspect.

By implementing the embodiments of the present disclosure, the user equipment sends the first authentication message required for network authentication to the relay node first; the relay node performs an aggregation budget on the signatures or the message authentication codes in the first authentication messages sent by the plurality of user equipments, to obtain the aggregated signature or the aggregated authentication code; and the relay node sends, to the cellular network authentication network element in a unified manner, the information in the first authentication messages sent by the plurality of users other than the signatures and the authentication codes. For the messages sent in the unified manner, message correctness is ensured based on the aggregated signature and the aggregated authentication code. Correspondingly, the cellular network synchronously authenticates the plurality of user equipments based on the received information. Therefore, data overheads in the authentication process are reduced.

BRIEF DESCRIPTION OF THE DRAWINGS

The following briefly describes the accompanying drawings required for the background or embodiments.

FIG. 3A-1 and FIG. 3A-2 are a schematic flowchart of a network authentication method according to an embodiment of the present disclosure;

FIG. 3B-1 and FIG. 3B-2 are a schematic flowchart of another network authentication method according to an embodiment of the present disclosure;

FIG. 3C-1 and FIG. 3C-2 are a schematic flowchart of another network authentication method according to an embodiment of the present disclosure;

FIG. 3D-1 and FIG. 3D-2 are a schematic flowchart of another network authentication method according to an embodiment of the present disclosure;

FIG. 3E-1 and FIG. 3E-2 are a schematic flowchart of another network authentication method according to an embodiment of the present disclosure;

FIG. 3F-1 and FIG. 3F-2 are a schematic flowchart of another network authentication method according to an embodiment of the present disclosure;

FIG. 3G-1 and FIG. 3G-2 are a schematic flowchart of another network authentication method according to an embodiment of the present disclosure;

FIG. 3H-1 and FIG. 3H-2 are a schematic flowchart of another network authentication method according to an embodiment of the present disclosure;

FIG. 3I-1 and FIG. 3I-2 are a schematic flowchart of another network authentication method according to an embodiment of the present disclosure;

FIG. 3J-1 and FIG. 3J-2 are a schematic flowchart of another network authentication method according to an embodiment of the present disclosure;

FIG. 3K-1 and FIG. 3K-2 are a schematic flowchart of another network authentication method according to an embodiment of the present disclosure;

FIG. 3L-1 and FIG. 3L-2 are a schematic flowchart of another network authentication method according to an embodiment of the present disclosure;

FIG. 3M-1 and FIG. 3M-2 are a schematic flowchart of another network authentication method according to an embodiment of the present disclosure;

FIG. 3N-1 and FIG. 3N-2 are a schematic flowchart of another network authentication method according to an embodiment of the present disclosure;

FIG. 3O-1 and FIG. 3O-2 are a schematic flowchart of another network authentication method according to an embodiment of the present disclosure;

FIG. 3P-1 and FIG. 3P-2 are a schematic flowchart of another network authentication method according to an embodiment of the present disclosure;

DETAILED DESCRIPTION

The following describes the technical solutions in the embodiments of the present disclosure with reference to the accompanying drawings in the embodiments of the present disclosure.

Figure 2:
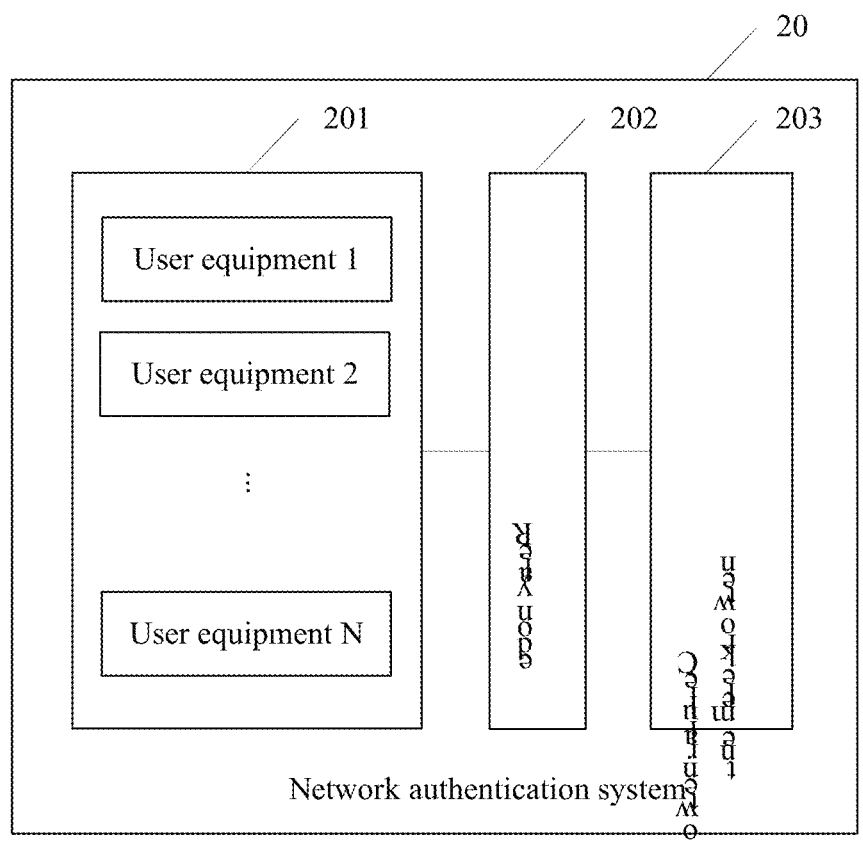
FIG. 2 is a schematic architectural diagram of a network authentication system according to an embodiment of the present disclosure.

FIG. 2 is a schematic architectural diagram of a network authentication system 20 according to an embodiment of the present disclosure. The network authentication system 20 includes user equipment 201, a relay node 202, and a cellular network authentication network element 203. The user equipment 201 may be a terminal device that can access the IoT, for example, a computer, a mobile phone, a printer, a refrigerator, or a robot. The relay node 202 may be a node that can relay information between the user equipment 201 and the cellular network authentication network element 203, for example, relay user equipment (relay UE) or an aggregation node. The cellular network authentication network element 203 may be a device that manages a network authentication procedure, for example, an MME.

The user equipment 201 can access a cellular network only after network authentication initiated by the user equipment 201 to the cellular network authentication network element 203 succeeds. In an IoT scenario, numerous user equipments 201 exist, and a large quantity of data interactions are performed when the numerous user equipments 101 perform network authentication with the cellular network authentication network element 203. To reduce the quantity of data interactions and reduce a total amount of data exchanged in this embodiment of the present disclosure, the relay node 202 is specially introduced. The relay node 202 may aggregate signatures in network authentication messages respectively sent by a plurality of user equipments 201, and then uniformly send information in the network authentication messages other than the signatures, together with an aggregated signature to the cellular network authentication network element 203 for network authentication.

Figure 1:
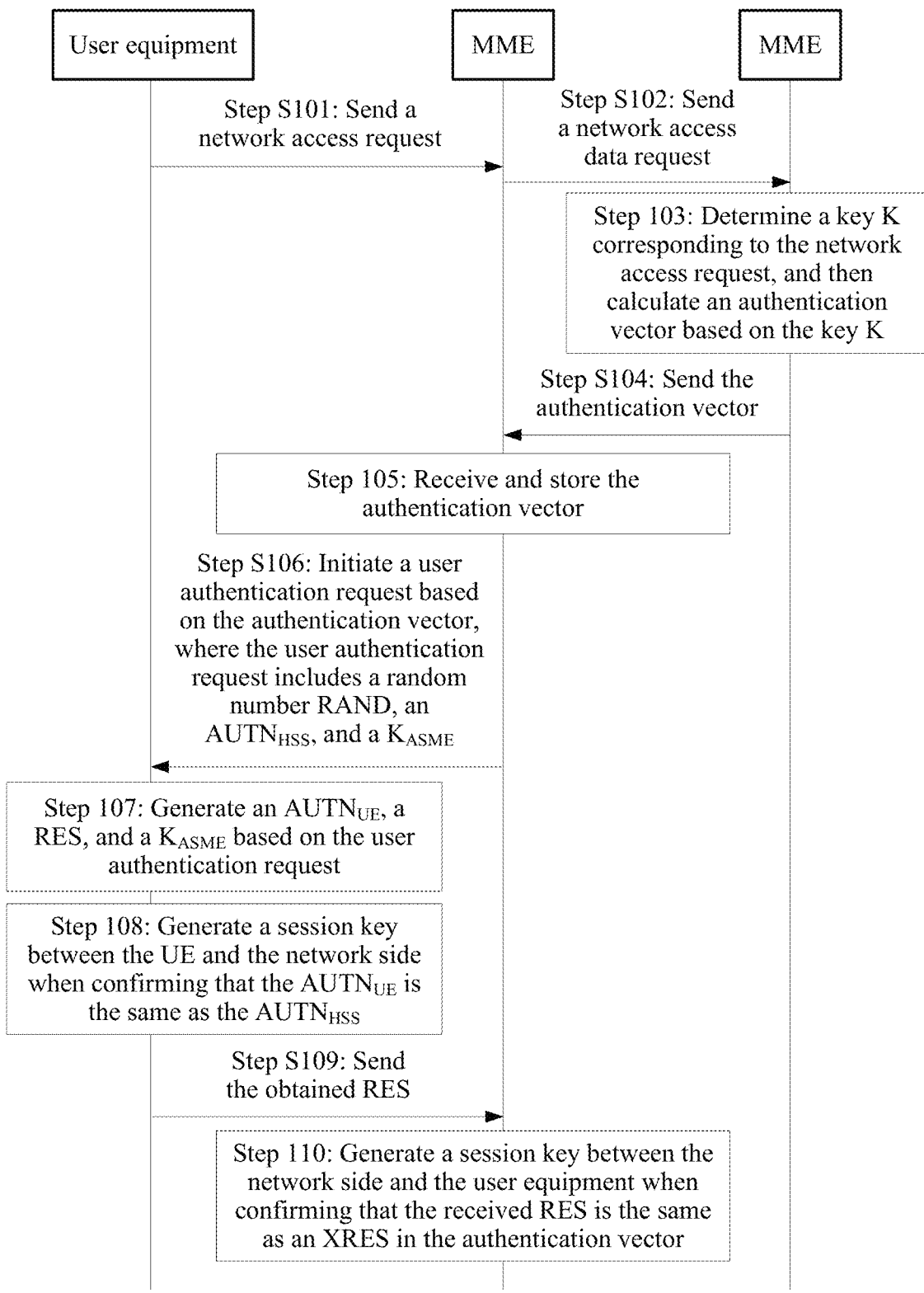
FIG. 1 is a schematic flowchart of a network authentication method in the prior art.
Figures 1, 3A:
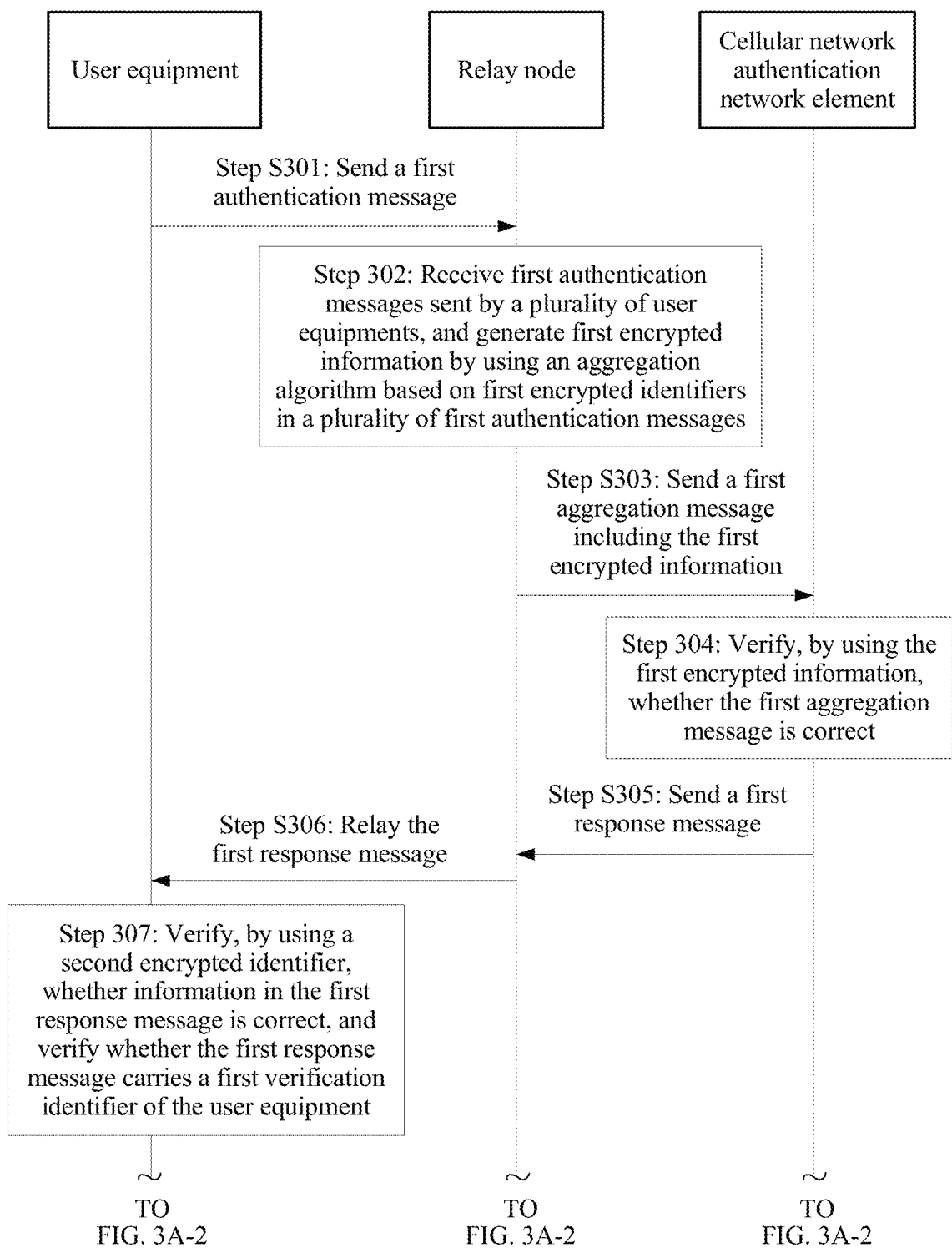
Figures 2, 3A:
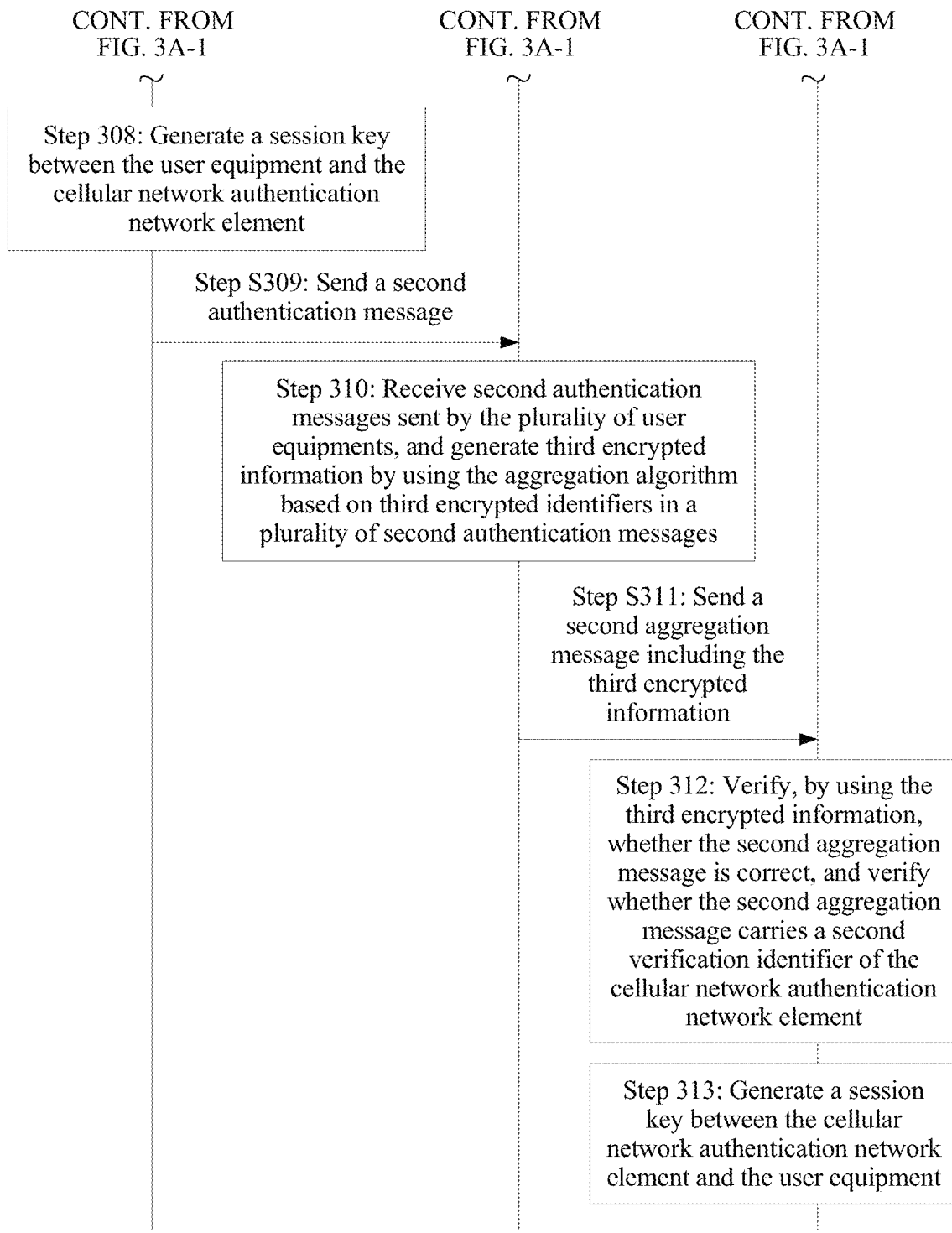

A method embodiment shown in FIG. 3A-1 and FIG. 3A-2 may be implemented based on the network authentication system 20. For ease of description, the user equipment 201, the relay node 202, and the cellular network authentication network element 203 are no longer numbered subsequently. The method embodiment shown in FIG. 3A-1 and FIG. 3A-2 includes but is not limited to the following steps.

Step S301: User equipment sends a first authentication message to the relay node.

Specifically, the first authentication message includes an identity of the user equipment, a first verification identifier, and a first encrypted identifier. To distinguish from an identity of a cellular network authentication network element subsequently described, the identity of the user equipment may be referred to as a second identity, and the identity of the cellular network authentication network element is referred to as a first identity. For example, a second identity of user equipment UE 1 is 8888, a second identity of user equipment UE 2 is 9999, and the first identity of the cellular network authentication network element is 7777. Both the second identity and the first identity may be information that can be used to distinguish from another terminal device in a range, for example, an international mobile equipment identity (IMEI), a Media Access Control (MAC) address, or an Internet Protocol (IP) address. The second identity is used to represent which user equipment sends the first authentication message.

The first verification identifier may be a DH public key of the user equipment, a fresh parameter nonce, or the like. The DH public key may be a parameter in a Diffie-Hellman key exchange algorithm. The first verification identifier is sent by the user equipment to the cellular network authentication network element by using the relay node, and then the cellular network authentication network element feeds back, by using the relay node, the first verification identifier to the user equipment. If the first verification identifier sent by the user equipment matches the finally received first verification identifier, the user equipment verifies that the identity of the cellular network authentication network element is secure.

The first encrypted identifier may be a signature affixed to the first authentication message by using a private key of the user equipment, or may be a message authentication code (MAC) generated when a symmetric key between the user equipment and the cellular network authentication network element is used for the first authentication message, where the message authentication code MAC may be generated specifically based on a hash-based message authentication code (HMAC). As in the prior art, the signature and the message authentication code MAC are used to verify correctness of information. It should be noted that, the signature may be a signature affixed to all or a part of information other than the signature in the first authentication message. The user equipment generating the first authentication message and the cellular network authentication network element that finally needs to obtain (or may indirectly obtain) the information in the first authentication message have predefined, by using a protocol, a specific part of information to which a signature is affixed. In a word, the first encrypted identifier includes an encrypted sequence of the first verification identifier, that is, information based on which the first encrypted identifier is generated includes at least the first verification identifier.

Step S302: The relay node receives the first authentication messages sent by a plurality of user equipments, and generates first encrypted information by using an aggregation algorithm based on the first encrypted identifiers in the first authentication messages sent by the plurality of user equipments.

Specifically, a plurality of user equipments may send the first authentication messages to the relay node. For ease of subsequent description, it may be assumed that N user equipments send the first authentication messages to the relay node. A plurality of user equipments subsequently described may be specifically the N user equipments, where N is a positive integer greater than or equal to 1. Each user equipment subsequently described is each of the N user equipments.

When receiving the first authentication messages sent by the plurality of user equipments, the relay node obtains the first encrypted information through calculation by using the preset aggregation algorithm based on the first encrypted identifiers in the plurality of first authentication messages sent by the plurality of user equipments. Optionally, when the first encrypted identifiers are the signatures, the first encrypted information obtained through calculation by using the preset algorithm is an aggregated signature. Optionally, when the first encrypted identifiers are the message authentication codes MACs, the first encrypted information obtained through calculation by using the preset algorithm is an aggregated authentication code.

Step S303: The relay node sends a first aggregation message to the cellular network authentication network element.

Specifically, the first aggregation message includes the first encrypted information, the plurality of second identities in the first authentication messages sent by the plurality of user equipments, and the plurality of first verification identifiers in the first authentication messages sent by the plurality of user equipments. In other words, the first aggregation message reserves the first verification identifiers and the second identities in the received plurality of first authentication messages, and the first encrypted information obtained by using the aggregation algorithm based on the first encrypted identifiers in the plurality of first authentication messages. It may be understood that, if the first password identifiers are signatures affixed to the second identities and the first verification identifiers, the first encrypted message may be understood as a signature affixed to the second identities and the first verification identifiers in the plurality of first authentication messages. Optionally, a data length of the first password information is the same as data lengths of the first password identifiers.

Step S304: The cellular network authentication network element is configured to receive the first aggregation message, and verify, by using the first encrypted information, whether information in the first aggregation message is correct.

Specifically, verifying correctness of a message by using a signature or a message authentication code falls within the prior art, and is not described herein.

Step S305: The cellular network authentication network element is further configured to send a first response message to the relay node when verifying that the information in the first aggregation message is correct.

Specifically, the first response message includes the first identity of the cellular network authentication network element, a second verification identifier, a second encrypted identifier, and the plurality of first verification identifiers; the first identity is used to represent that the first response message is from the cellular network authentication network element; the plurality of first verification identifiers are specifically the first verification identifiers included in the first aggregation message received by the cellular network authentication network element. This is equivalent to feeding back the received first verification identifiers again by the cellular network authentication network element.

The second verification identifier may be a DH public key of the cellular network authentication network element, a fresh parameter nonce, or the like. The second verification identifier is sent by the cellular network authentication network element to the user equipment by using the relay node, and then the user equipment feeds back the second verification identifier to the cellular network authentication network element by using the relay node. If the first verification identifier sent by the cellular network authentication network element matches the finally received first verification identifier, the cellular network authentication network element verifies that the identity of the user equipment is secure.

The second encrypted identifier may be a signature affixed to information other than the second encrypted identifier in the first response message by using a private key of the cellular network authentication network element, or may be a message authentication code generated when a symmetric key between the cellular network authentication network element and the user equipment is used for the first response message, where the message authentication code MAC may be generated specifically based on an HMAC. As in the prior art, correctness of information is verified by using the signature and the message authentication code MAC. It should be noted that, the signature may be a signature affixed to all or a part of information other than the signature in the first response message. The user equipment generating the first response message and the cellular network authentication network element that finally needs to obtain (or may indirectly obtain) the information in the first response message have predefined, by using the protocol, a specific part of information to which a signature is affixed. In a word, the second encrypted identifier includes an encrypted sequence of the second verification identifier, that is, information based on which the second encrypted identifier is generated includes at least the second verification identifier.

Step S306: The relay node is further configured to receive the first response message, and relay the first response message to the plurality of user equipments.

Specifically, because the first response message sent by each user equipment in the plurality of user equipments to the relay node carries the second identity of the user equipment, the relay node may relay the first response message to the plurality of user equipments based on the second identities.

Step S307: The user equipment is further configured to receive the first response message relayed by the relay node, verify, by using the second encrypted identifier, whether information in the first response message is correct, and verify whether the first response message carries the first verification identifier of the user equipment.

Specifically, the user equipment needs to analyze whether the first response message carries the first verification identifier of the user equipment, and further needs to verify, based on the second encrypted identifier, whether the information in the first response message is correct.

Step S308: The user equipment is further configured to generate a session key between the user equipment and the cellular network authentication network element when verifying that the information in the first response message is correct and carries the first verification identifier of the user equipment.

In this embodiment of the present disclosure, manners of calculating the session key between the user equipment and the cellular network authentication network element include but are not limited to the following three manners:

Manner 1: The user equipment generates the session key between the user equipment and the cellular network authentication network element by using the preset algorithm based on a random number generated by the user equipment and the DH public key of the cellular network authentication network element; and correspondingly, the cellular network authentication network element also needs to generate a session key between the cellular network authentication network element and the user equipment by using the preset algorithm based on a random number generated by the cellular network authentication network element and the DH public key of the user equipment.

Manner 2: The user equipment generates the session key between the user equipment and the cellular network authentication network element by using another preset algorithm based on the private key of the user equipment and the public key of the cellular network authentication network element. The user equipment may calculate its private key by using an identity based signature technology (English: Identity Based Signature, IBS for short) based on the second identity of the user equipment, and calculate the public key of the cellular network authentication network element based on the first identity of the cellular network authentication network element. Therefore, it may also be understood that the user equipment calculates the session key between the user equipment and the cellular network authentication network element based on the second identity of the user equipment and the first identity of the cellular network authentication network element. Correspondingly, the cellular network authentication network element also generates a session key between the cellular network authentication network element and the user equipment by using the preset algorithm based on the private key of the cellular network authentication network element and the public key of the user equipment. It may also be understood that the cellular network authentication network element calculates the session key between the cellular network authentication network element and the user equipment based on the first identity of the cellular network authentication network element and the second identity of the user equipment.

Manner 3: The user equipment generates the session key between the user equipment and the cellular network authentication network element by using another preset algorithm based on the private key of the user equipment, the public key of the cellular network authentication network element, the fresh parameter of the user equipment, and the fresh parameter of the cellular network authentication network element. The user equipment may calculate its private key by using an IBS based on the second identity of the user equipment, and calculate the public key of the cellular network authentication network element based on the first identity of the cellular network authentication network element. Therefore, it may also be understood that the user equipment calculates the session key between the user equipment and the cellular network authentication network element based on the second identity of the user equipment, the first identity of the cellular network authentication network element, the fresh parameter of the user equipment, and the fresh parameter of the cellular network authentication network element. Correspondingly, the cellular network authentication network element also generates a session key between the cellular network authentication network element and the user equipment by using the preset algorithm based on the private key of the cellular network authentication network element, the public key of the user equipment, the fresh parameter of the user equipment, and the fresh parameter of the cellular network authentication network element. It may also be understood that the cellular network authentication network element calculates the session key between the cellular network authentication network element and the user equipment based on the first identity of the cellular network authentication network element, the second identity of the user equipment, the fresh parameter of the user equipment, and the fresh parameter of the cellular network authentication network element.

Step S309: The user equipment is further configured to send a second authentication message to the relay node when verifying that the information in the first response message is correct and carries the first verification identifier of the user equipment.

Specifically, the second authentication message includes the second verification identifier and a third encrypted identifier. The third encrypted identifier is an encrypted sequence of information other than the third encrypted identifier in the second authentication message. Optionally, the third encrypted identifier may be a signature affixed to the second authentication message by using the private key of the user equipment, or may be a message authentication code MAC generated when the symmetric key between the user equipment and the cellular network authentication network element is used for the second authentication message. It should be noted that, the signature may be a signature affixed to all or a part of information other than the signature in the second authentication message. The user equipment generating the second authentication message and the cellular network authentication network element that finally needs to obtain (or may indirectly obtain) the information in the second authentication message have predefined, by using the protocol, a specific part of information to which a signature is affixed. In a word, the third encrypted identifier includes an encrypted sequence of the second verification identifier, that is, information based on which the third encrypted identifier is generated includes at least the second verification identifier.

Step S310: The relay node is configured to receive the second authentication messages sent by the plurality of user equipments, and generate third encrypted information by using the aggregation algorithm based on the third encrypted identifiers in the second authentication messages sent by the plurality of user equipments.

Step S311: The relay node is further configured to send a second aggregation message to the cellular network authentication network element, where the second aggregation message includes the third encrypted information, the second verification identifier that is carried in the second authentication message, and the second identities of the plurality of user equipments.

Step S312: The cellular network authentication network element is further configured to receive the second aggregation message, verify, by using the third encrypted information, whether information in the second aggregation message is correct, and verify whether the second aggregation message carries the second verification identifier of the cellular network authentication network element.

Step S313: The cellular network authentication network element is further configured to generate a session key between the cellular network authentication network element and each user equipment in the plurality of user equipments when verifying that the information in the second aggregation message is correct and carries the second verification identifier of the cellular network authentication network element.

Specifically, the foregoing describes three manners of calculating the session key between the user equipment and the cellular network authentication network element. The manner of calculating, by the cellular network authentication network element, the session key between the cellular network authentication network element and each user equipment is described in the three manners, and is not described again herein.

Figures 1, 3B:
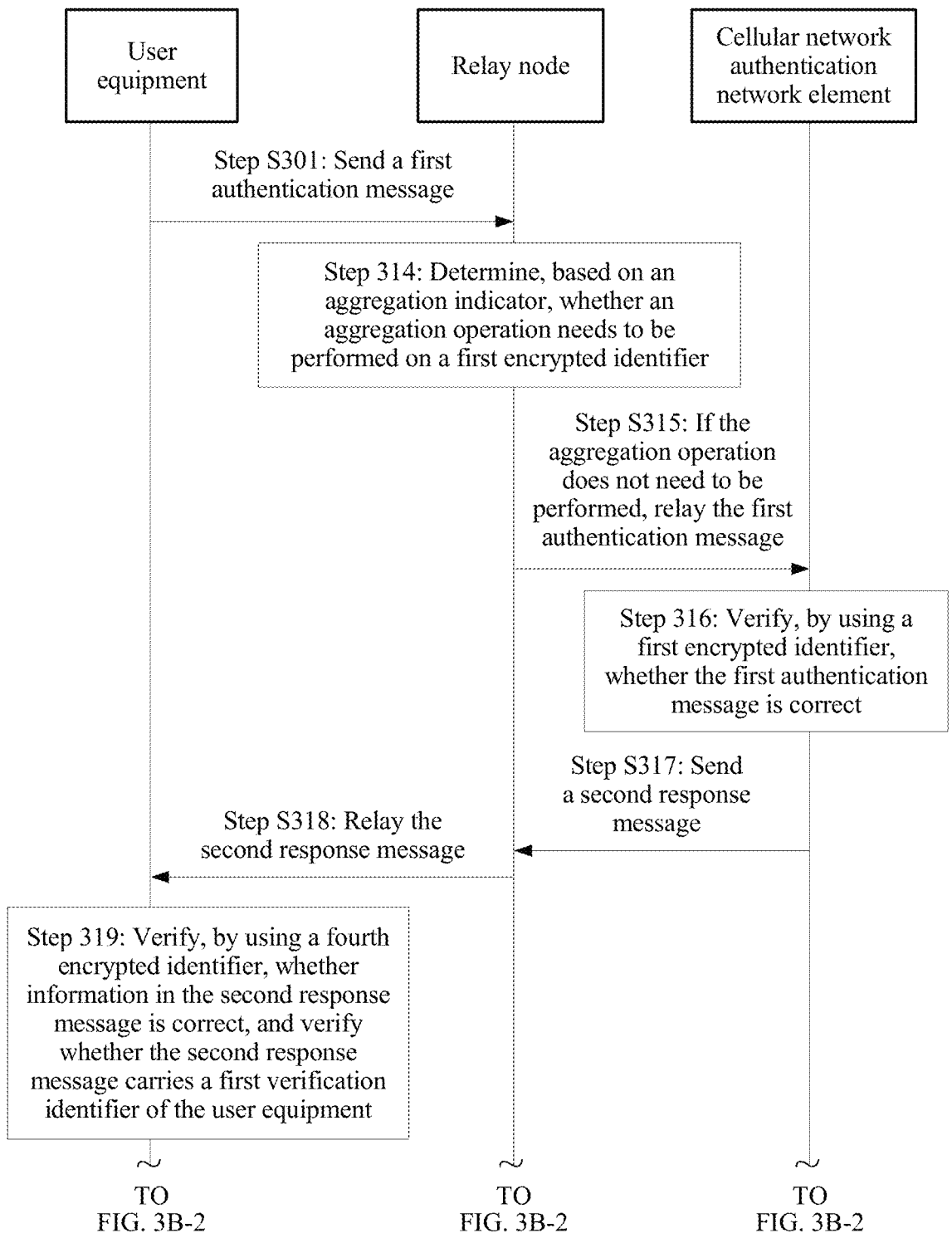
Figures 2, 3B:
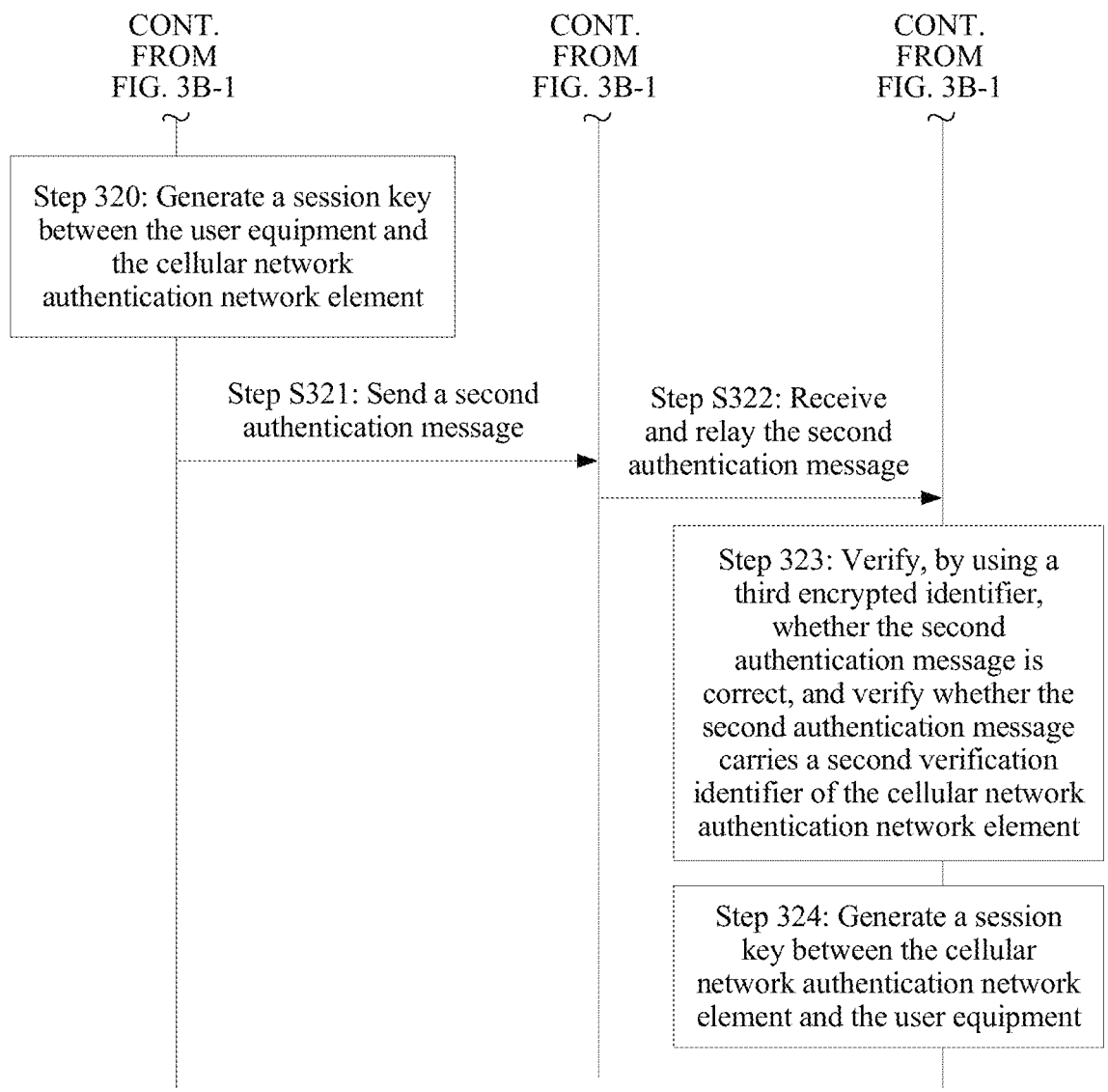

In an actual application, some user equipments do not expect that first authentication messages and second authentication messages sent by the user equipments are aggregated by the relay node, but expect the relay node to directly relay the first authentication messages and the second authentication messages to the cellular network authentication network element after the relay node receives the first authentication messages and the second authentication messages, so that the cellular network authentication network element performs a network authentication procedure with each user equipment separately. In this case, the specific execution procedure is shown in steps S314 to S324 in FIG. 3B-1 and FIG. 3B-2.

Step S314: The relay node determines, based on an aggregation indicator, whether an aggregation operation needs to be performed on the first encrypted identifier. The first authentication message includes an aggregation indicator used to represent whether to perform an aggregation operation based on the first encrypted identifier.

If the aggregation operation needs to be performed, step S302 is performed. If the aggregation operation does not need to be performed, step S315 is performed.

Step S315: The relay node relays the first authentication message to the cellular network authentication network element.

Step S316: The cellular network authentication network element receives the first authentication message, and verifies, by using the first encrypted identifier, whether the information in the first authentication message is correct.

Step S317: The cellular network authentication network element sends a second response message to the relay node when verifying that the information in the first authentication message is correct, where the second response message includes a fourth encrypted identifier, the first identity, the second verification identifier, and the first verification identifier of the user equipment, and the fourth encrypted identifier is an encrypted sequence of all or a part of information other than the fourth encrypted identifier in the second response message. In a word, the fourth encrypted identifier includes an encrypted sequence of at least one of the first verification identifier and the second encrypted identifier, that is, information based on which the second encrypted identifier is generated includes at least one of the first verification identifier and the second verification identifier.

Specifically, the fourth encrypted identifier may be a DH public key or a fresh parameter nonce of the cellular network authentication network element, or the like. The fourth encrypted identifier may be a signature affixed to the second response message by using a private key of the cellular network authentication network element, or may be a message authentication code MAC generated when a symmetric key between the user equipment and the cellular network authentication network element is used for the second response message.

Step S318: The relay node is further configured to receive the second response message, and relay the second response message to the user equipment.

Step S319: The user equipment is further configured to receive the second response message relayed by the relay node, verify, by using the fourth encrypted identifier, whether the information in the second response message is correct, and verify whether the second response message carries the first verification identifier of the user equipment.

Step S320: The user equipment is further configured to generate a session key between the user equipment and the cellular network authentication network element when verifying that the information in the second response message is correct and carries the first verification identifier of the user equipment.

Specifically, the manner of generating the session key is described above, and is not described again herein.

Step S321: The user equipment is further configured to send a second authentication message to the relay node when verifying that the second response message is correct and carries the first verification identifier of the user equipment.

Step S322: The relay node is further configured to receive the second authentication message, and relay the second authentication message to the cellular network authentication network element.

Step S323: The cellular network authentication network element is further configured to receive the second authentication message, verify, by using the third encrypted identifier, whether the information in the second authentication message is correct, and verify whether the second authentication message carries the second verification identifier of the cellular network authentication network element.

Step S324: The cellular network authentication network element is further configured to generate a session key between the cellular network authentication network element and the user equipment when verifying that the information in the second authentication message is correct and carries the second verification identifier of the cellular network authentication network element.

Specifically, the manner of generating the session key is described above, and is not described again herein.

The foregoing is a brief description of this embodiment of the present disclosure. The following describes some specific solutions for better understanding this embodiment of the present disclosure.

In an optional solution, the first verification identifier is the DH public key of the user equipment. The first encrypted identifier is a signature affixed to the information other than the first encrypted identifier in the first authentication message by using the private key of the user equipment; and that the user equipment generates a session key between the user equipment and the cellular network authentication network element is specifically: the user equipment generates the session key between the user equipment and the cellular network authentication network element based on the random number of the user equipment and the second verification identifier in the first response message.

Figures 1, 3C:
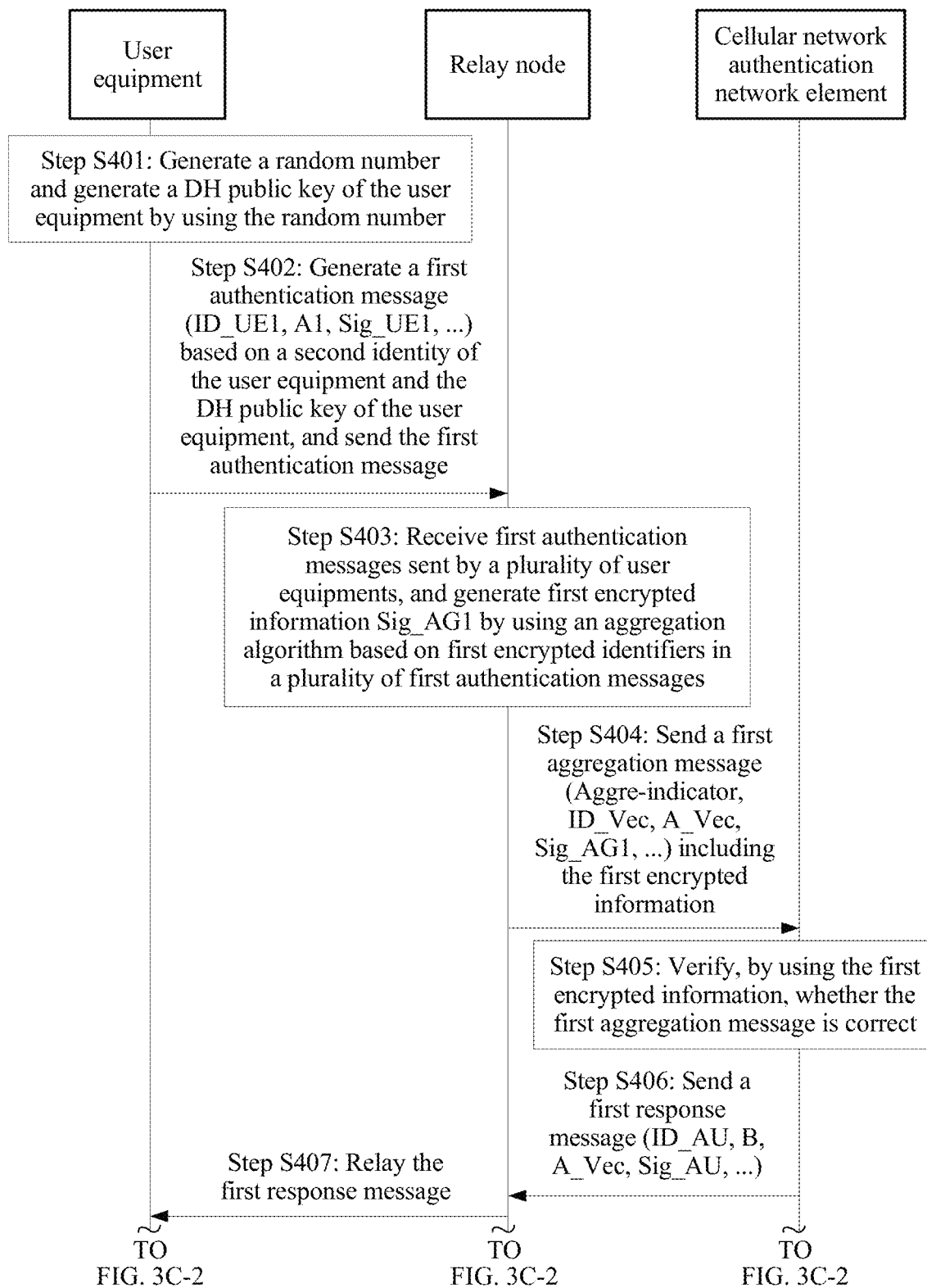
Figures 2, 3C:
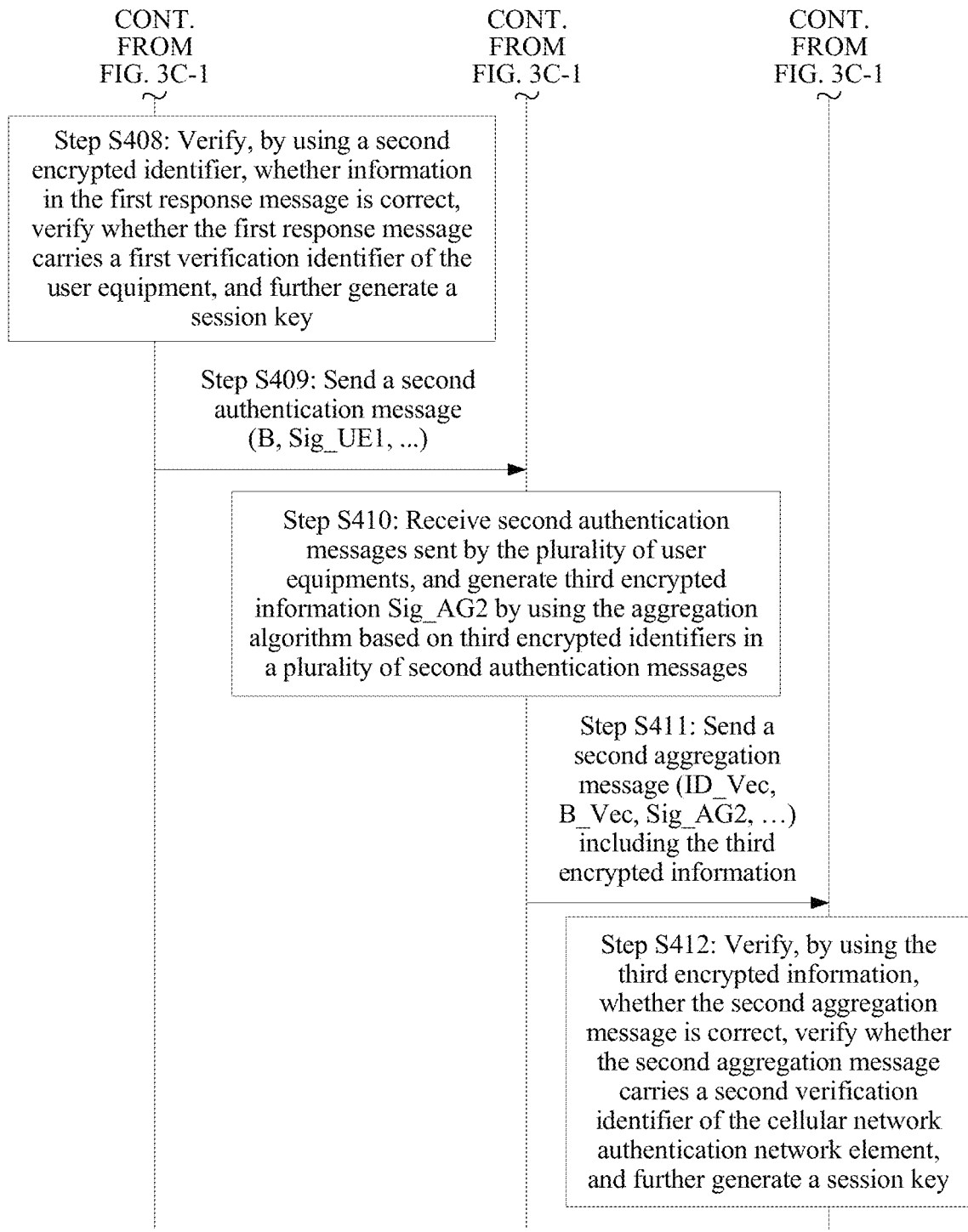

The second verification identifier is the DH public key of the cellular network authentication network element, and the second encrypted identifier is a signature affixed to the information other than the second encrypted identifier in the first response message by using the private key of the cellular network authentication network element. The following uses steps S401 to S412 in FIG. 3C-1 and FIG. 3C-2 as an example for description.

Step 401: Each user equipment separately generates a random number and generates a DH public key of the user equipment by using the random number. For example:

1a. User equipment UE 1 generates a random number 1 (RAND 1); and the UE 1 calculates its DH public key by using the RAND 1, where a calculation formula is: $A1=g^{RAND\_1} \mod p$, where A1 is the DH public key of the UE 1 that is obtained through calculation, p is a prime number, g is a generator of a finite cyclic group and g and p may be published in advance.

1b. User equipment UE 2 generates a random number 2 (RAND 2); and the UE 2 calculates its DH public key by using the RAND 2, where a calculation formula is: $A2=g^{RAND\_2} \mod p$, where A2 is the DH public key of the UE 2 that is obtained through calculation.

Step 402: Each user equipment generates a first authentication message based on a second identity of the user equipment and the DH public key of the user equipment, where the first authentication message includes the second identity, the DH public key, and a first encrypted identifier, where the first encrypted identifier is a signature affixed to all or a part of information other than the first encrypted identifier in the first authentication message by using a private key of the corresponding user equipment. For example:

2a. The UE 1 generates a first authentication message, where the first authentication message includes a second identity of the UE 1, the DH public key of the UE 1, and a first encrypted identifier, where the first encrypted identifier is a signature affixed to the second identity of the UE 1 and the DH public key of the UE 1 by using a private key of the UE 1; and the first authentication message sent by the UE 1 to the relay node may be (ID_UE1, A1, Sig_UE1, . . . ), where ID_UE1 is the second identity of the UE 1, A1 is the DH public key of the UE 1, " . . . " indicates that other information may also exist in the first authentication message, and Sig_UE1 is the signature affixed by the UE 1 to the ID_UE1 and A1 in the first authentication message.

2b. The UE 2 generates a first authentication message, where the first authentication message includes a second identity of the UE 2, the DH public key of the UE 2, and a first encrypted identifier, where the first encrypted identifier is a signature affixed to the second identity of the UE 2 and the DH public key of the UE 2 by using a private key of the UE 2; and the first authentication message sent by the UE 2 to the relay node is (ID_UE2, A2, Sig_UE2, . . . ), where ID_UE2 is the second identity of the UE 2, A2 is the DH public key of the UE 2, " . . . " indicates that other information may also exist in the first authentication message, and Sig_UE2 is the signature affixed by the UE 2 to the ID_UE2 and A2 in the first authentication message.

Step 403: The relay node receives the first authentication messages sent by the user equipments, and performs an aggregation operation on signatures in the received first authentication messages of the user equipments to generate an aggregated signature Sig_AG1, where the aggregated signature is the foregoing first encrypted information. When the user equipments are specifically the UE 1 and the UE 2, the relay node aggregates the signature in the first authentication message of the UE 1 and the signature in the first authentication message of the UE 2 to obtain an aggregated signature. For example, the aggregated signature is Sig_AG1=f(Sig_UE1, Sig_UE2). Optionally, a data length of the aggregated signature is the same as a data length of a separate signature of each user equipment.

Step 404: The relay node generates a first aggregation message and sends the first aggregation message to a cellular network authentication network element (Authenticator). The first aggregation message may be (Aggre-indicator, ID_Vec, A_Vec, Sig_AG1, . . . ), where Aggre-indicator is an aggregate authentication indicator, ID_Vec includes the second identity of each user equipment, A_Vec includes the DH public key of each user equipment, " . . . " corresponds to other information that may exist in the first authentication message, and the Sig_AG1 is the aggregated signature.

Step 405: The cellular network authentication network element receives the first aggregation message, and verifies the aggregated signature Sig_AG1 with reference to information in the first aggregation message; if the verification succeeds, it indicates that the information in the first aggregation message is correct; and then the cellular network authentication network element generates a random number RAND_AU, and generates a DH public key of the cellular network authentication network element based on the random number, where the DH public key is $B=g^{RAND\_AU} \mod p$. It should be noted that, at least two network authentication modes, that is, aggregate authentication and non-aggregate authentication, may be preconfigured for the cellular network authentication network element. The cellular network authentication network element may determine, based on the aggregate authentication indicator Aggre-indicator in the first aggregation message, that the signature in the first aggregation message needs to be verified by using an aggregate authentication related policy.

Step 406: The cellular network authentication network element sends a first response message to the relay node, where the first response message may be (ID_AU, B, A_Vec, Sig_AU, . . . ), where ID_AU is a first identity of the cellular network authentication network element, B is the DH public key of the cellular network authentication network element, A_Vec includes the DH public key of each user equipment, Sig_AU is a signature affixed to all or a part of information other than the Sig_AU in the first response message by using a private key of the cellular network authentication network element, and the Sig_AU is the second password identifier described above.

Step 407: The relay node receives the first response message, and relays the first response message to each user equipment UE separately. For example:

7a. The relay node relays the first response message to the UE 1.

7b. The relay node relays the first response message to the UE 2.

Step 408: Each user equipment separately receives the first response message relayed by the relay node, and verifies the signature Sig_AU with reference to the information in the first response message; if the signature Sig_AU is verified successfully and the first response message carries the DH public key of the user equipment, it indicates that the information in the first response message is correct; and then the user equipment generates a session key between the user equipment and the cellular network authentication network element with reference to the DH public key of the cellular network authentication network element.

8a. The UE 1 verifies the signature Sig_AU, and if the signature Sig_AU is verified successfully and the first response message carries the DH public key of the UE 1, generates a session key between the UE 1 and the cellular network authentication network element with reference to the random number generated by the UE 1 and the DH public key of the cellular network authentication network element. For example, the session key is $K1=B^{RAND\_1} \mod p$.

8b. The UE 2 verifies the signature Sig_AU, and if the signature Sig_AU is verified successfully and the first response message carries the DH public key of the UE 2, generates a session key between the UE 2 and the cellular network authentication network element with reference to the random number generated by the UE 2 and the DH public key of the cellular network authentication network element. For example, the session key is $K2=B^{RAND\_2} \mod p$.

Step 409: If each user equipment verifies the signature Sig_AU successfully and determines that the first response message carries the DH public key of the user equipment, each user equipment sends a second authentication message to the relay node separately, where the second authentication message includes the DH public key of the cellular network authentication network element and a third password identifier, and the third password identifier is a signature affixed to a part or all of information other than the third password identifier in the second authentication message by using the private key of the user equipment. For example:

9a. The UE 1 sends a second authentication message (B, Sig_UE1, . . . ) to the relay node, where B is the DH public key of the cellular network authentication network element, " . . . " indicates that the second authentication message may include other information, and Sig_UE1 is a signature affixed to the DH public key B of the cellular network authentication network element by using the private key of the UE 1.

9b. The UE 2 sends a second authentication message (B, Sig_UE2, . . . ) to the relay node, where B is the DH public key of the cellular network authentication network element, " . . . " indicates that the second authentication message may include other information, and Sig_UE2 is a signature affixed to the DH public key B of the cellular network authentication network element by using the private key of the UE 2.

Step 410: The relay node receives the second authentication message, and performs an aggregation operation on the third password identifier (that is, the signature) in each received second authentication message to generate a new aggregated signature Sig_AG2.

Step 411: The relay node sends the second aggregation message to the cellular network authentication network element, where the second aggregation message may be (ID_Vec, B_Vec, Sig_AG2, . . . ), where ID_Vec includes the second identity of each user equipment, B_Vec includes the DH public key of the cellular network authentication network element that is returned by each user equipment, " . . . " corresponds to other information that may exist in the second authentication message, and the Sig_AG2 is the aggregated signature.

Step 412: The cellular network authentication network element verifies the aggregated signature Sig_AG2 in the second aggregation message with reference to the information in the second aggregation message, and if the aggregated signature Sig_AG2 is verified successfully and all network-side DH public keys carried in the second aggregation message are the DH public key of the cellular network authentication network element, generates a session key between the cellular network authentication network element and each user equipment with reference to the random number of the cellular network authentication network element and the DH public key of each user equipment in the plurality of user equipments. For example:

12a. The cellular network authentication network element calculates a session key between the cellular network authentication network element and the UE 1 based on the random number of the cellular network authentication network element and the DH public key of the UE 1. For example, the session key is $K1=A1^{RAND\_AU} \mod p$.

12b. The cellular network authentication network element calculates a session key between the cellular network authentication network element and the UE 2 based on the random number of the cellular network authentication network element and the DH public key of the UE 2. For example, the session key is $K2=A2^{RAND\_AU} \mod p$.

With reference to steps 401 to 412, the foregoing describes how to aggregate the signature in the first authentication message sent by each user equipment to reduce data overheads. For some reason, some user equipments may not expect that signatures in first authentication messages sent by the user equipments are aggregated by the relay node. Therefore, the first authentication message in the foregoing step 402 may further include a preference indicator UE_AGindicator, where the preference indicator UE_AGindicator is used to represent whether the user equipment that sends the first authentication message prefers aggregation of the signature in the first authentication message. For example, when UE_AGindicator=1, it indicates a preference for aggregation; or when UE_AGindicator=0, it indicates a nonpreference for aggregation.

Figures 1, 3D:
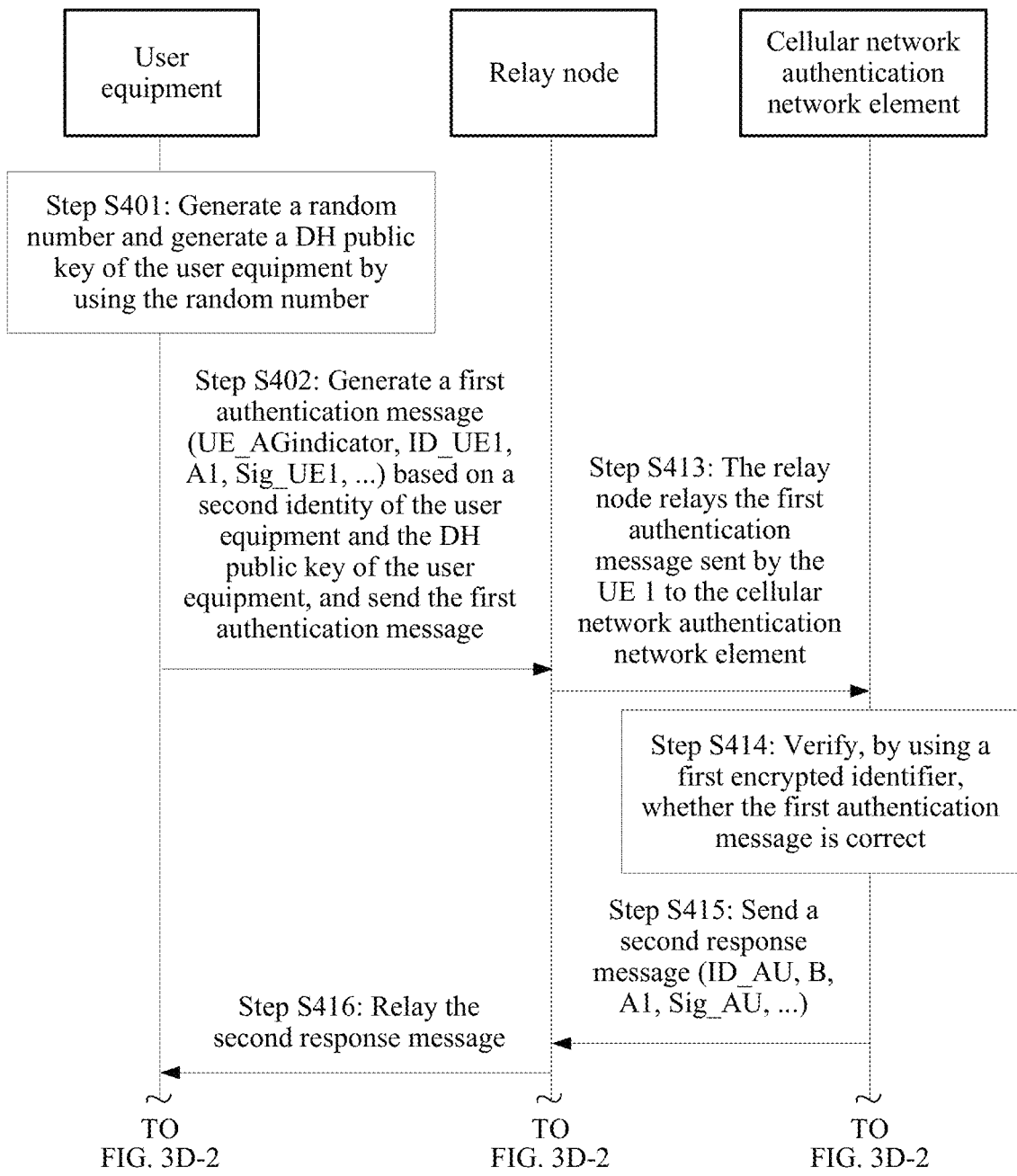
Figures 2, 3D:
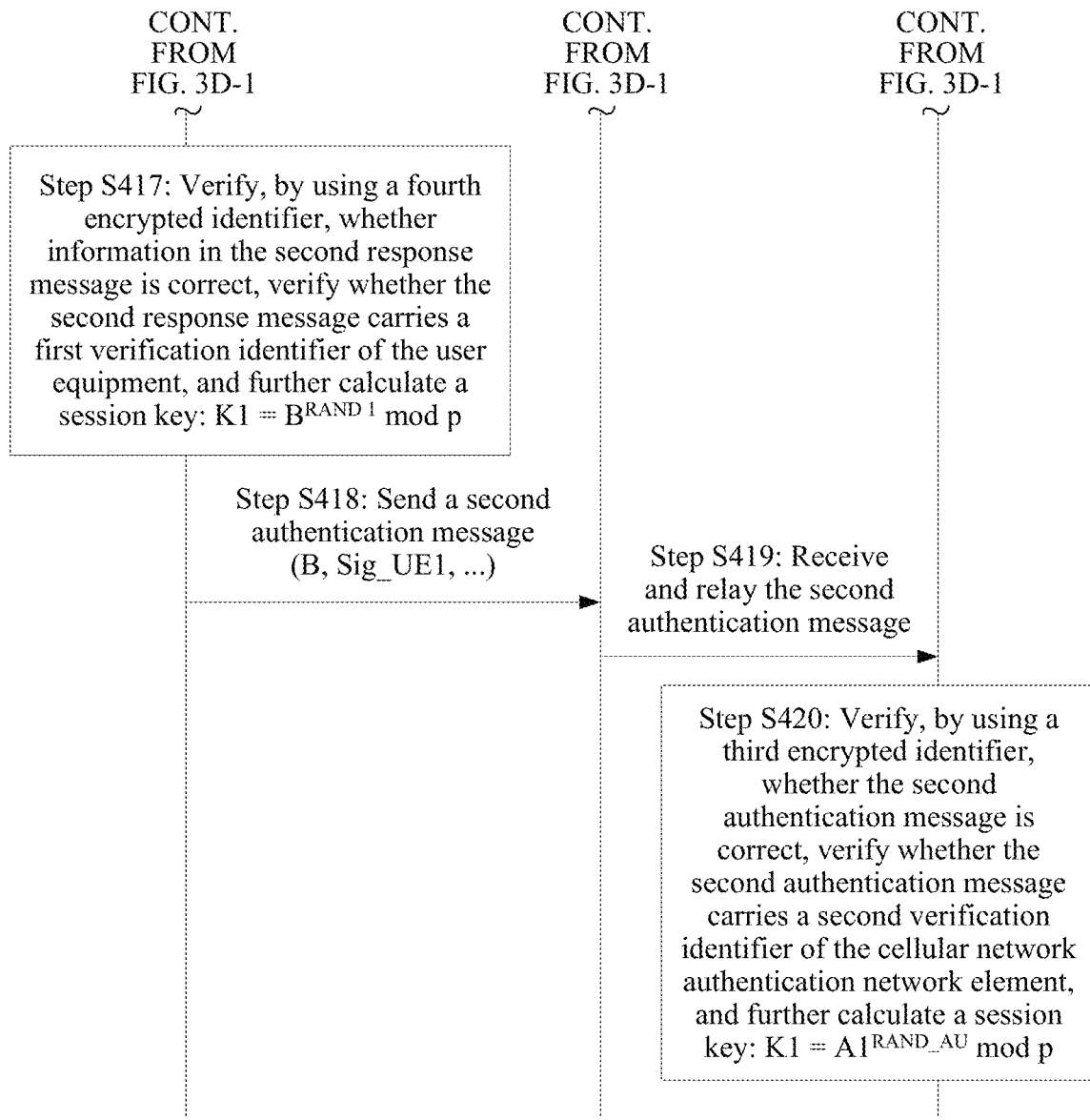

When the preference indicator indicates that the user equipment prefers aggregation of the signature in the first authentication message sent by the user equipment, the procedure of steps 403 to 412 is performed after the relay node learns the preference of the user equipment. Using the UE 1 as an example, when the preference indicator indicates that the UE does not prefer aggregation of the signature in the first authentication message sent by the UE 1, the procedure of steps 413 to 420 in FIG. 3D-1 and FIG. 3D-2 is performed after the relay node learns the nonpreference of the user equipment 1.

Step S413: The relay node relays the first authentication message sent by the UE 1 to the cellular network authentication network element, where the first authentication message may be (UE_AGindicator, ID_UE1, A1, Sig_UE1, . . . ), where a preference indicator UE_AGindicator indicates that the UE 1 does not prefer aggregation of the signature in the first authentication message of the UE 1, ID_UE1 is the second identity of the UE 1, A1 is the DH public key of the UE 1, " . . . " indicates that other information may also exist in the first authentication message, and Sig_UE1 is a signature affixed to all or a part of information other than the Sig_UE1 in the first authentication message by using the private key of the user equipment UE 1.

Step S414: The cellular network authentication network element receives the first authentication message sent by the relay node, and verifies the signature Sig_UE1 in the first authentication message based on the information in the first authentication message; if the verification succeeds, it indicates that the information in the first authentication message is correct; and then the cellular network authentication network element generates a random number RAND_AU, and generates a DH public key of the cellular network authentication network element based on the random number. For example, the DH public key is $B=g^{RAND\_AU}$ mod p.

Step S415: The cellular network authentication network element sends a second response message to the relay node, where the second response message may be (ID_AU, B, A1, Sig_AU, . . . ), where ID_AU is a first identity of the cellular network authentication network element, B is the DH public key of the cellular network authentication network element, A1 is the DH public key of the user equipment UE 1, " . . . " indicates that other information may also exist in the second response message, and Sig_AU is a signature affixed to all or a part of information other than the Sig_AU in the second response message by using a private key of the cellular network authentication network element.

Step S416: The relay node receives the second response message and relays the second response message to the UE 1.

Step S417: The UE 1 receives the second response message, and verifies the signature Sig_AU in the second response message with reference to the information in the second response message; if the signature Sig_AU is verified successfully and the second response message carries the DH public key of the UE 1, it indicates that the information in the second response message is correct; and then the UE 1 generates a session key between the UE 1 and the cellular network authentication network element with reference to the random number generated by the UE 1 and the DH public key of the cellular network authentication network element. For example, the session key is $K1=B^{RAND\ 1}$ mod p.

Step S418: The UE 1 sends a second authentication message to the relay node, where the second authentication message may be (B, Sig_UE1, . . . ), where B is the DH public key of the cellular network authentication network element, " . . . " indicates that the second authentication message may further include other information, and Sig_UE1 is a signature affixed to all or a part of information other than the Sig_UE1 in the second authentication message by using the private key of the UE 1.

Step S419: The relay node receives the second authentication message and relays the second authentication message to the cellular network authentication network element.

Step S420: The cellular network authentication network element receives the second authentication message, and verifies the signature Sig_UE1 in the second authentication message with reference to the information in the second authentication message; if the signature Sig_UE1 is verified successfully and a network-side DH public key carried in the second authentication message is the DH public key of the cellular network authentication network element, it indicates that the information in the second authentication message is correct; and then the cellular network authentication network element generates a session key between the cellular network authentication network element and the UE 1 with reference to the random number of the cellular network authentication network element and the DH public key of the UE 1. For example, the session key is $K1=A1^{RAND\_AU}$ mod p.

It may be understood that, in the solution described in steps S401 to S420, the second identity may be used to identify a source and a destination of a corresponding message; the first identity may be used to identify a source and a destination of a corresponding message; the first verification identifier is used by the cellular network to calculate a session key between the cellular network and the user equipment; and the second verification identifier is used by the user equipment to calculate a session key between the user equipment and the cellular network.

In another optional solution, the first verification identifier is a fresh parameter nonce of the user equipment; the first encrypted identifier is a signature affixed to the information other than the first encrypted identifier in the first authentication message by using the private key of the user equipment; and that the user equipment generates a session key between the user equipment and the cellular network authentication network element is specifically: the user equipment generates the session key between the user equipment and the cellular network authentication network element based on the private key of the user equipment and the second verification identifier in the first response message.

Figures 1, 3E:
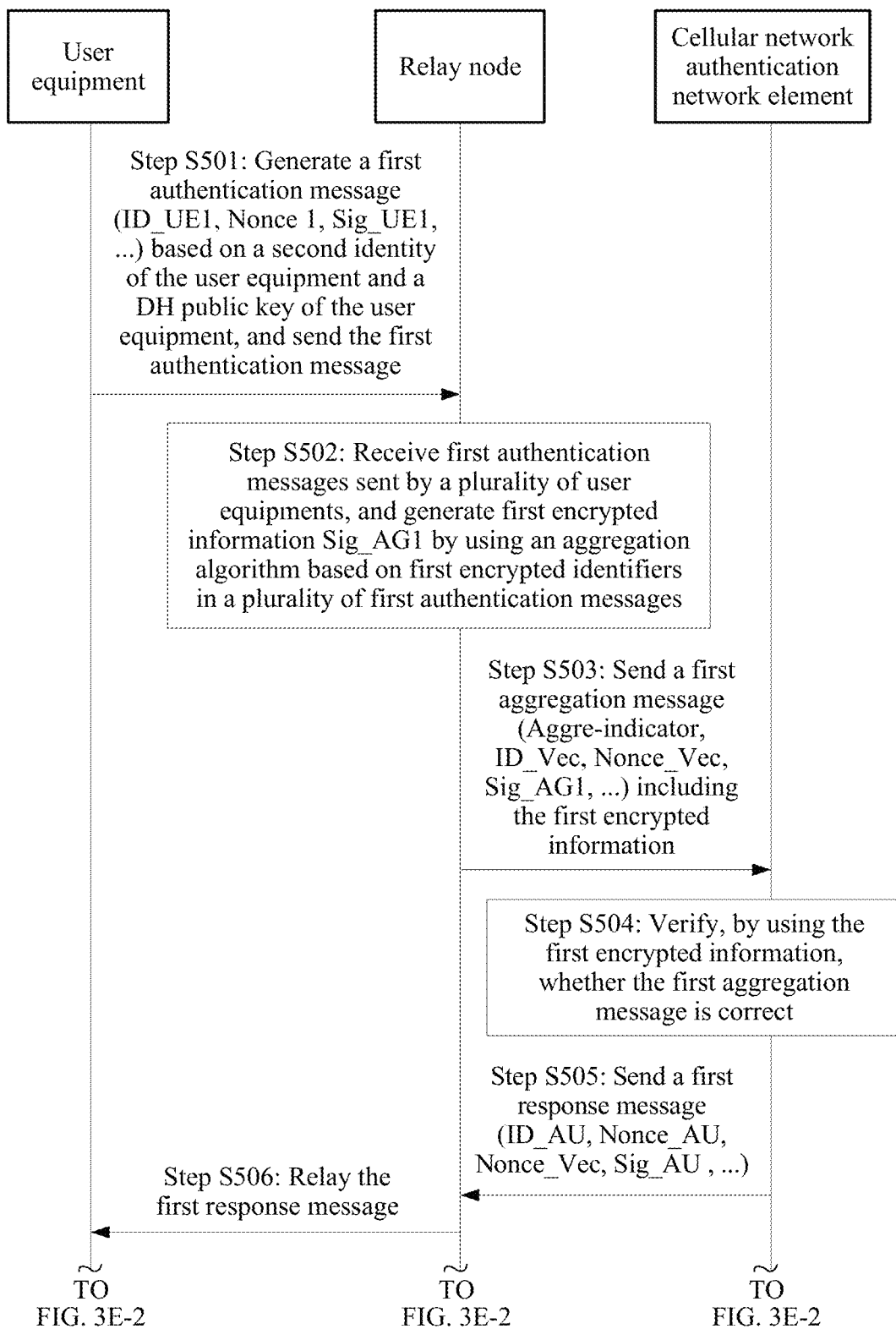
Figures 2, 3E:
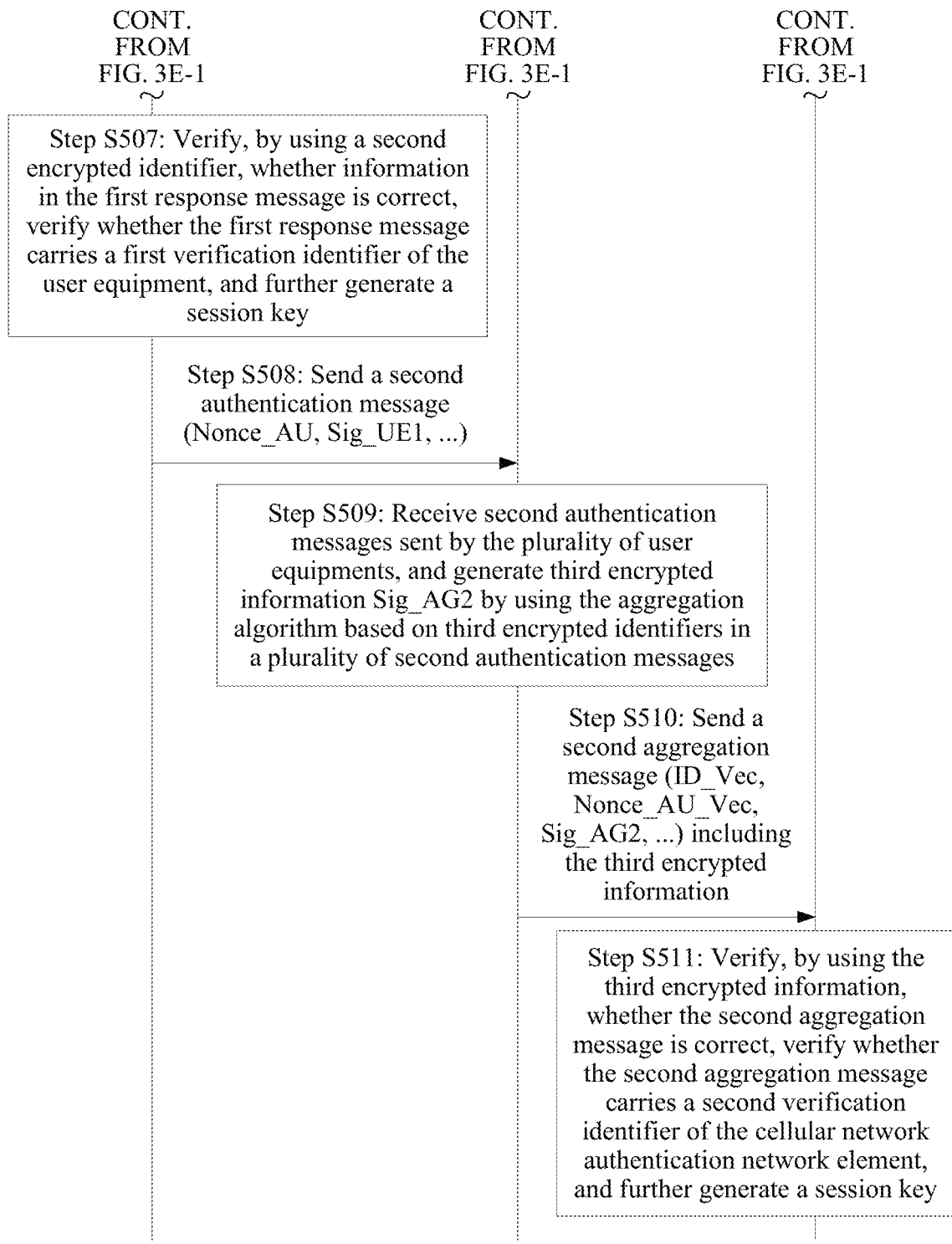

The second verification identifier is a fresh parameter nonce of the cellular network authentication network element, and the second encrypted identifier is a signature affixed to the information other than the second encrypted identifier in the first response message by using the private key of the cellular network authentication network element. The following uses steps S501 to S511 in FIG. 3E-1 and FIG. 3E-2 as an example for description.

Step S501: Each user equipment generates a first authentication message based on a second identity of the user equipment and a fresh parameter nonce (the nonce may be a parameter that may be updated as time changes, such as a random number or a sequence number) of the user equipment, and sends the first authentication message to the relay node, where the first authentication message includes the second identity, the nonce, and a first password identifier, and the first password identifier is a signature affixed to all or a part of information other than the first password identifier in the first authentication message by using a private key of the corresponding user equipment. For example:

1a. UE 1 generates a first authentication message and sends the first authentication message to the relay node, where the first authentication message may be (ID_UE1, Nonce 1, Sig_UE1, . . . ), where ID_UE1 is a second identity of the UE 1, Nonce 1 is a fresh parameter nonce of the UE 1, " . . . " indicates that other information may exist in the first authentication message, and Sig_UE1 is a signature affixed to the ID_UE1 and the Nonce 1 by using a private key of the UE 1.

1b. UE 2 generates a first authentication message and sends the first authentication message to the relay node, where the first authentication message may be (ID_UE2, Nonce 2, Sig_UE2, . . . ), where ID_UE2 is a second identity of the UE 2, Nonce 2 is a fresh parameter nonce of the UE 2, " . . . " indicates that other information may exist in the first authentication message and Sig_UE2 is a signature affixed to the ID_UE2 and the Nonce 2 by using a private key of the UE 2.

Step S502: The relay node receives the first authentication messages sent by the user equipments, and performs an aggregation operation on signatures in the received first authentication messages of the user equipments to generate an aggregated signature Sig_AG1, where the aggregated signature is the foregoing first encrypted information. When the user equipments are specifically the UE 1 and the UE 2, the relay node aggregates the signature in the first authentication message of the UE 1 and the signature in the first authentication message of the UE 2 to obtain an aggregated signature. For example, the aggregated signature is Sig_AG1=f(Sig_UE1, Sig_UE2). Optionally, a data length of the aggregated signature is the same as a data length of a separate signature of each user equipment.

Step S503: The relay node generates a first aggregation message and sends the first aggregation message to a cellular network authentication network element (Authenticator). The first aggregation message may be (Aggre-indicator, ID_Vec, Nonce_Vec, Sig_AG1, . . . ), where Aggre-indicator is an aggregate authentication indicator, ID_Vec includes the second identity of each user equipment, Nonce_Vec includes the nonce of each user equipment, " . . . " corresponds to other information that may exist in the first authentication message, and the Sig_AG1 is the aggregated signature.

Step S504: The cellular network authentication network element receives the first aggregation message, and verifies the aggregated signature Sig_AG1 with reference to information in the first aggregation message. If the verification succeeds, it indicates that the information in the first aggregation message is correct. It should be noted that, at least two network authentication modes, that is, aggregate authentication and non-aggregate authentication, may be preconfigured for the cellular network authentication network element. The cellular network authentication network element may determine, based on the aggregate authentication indicator Aggre-indicator in the first aggregation message, that the signature in the first aggregation message needs to be verified by using an aggregate authentication related policy.

Step S505: The cellular network authentication network element sends a first response message to the relay node, where the first response message may be (ID_AU, Nonce_AU, Nonce_Vec, Sig_AU, . . . ), where ID_AU is a first identity of the cellular network authentication network element, Nonce_AU is a nonce of the cellular network authentication network element, Nonce_Vec includes the nonce of each user equipment, " . . . " indicates that other information may exist in the first response message, Sig_AU is a signature affixed to all or a part of information other than the Sig_AU in the first response message by using a private key of the cellular network authentication network element, and the Sig_AU is the second password identifier described above.

Step S506: The relay node receives the first response message, and relays the first response message to each user equipment UE separately. For example:

6a. The relay node relays the first response message to the UE 1.

6b. The relay node relays the first response message to the UE 2.

Step S507: Each user equipment receives the first response message relayed by the relay node, and verifies the signature Sig_AU with reference to the information in the first response message; if the signature Sig_AU is verified successfully and the first response message carries the nonce of the user equipment, it indicates that the information in the first response message is correct; and then the user equipment generates a session key between the user equipment and the cellular network authentication network element with reference to the first identity of the cellular network authentication network element and the second identity of the user equipment. Because the first identity is a public key of the cellular network authentication network element, the private key of the user equipment may be obtained by using an identity based signature technology (English: Identity Based Signature, IBS for short) to process the second identity of the user equipment. Therefore, it may also be understood that the session key between the user equipment and the cellular network authentication network element is generated with reference to the public key of the cellular network authentication network element and the private key of the user equipment. For example:

7a. The UE 1 verifies the signature Sig_AU, and if the signature Sig_AU is verified successfully and the first response message carries the Nonce 1 of the UE 1, generates a session key between the UE 1 and the cellular network authentication network element with reference to the first identity of the cellular network authentication network element and the second identity of the UE 1. For example, the session key is K1=e(xH(ID_UE1), H(ID_AU)), where xH(ID_UE1) is the private key of the UE 1 that is obtained based on the second identity of the UE 1, and H(ID_AU) is the public key of the cellular network authentication network element that is obtained based on the first identity of the cellular network authentication network element. Therefore, it may also be understood that the session key between the UE 1 and the cellular network authentication network element is generated based on the public key of the cellular network authentication network element and the private key of the UE 1.

7b. The UE 2 verifies the signature Sig_AU, and if the signature Sig_AU is verified successfully and the first response message carries the Nonce 2 of the UE 2, generates a session key between the UE 2 and the cellular network authentication network element with reference to the first identity of the cellular network authentication network element and the second identity of the UE 2. For example, the session key is K2=e(xH(ID_UE2), H(ID_AU)), where xH(ID_UE2) is the private key of the UE 2 that is obtained based on the second identity of the UE 2, and H(ID_AU) is the public key of the cellular network authentication network element that is obtained based on the first identity of the cellular network authentication network element. Therefore, it may also be understood that the session key between the UE 2 and the cellular network authentication network element is generated based on the public key of the cellular network authentication network element and the private key of the UE 2.

Step S508: If each user equipment verifies the signature Sig_AU successfully and decrypts the nonce of the user equipment from the first response message, each user equipment sends a second authentication message to the relay node separately, where the second authentication message includes a DH public key of the cellular network authentication network element and a third password identifier, and the third password identifier is a signature affixed to a part or all of information other than the third password identifier in the second authentication message by using the private key of the user equipment. For example:

8a. The UE 1 sends a second authentication message (Nonce_AU, Sig_UE1, . . . ) to the relay node, where Nonce_AU is the nonce of the cellular network authentication network element, " . . . " indicates that the second authentication message may include other information, and Sig_UE1 is a signature affixed to the fresh parameter Nonce_AU of the cellular network authentication network element by using the private key of the UE 1.

8b. The UE 2 sends a second authentication message (Nonce_AU, Sig_UE2, . . . ) to the relay node, where Nonce_AU is the nonce of the cellular network authentication network element, " . . . " indicates that the second authentication message may include other information, and Sig_UE2 is a signature affixed to the fresh parameter Nonce_AU of the cellular network authentication network element by using the private key of the UE 2.

Step S509: The relay node receives the second authentication message, and performs an aggregation operation on the third password identifier (that is, the signature) in each received second authentication message to generate a new aggregated signature Sig_AG2.

Step S510: The relay node sends the second aggregation message to the cellular network authentication network element, where the second aggregation message may be (ID_Vec, Nonce_AU_Vec, Sig_AG2, . . . ), where ID_Vec includes the second identity of each user equipment, Nonce_AU_Vec includes the nonce of the cellular network authentication network element that is sent by each user equipment to the relay node, " . . . " corresponds to other information that may exist in the second authentication message, and the Sig_AG2 is the aggregated signature.

Step S511: The cellular network authentication network element verifies the aggregated signature Sig_AG2 in the second aggregation message with reference to information in the second aggregation message, and if the aggregated signature Sig_AG2 is verified successfully and all network-side nonces carried in the second aggregation message are the Nonce_AU of the cellular network authentication network element, generates a session key between the cellular network authentication network element and each user equipment with reference to the first identity of the cellular network authentication network element and the second identity of each user equipment in the plurality of user equipments. For example:

11a. The cellular network authentication network element calculates a session key between the cellular network authentication network element and the UE 1 based on the first identity of the cellular network authentication network element and the second identity of the UE 1. For example, the session key is K1=e(xH(ID_AU), H(ID_UE1)), where xH(ID_AU) is the private key of the cellular network authentication network element that is obtained through calculation based on the first identity of the cellular network authentication network element, and H(ID_UE1) is a public key of the UE 1 that is obtained based on the second identity of the UE 1. Therefore, it may also be understood that the cellular network authentication network element calculates the session key between the cellular network authentication network element and the UE 1 based on the private key of the cellular network authentication network element and the public key of the UE 1.

11b. The cellular network authentication network element calculates a session key between the cellular network authentication network element and the UE 2 based on the first identity of the cellular network authentication network element and the second identity of the UE 2. For example, the session key is K2=e(xH(ID_AU), H(ID_UE2)), where xH(ID_AU) is the private key of the cellular network authentication network element that is obtained through calculation based on the first identity of the cellular network authentication network element, and H(ID_UE2) is a public key of the UE 2 that is obtained based on the second identity of the UE 2. Therefore, it may also be understood that the cellular network authentication network element calculates the session key between the cellular network authentication network element and the UE 2 based on the private key of the cellular network authentication network element and the public key of the UE 2.

With reference to steps 501 to 511, the foregoing describes how to aggregate the signature in the first authentication message sent by each user equipment to reduce data overheads. For some reason, some user equipments may not expect that signatures in first authentication messages sent by the user equipments are aggregated by the relay node. Therefore, the first authentication message in the foregoing step 501 may further include a preference indicator UE_AGindicator, where the preference indicator UE_AGindicator is used to represent whether the user equipment that sends the first authentication message prefers aggregation of the signature in the first authentication message. For example, when UE_AGindicator=1, it indicates a preference for aggregation; or when UE_AGindicator=0, it indicates a nonpreference for aggregation.

Figures 1, 3F:
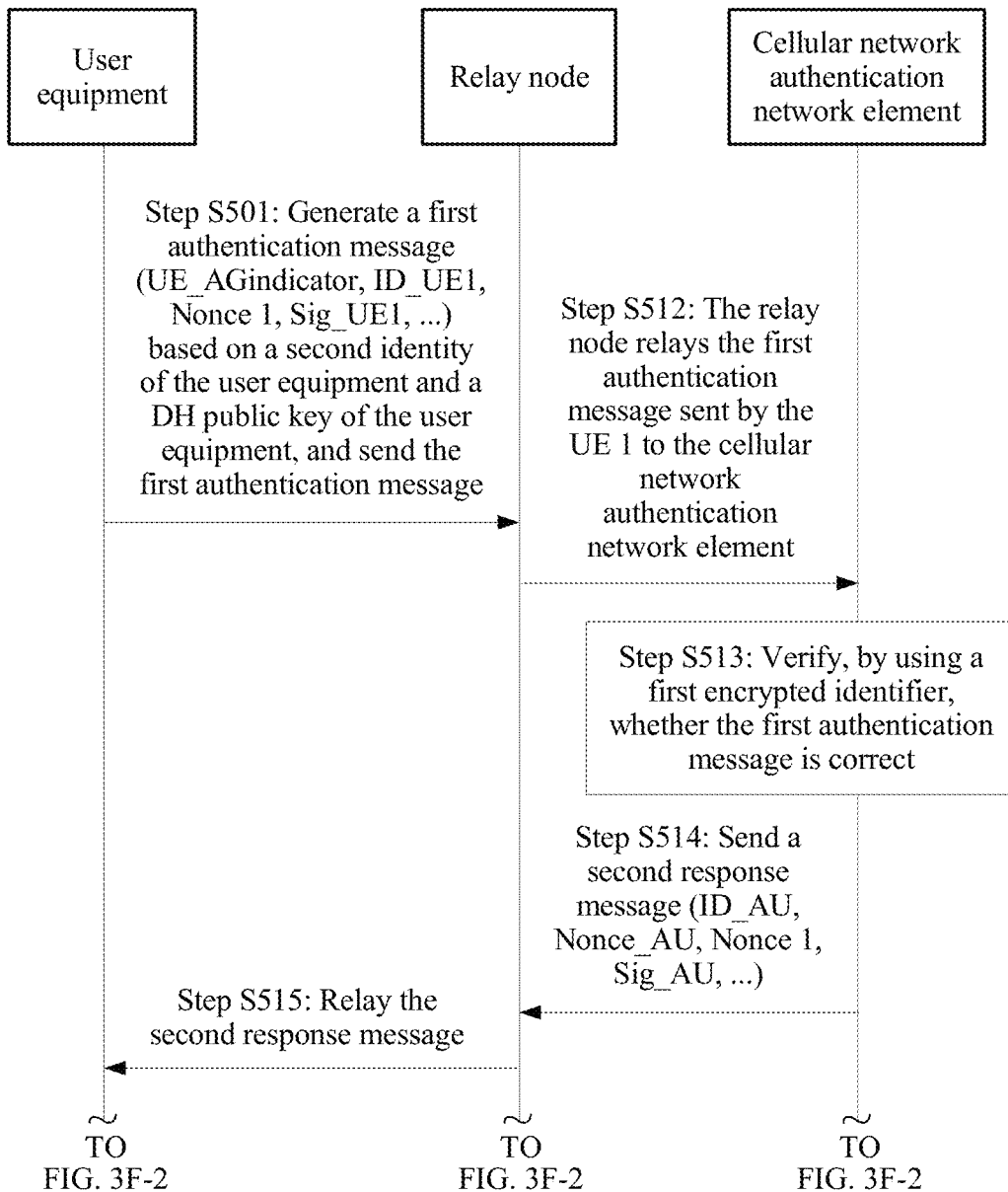
Figures 2, 3F:
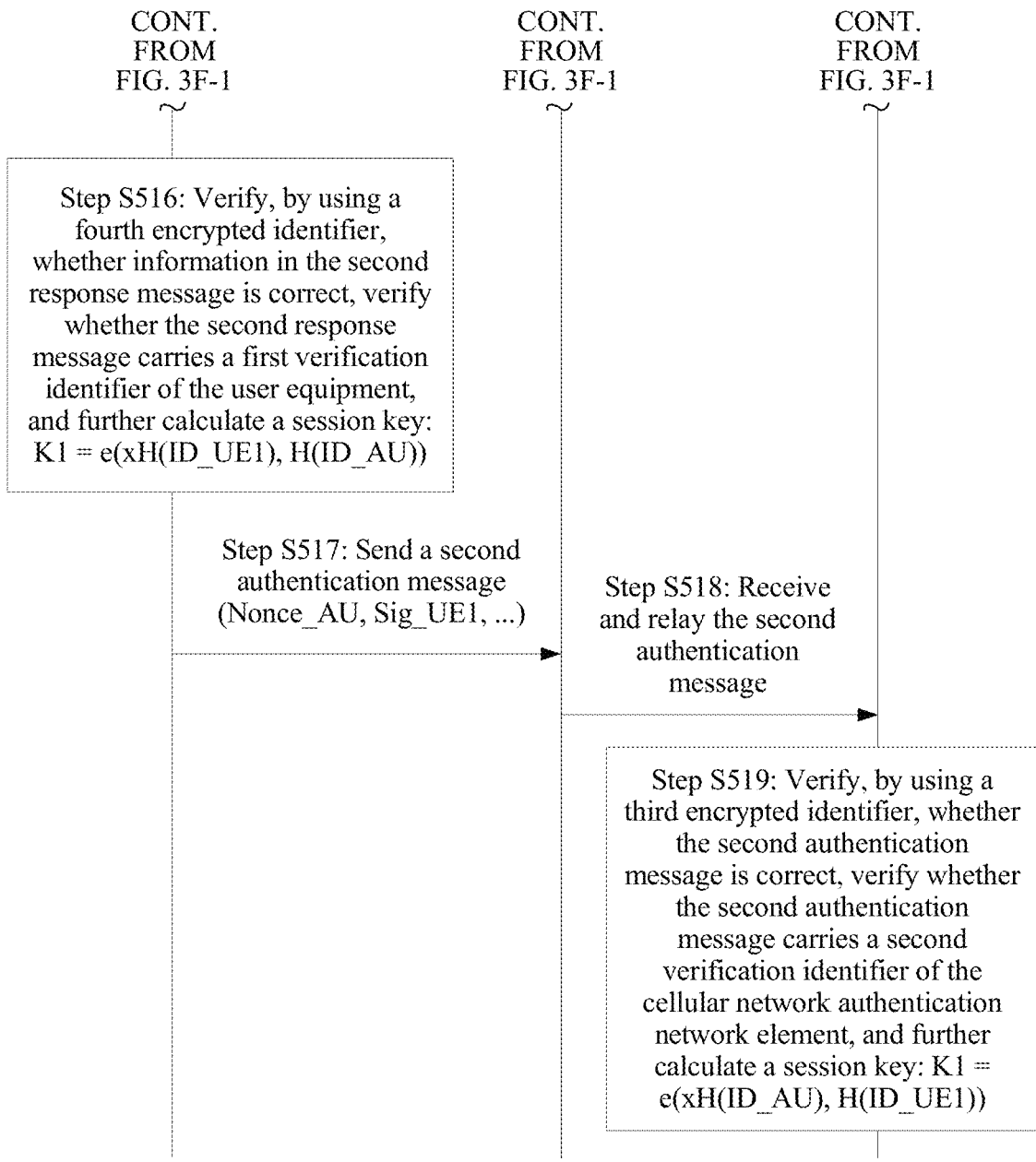

When the preference indicator indicates that the user equipment prefers aggregation of the signature in the first authentication message sent by the user equipment, the procedure of steps 502 to 511 is performed after the relay node learns the preference of the user equipment. Using the UE 1 as an example, when the preference indicator indicates that the UE does not prefer aggregation of the signature in the first authentication message sent by the UE 1, the procedure of steps 512 to S19 in FIG. 3F-1 and FIG. 3F-2 is performed after the relay node learns the nonpreference of the user equipment.

Step S512: The relay node relays the first authentication message sent by the UE 1 to the cellular network authentication network element, where the first authentication message may be (UE_AGindicator, ID_UE1, Nonce 1, Sig_UE1, . . . ), where preference indicator UE_AGindicator indicates that the UE 1 does not prefer aggregation of the signature in the first authentication message of the UE 1, ID_UE1 is the second identity of the UE 1, Nonce 1 is the fresh parameter of the UE 1, " . . . " indicates that other information may also exist in the first authentication message, and the Sig_UE1 is a signature affixed to all or a part of information other than the Sig_UE1 in the first authentication message by using the private key of the user equipment UE 1.

Step S513: The cellular network authentication network element receives the first authentication message sent by the relay node, and verifies the signature Sig_UE1 in the first authentication message based on the information in the first authentication message; if the verification succeeds, it indicates that the information in the first authentication message is correct; and then the cellular network authentication network element generates a fresh parameter Nonce_AU.

Step S514: The cellular network authentication network element sends a second response message to the relay node, where the second response message may be (ID_AU, Nonce_AU, Nonce 1, Sig_AU, . . . ), where ID_AU is a first identity of the cellular network authentication network element, Nonce_AU is the fresh parameter nonce of the cellular network authentication network element, Nonce 1 is the nonce of the UE 1 that is carried in the first authentication message, " . . . " indicates that other information may also exist in the second response message, and Sig_AU is a signature affixed to all or a part of information other than the Sig_AU in the second response message by using a private key of the cellular network authentication network element.

Step S515: The relay node receives the second response message and relays the second response message to the UE 1.

Step S516: The UE 1 receives the second response message, and verifies the signature Sig_AU in the second response message with reference to the information in the second response message; if the signature Sig_AU is verified successfully and the second response message carries the Nonce 1 of the UE 1, it indicates that the information in the second response message is correct; and then the UE 1 generates a session key between the UE 1 and the cellular network authentication network element with reference to the first identity of the cellular network authentication network element and the second identity of the UE 1. For example, the session key is K1=e(xH(ID_UE1), H(ID_AU)), where xH(ID_UE1) is the private key of the UE 1 that is obtained based on the second identity of the UE 1, and H(ID_AU) is a public key of the cellular network authentication network element that is obtained based on the first identity of the cellular network authentication network element. Therefore, it may also be understood that the session key between the UE 1 and the cellular network authentication network element is generated based on the public key of the cellular network authentication network element and the private key of the UE 1.

Step S517: The UE 1 sends a second authentication message to the relay node, where the second authentication message may be (Nonce_AU, Sig_UE1, . . . ), where Nonce_AU is the fresh parameter of the cellular network authentication network element that is carried in the second response message, " . . . " indicates that the second authentication message may further include other information, and Sig_UE1 is a signature affixed to all or a part of information other than the Sig_UE1 in the second authentication message by using the private key of the UE 1.

Step S518: The relay node receives the second authentication message and relays the second authentication message to the cellular network authentication network element.

Step S519: The cellular network authentication network element receives the second authentication message, and verifies the signature Sig_UE1 in the second authentication message with reference to the information in the second authentication message; if the signature Sig_UE1 is verified successfully and the network-side nonce carried in the second authentication message is the Nonce_AU of the cellular network authentication network element, it indicates that the information in the second authentication message is correct; and then the cellular network authentication network element calculates a session key between the cellular network authentication network element and the UE 1 based on the first identity of the cellular network authentication network element and the second identity of the UE 1. For example, the session key is K1=e(xH(ID_AU), H(ID_UE1)), where xH(ID_AU) is the private key of the cellular network authentication network element that is obtained through calculation based on the first identity of the cellular network authentication network element, and H(ID_UE1) is a public key of the UE 1 that is obtained based on the second identity of the UE 1. Therefore, it may also be understood that the cellular network authentication network element calculates the session key between the cellular network authentication network element and the UE 1 based on the private key of the cellular network authentication network element and the public key of the UE 1.

It may be understood that, in the solution described in steps S501 to S519, the second identity may be not only used to identify a source and a destination of a corresponding message, but also used to calculate a session key between the user equipment and the cellular network authentication network element; the first identity may be not only used to identify a source and a destination of a corresponding message, but also used to calculate a session key between the user equipment and the cellular network authentication network element; both the first verification identifier and the second verification identifier are fresh parameters nonces, so that a parameter exchanged between the user equipment and the cellular network authentication network element is updated as time changes, and that security performance is improved.

In another optional solution, the first verification identifier is the fresh parameter nonce of the user equipment; the first authentication message includes the first identity of the cellular network authentication network element; that the relay node is further configured to send a first aggregation message to the cellular network authentication network element is specifically: the relay node is configured to send, based on the first identity, the first aggregation message to the cellular network authentication network element corresponding to the first identity;

the first verification identifier in the first authentication message is encrypted by using the first identity of the cellular network authentication network element, and the cellular network authentication network element is further configured to decrypt the first verification identifier in the first authentication message by using the first identity of the cellular network authentication network element; the first verification identifier in the first response message is encrypted by using the second identity of the user equipment, and the user equipment is further configured to decrypt the first verification identifier in the first response message by using the second identity of the user equipment; the first encrypted identifier is a signature affixed to the information other than the first encrypted identifier in the first authentication message by using the private key of the user equipment; and that the user equipment generates a session key between the user equipment and the cellular network authentication network element is specifically: the user equipment generates the session key between the user equipment and the cellular network authentication network element based on the private key of the user equipment, the first verification identifier of the user equipment, the second verification identifier in the first response message, and the first identity in the first response message.

Figures 1, 3G:
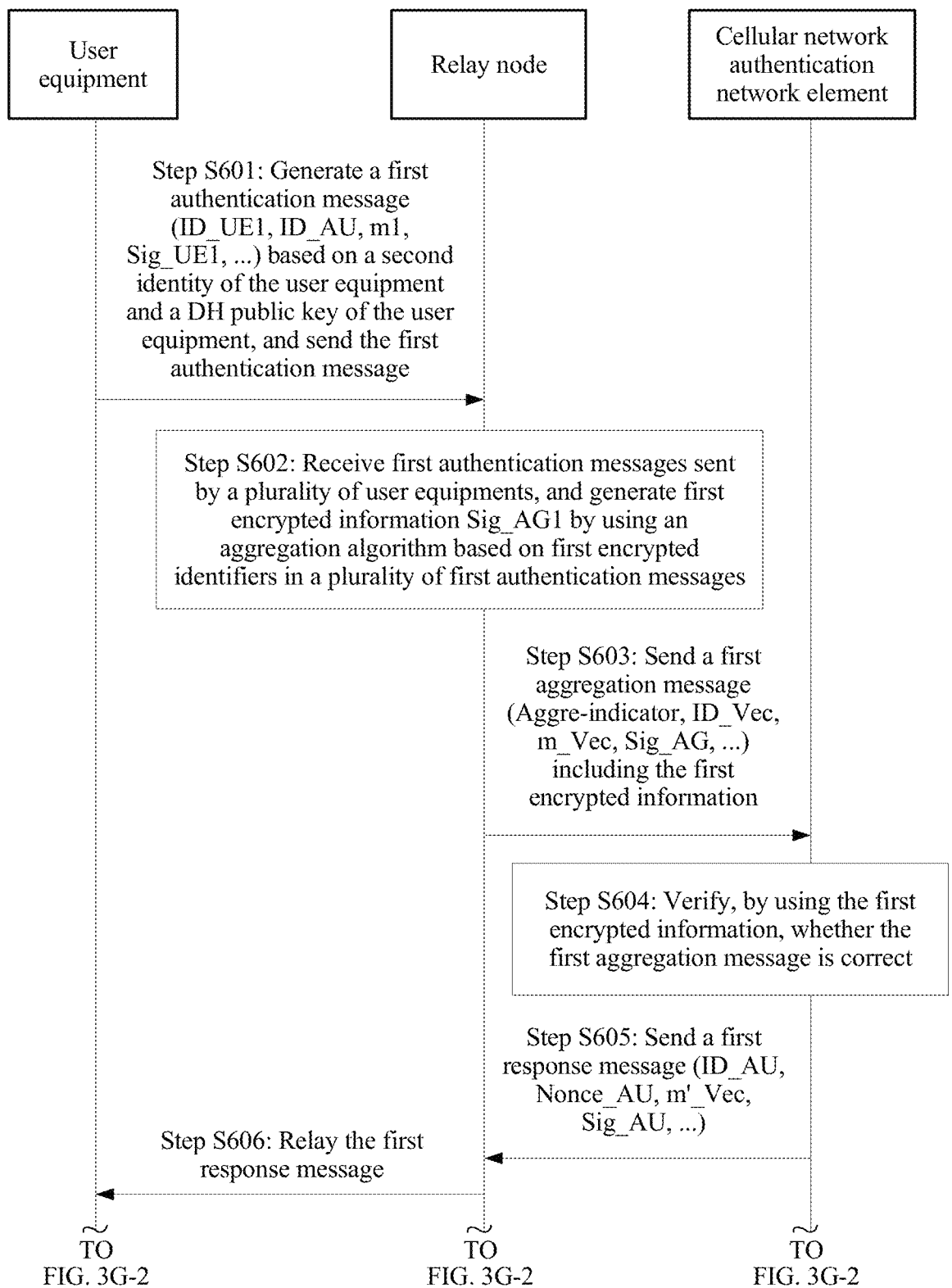
Figures 2, 3G:
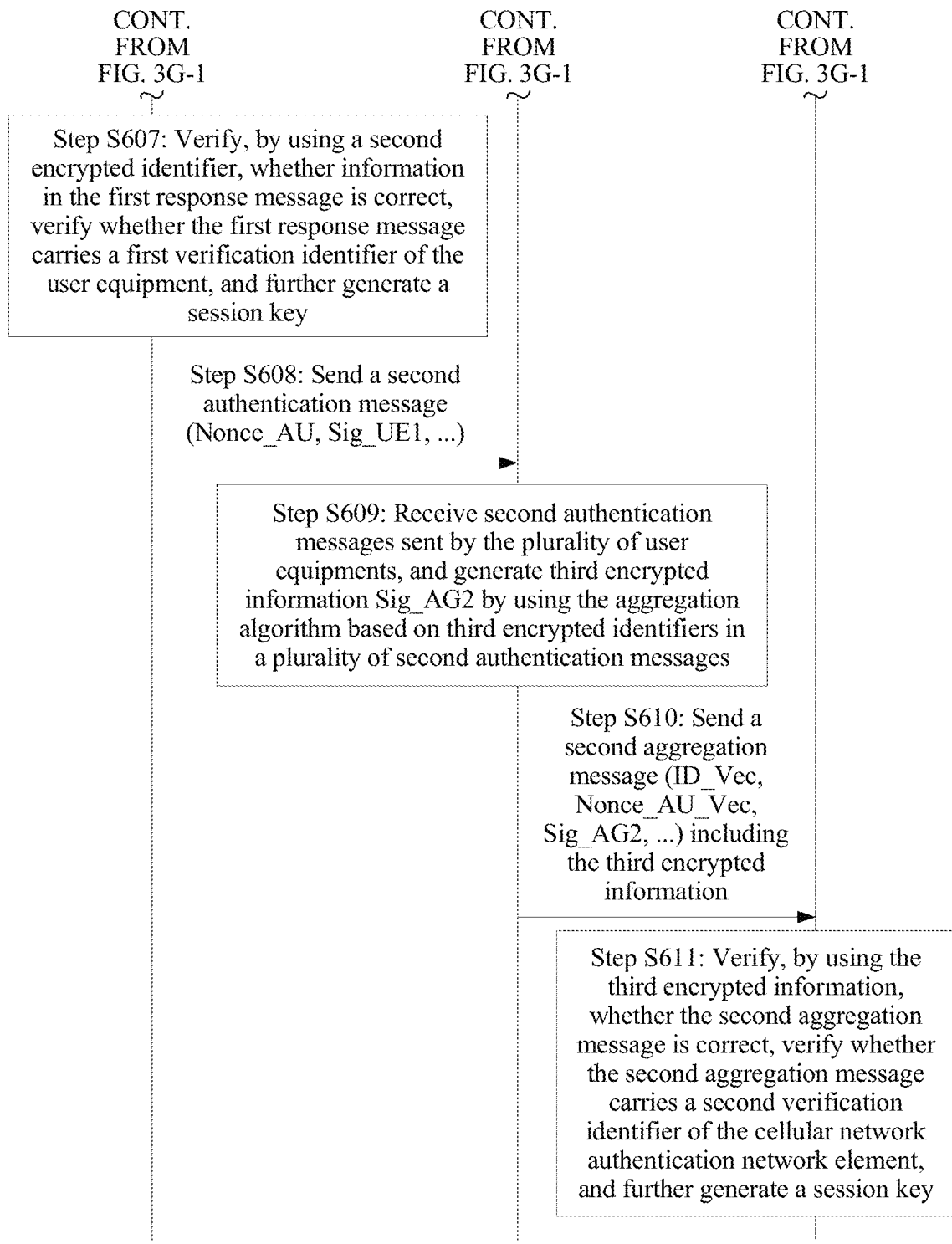

The second verification identifier is the nonce of the cellular network authentication network element, and the second encrypted identifier is a signature affixed to the information other than the second encrypted identifier in the first response message by using the private key of the cellular network authentication network element. The following uses steps S601 to S611 in FIG. 3G-1 and FIG. 3G-2 as an example for description.

Step S601: Each user equipment generates a first authentication message based on a second identity of the user equipment, a fresh parameter nonce of the user equipment, and a first identity of the cellular network authentication network element that is learned in advance, and sends the first authentication message to the relay node, where the first authentication message includes the second identity, the first identity, the nonce of the user equipment that is encrypted by using the first identity, and a first encrypted identifier, where the first password identifier is a signature affixed to all or a part of information other than the first password identifier in the first authentication message by using a private key of the corresponding user equipment. For example:

1a. UE 1 generates a first authentication message and sends the first authentication message to the relay node, where the first authentication message may be (ID_UE1, ID_AU, m1, Sig_UE1, . . . ), where ID_UE1 is a second identity of the UE 1, ID_AU is a first identity of the cellular network authentication network element, m1 is a fresh parameter Nonce 1 of the UE 1 that is encrypted by using the first identity (to be specific, a public key of the cellular network authentication network element), " . . . " indicates that other information may exist in the first authentication message, and Sig_UE1 is a signature affixed to the ID_UE1, the ID_AU, and the m1 by using a private key of the UE 1.

1b. UE 2 generates a first authentication message and sends the first authentication message to the relay node, where the first authentication message may be (ID_UE2, ID_AU, m2, Sig_UE2, . . . ), where ID_UE2 is a second identity of the UE 2, ID_AU is the first identity of the cellular network authentication network element, m2 is a fresh parameter Nonce 2 of the UE 2 that is encrypted by using the first identity (to be specific, the public key of the cellular network authentication network element), " . . . " indicates that other information may exist in the first authentication message, and Sig_UE2 is a signature affixed to the ID_UE2, the ID_AU, and the m2 by using a private key of the UE 2.

Step S602: The relay node receives the first authentication messages sent by the user equipments, and performs an aggregation operation on signatures in the received first authentication messages of the user equipments to generate an aggregated signature Sig_AG1, where the aggregated signature is the foregoing first encrypted information. When the user equipments are specifically the UE 1 and the UE 2, the relay node aggregates the signature in the first authentication message of the UE 1 and the signature in the first authentication message of the UE 2 to obtain an aggregated signature. For example, the aggregated signature is Sig_AG1=f(Sig_UE1, Sig_UE2). Optionally, a data length of the aggregated signature is the same as a data length of a separate signature of each user equipment.

Step S603: The relay node generates a first aggregation message and sends the first aggregation message to the cellular network authentication network element (Authenticator). The first aggregation message may be (Aggre-indicator, ID_Vec, m_Vec, Sig_AG . . . ), where Aggre-indicator is an aggregate authentication indicator, used to indicate that the message is an aggregate authentication request message, ID_Vec includes the second identity of each user equipment, m_Vec includes the fresh parameter nonce of each user equipment that is encrypted by using the first identity, " . . . " corresponds to other information that may exist in the first authentication message, and Sig_AG is the aggregated signature. It should be noted that, the first identity in the first authentication message may be used to instruct the relay node to send the first aggregation message to the cellular network authentication network element corresponding to the first identity.

Step S604: The cellular network authentication network element receives the first aggregation message, decrypts the fresh parameter of each user equipment from the first aggregation message based on the first identity of the cellular network authentication network element, and verifies the aggregated signature Sig_AG1 with reference to information in the first aggregation message. If the verification succeeds, it indicates that the information in the first aggregation message is correct. It should be noted that, at least two network authentication modes, that is, aggregate authentication and non-aggregate authentication, may be preconfigured for the cellular network authentication network element. The cellular network authentication network element may determine, based on the aggregate authentication indicator Aggre-indicator in the first aggregation message, that the signature in the first aggregation message needs to be verified by using an aggregate authentication related policy.

Step S605: The cellular network authentication network element sends a first response message to the relay node, where the first response message may be (ID_AU, Nonce_AU, m'_Vec, Sig_AU, . . . ), where ID_AU is the first identity of the cellular network authentication network element, Nonce_AU is a fresh parameter nonce of the cellular network authentication network element, m'_Vec includes the fresh parameter of each user equipment and the fresh parameter of each user equipment is encrypted by using the second identity of each user equipment, " . . . " indicates that other information may exist in the first response message, Sig_AU is a signature affixed to all or a part of information other than the Sig_AU in the first response message by using a private key of the cellular network authentication network element, and the Sig_AU is the second password identifier described above.

Step S606: The relay node receives the first response message, and relays the first response message to each user equipment UE separately. For example:

6a. The relay node relays the first response message to the UE 1.

6b. The relay node relays the first response message to the UE 2.

Step S607: Each user equipment separately receives the first response message relayed by the relay node, decrypts the fresh parameter from the first response message by using the second identity of the user equipment, and verifies the signature Sig_AU with reference to the information in the first response message; if the signature Sig_AU is verified successfully and the nonce of the user equipment is decrypted, it indicates that the information in the first response message is correct; and then the user equipment generates a session key between the user equipment and the cellular network authentication network element with reference to the first identity of the cellular network authentication network element, the second identity of the user equipment, the fresh parameter of the user equipment, and the fresh parameter of the cellular network authentication network element. Because the first identity is the public key of the cellular network authentication network element, the private key of the user equipment may be obtained by using an identity based signature technology (IBS) to process the second identity of the user equipment. Therefore, it may also be understood that the session key between the user equipment and the cellular network authentication network element is generated with reference to the public key of the cellular network authentication network element, the private key of the user equipment, the fresh parameter of the cellular network authentication network element, and the fresh parameter of the user equipment. For example:

7a. The UE 1 decrypts the fresh parameter from the first response message by using the second identity of the UE 1, verifies the signature Sig_AU, and if the signature Sig_AU is verified successfully and the fresh parameter is decrypted, generates a session key between the UE 1 and the cellular network authentication network element with reference to the first identity of the cellular network authentication network element, the second identity of the UE 1, the fresh parameter of the cellular network authentication network element, and the fresh parameter of the UE 1. For example, the session key is K1'=KDF(K1, Nonce 1, Nonce_AU) and K1=e(xH(ID_UE1), H(ID_AU)), where xH(ID_UE1) is the private key of the UE 1 that is obtained based on the second identity of the UE 1, and H(ID_AU) is the public key of the cellular network authentication network element that is obtained based on the first identity of the cellular network authentication network element. Therefore, it may also be understood that the session key between the UE 1 and the cellular network authentication network element is generated based on the public key of the cellular network authentication network element, the private key of the UE 1, the fresh parameter of the cellular network authentication network element, and the fresh parameter of the UE 1.

7b. The UE 2 decrypts the fresh parameter from the first response message by using the second identity of the UE 2, verifies the signature Sig_AU, and if the signature Sig_AU is verified successfully and the fresh parameter of the UE 2 is decrypted, generates a session key between the UE 2 and the cellular network authentication network element with reference to the first identity of the cellular network authentication network element, the second identity of the UE 2, the fresh parameter of the cellular network authentication network element, and the fresh parameter of the UE 2. For example, the session key is K2'=KDF(K2, Nonce 2, Nonce_AU) and K2=e(xH(ID_UE2), H(ID_AU)), where xH(ID_UE2) is the private key of the UE 2 that is obtained based on the second identity of the UE 2, and H(ID_AU) is the public key of the cellular network authentication network element that is obtained based on the first identity of the cellular network authentication network element. Therefore, it may also be understood that the session key between the UE 2 and the cellular network authentication network element is generated based on the public key of the cellular network authentication network element, the private key of the UE 2, the fresh parameter of the cellular network authentication network element, and the fresh parameter of the UE 2.

Step S608: If each user equipment verifies the signature Sig_AU successfully and decrypts the nonce of the user equipment from the first response message, each user equipment sends a second authentication message to the relay node separately, where the second authentication message includes a DH public key of the cellular network authentication network element and a third password identifier, and the third password identifier is a signature affixed to a part or all of information other than the third password identifier in the second authentication message by using the private key of the user equipment. For example:

8a. The UE 1 sends a second authentication message (Nonce_AU, Sig_UE1, . . . ) to the relay node, where Nonce_AU is the nonce of the cellular network authentication network element, " . . . " indicates that the second authentication message may include other information, and Sig_UE1 is a signature affixed to the fresh parameter Nonce_AU of the cellular network authentication network element by using the private key of the UE 1.

8b. The UE 2 sends a second authentication message (Nonce_AU, Sig_UE2, . . . ) to the relay node, where Nonce_AU is the nonce of the cellular network authentication network element, " . . . " indicates that the second authentication message may include other information, and Sig_UE2 is a signature affixed to the fresh parameter Nonce_AU of the cellular network authentication network element by using the private key of the UE 2.

Step S609: The relay node receives the second authentication message, and performs an aggregation operation on the third password identifier (that is, the signature) in each received second authentication message to generate a new aggregated signature Sig_AG2.

Step S610: The relay node sends the second aggregation message to the cellular network authentication network element, where the second aggregation message may be (ID_Vec, Nonce_AU_Vec, Sig_AG2, . . . ), where ID_Vec includes the second identity of each user equipment, Nonce_AU_Vec includes the nonce of the cellular network authentication network element that is sent by each user equipment to the relay node, " . . . " corresponds to other information that may exist in the second authentication message, and the Sig_AG2 is the aggregated signature.

Step S611: The cellular network authentication network element verifies the aggregated signature Sig_AG2 in the second aggregation message with reference to information in the second aggregation message, and if the aggregated signature Sig_AG2 is verified successfully and all network-side nonces carried in the second aggregation message are the Nonce_AU of the cellular network authentication network element, generates a session key between the cellular network authentication network element and each user equipment with reference to the first identity of the cellular network authentication network element, the fresh parameter of the cellular network authentication network element, the second identity of each user equipment in the plurality of user equipments, and the fresh parameter of each user equipment in the plurality of user equipments. For example:

11a. The cellular network authentication network element calculates a session key between the cellular network authentication network element and the UE 1 based on the first identity of the cellular network authentication network element, the fresh parameter of the cellular network authentication network element, the second identity of the UE 1, and the fresh parameter of the UE 1. For example, the session key is K1'=KDF(K1, Nonce 1, Nonce_AU) and K1=e(xH(ID_AU), H(ID_UE1)), where xH(ID_AU) is the private key of the cellular network authentication network element that is obtained through calculation based on the first identity of the cellular network authentication network element, H(ID_UE1) is a public key of the UE 1 that is obtained based on the second identity of the UE 1, Nonce 1 is the fresh parameter nonce of the UE 1, and Nonce_AU is the fresh parameter nonce of the cellular network authentication network element. Therefore, it may also be understood that the cellular network authentication network element calculates the session key between the cellular network authentication network element and the UE 1 based on the private key of the cellular network authentication network element, the fresh parameter of the cellular network authentication network element, the public key of the UE 1, and the fresh parameter of the UE 1.

11b. The cellular network authentication network element calculates a session key between the cellular network authentication network element and the UE 2 based on the first identity of the cellular network authentication network element, the fresh parameter of the cellular network authentication network element, the second identity of the UE 2, and the fresh parameter of the UE 2. For example, the session key is K2'=KDF(K2, Nonce 2, Nonce_AU) and K2=e(xH(ID_AU), H(ID_UE2)), where xH(ID_AU) is the private key of the cellular network authentication network element that is obtained through calculation based on the first identity of the cellular network authentication network element, H(ID_UE2) is a public key of the UE 2 that is obtained based on the second identity of the UE 2, Nonce 2 is the fresh parameter nonce of the UE 2, and Nonce_AU is the fresh parameter nonce of the cellular network authentication network element. Therefore, it may also be understood that the cellular network authentication network element calculates the session key between the cellular network authentication network element and the UE 2 based on the private key of the cellular network authentication network element, the fresh parameter of the cellular network authentication network element, the public key of the UE 2, and the fresh parameter of the UE 2.

With reference to steps 601 to 611, the foregoing describes how to aggregate the signature in the first authentication message sent by each user equipment to reduce data overheads. For some reason, some user equipments may not expect that signatures in first authentication messages sent by the user equipments are aggregated by the relay node. Therefore, the first authentication message in the foregoing step 601 may further include a preference indicator UE_AGindicator, where the preference indicator UE_AGindicator is used to represent whether the user equipment that sends the first authentication message prefers aggregation of the signature in the first authentication message. For example, when UE_AGindicator=1, it indicates a preference for aggregation; or when UE_AGindicator=0, it indicates a nonpreference for aggregation.

Figures 1, 3H:
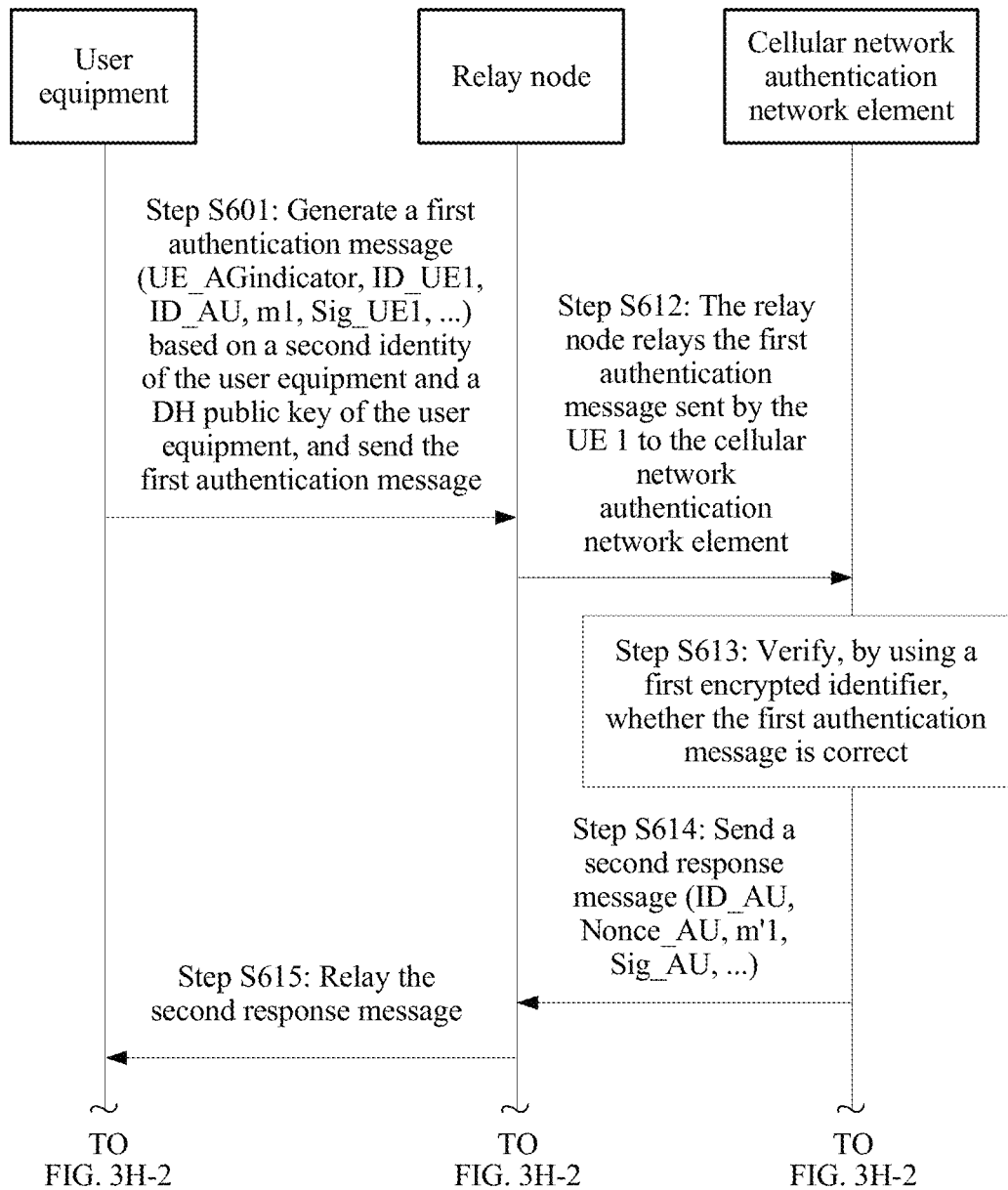
Figures 2, 3H:
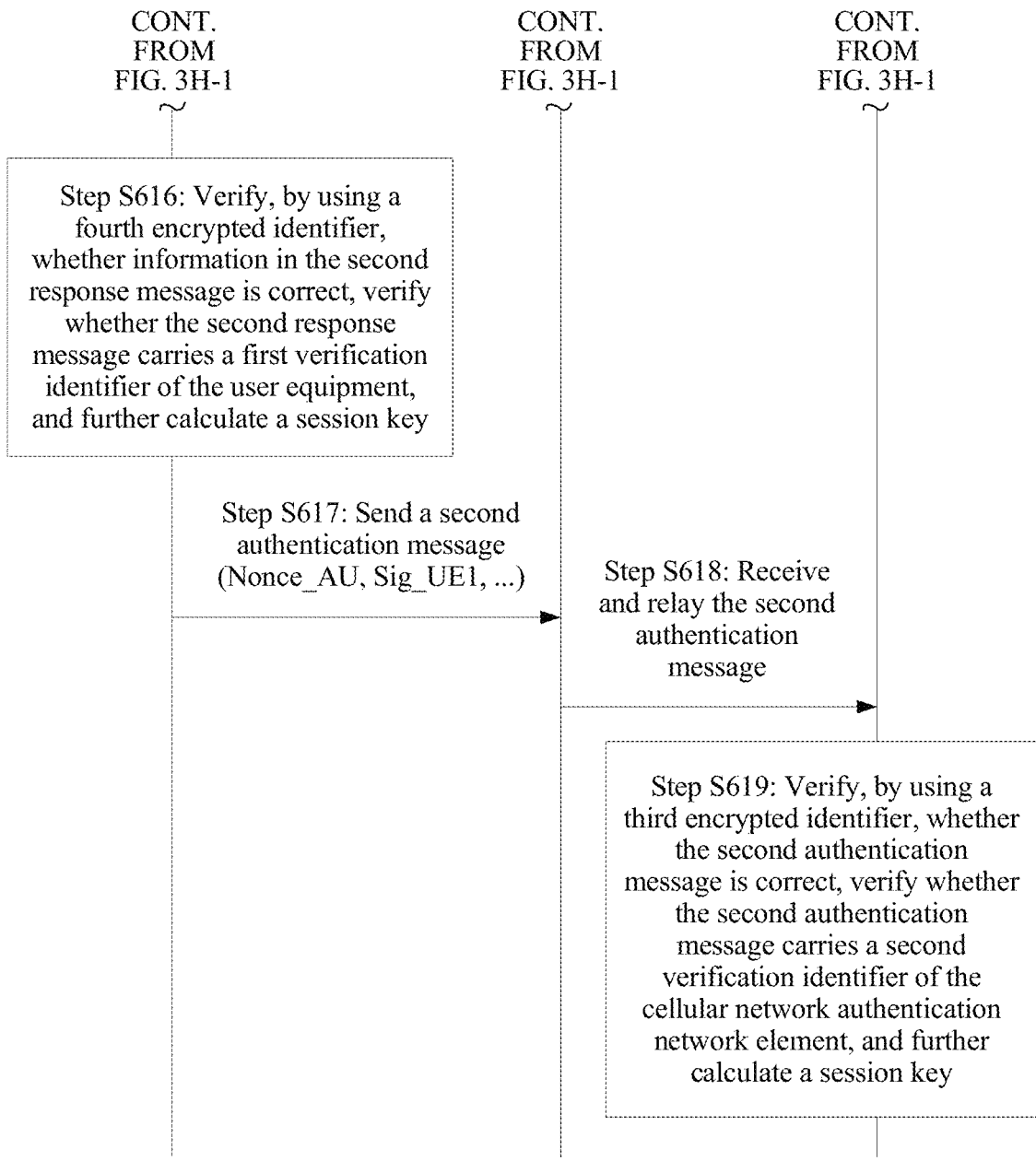

When the preference indicator indicates that the user equipment prefers aggregation of the signature in the first authentication message sent by the user equipment, the procedure of steps 602 to 611 is performed after the relay node learns the preference of the user equipment. Using the UE 1 as an example, when the preference indicator indicates that the UE does not prefer aggregation of the signature in the first authentication message sent by the UE 1, the procedure of steps 612 to 619 in FIG. 3H-1 and FIG. 3H-2 is performed after the relay node learns the nonpreference of the user equipment.

Step S612: The relay node relays the first authentication message sent by the UE 1 to the cellular network authentication network element, where the first authentication message may be (UE_AGindicator, ID_UE1, ID_AU, m1, Sig_UE1, . . . ), where ID_UE1 is the second identity of the UE 1, ID_AU is the first identity of the cellular network authentication network element, m1 is the fresh parameter Nonce 1 of the UE 1 that is encrypted by using the first identity (that is, the public key of the cellular network authentication network element), " . . . " indicates that other information may exist in the first authentication message, and Sig_UE1 is a signature affixed to all or a part of information other than the Sig_UE1 in the first authentication message by using the private key of the UE 1.

Step S613: The cellular network authentication network element receives the first authentication message sent by the relay node, and decrypts the fresh parameter of the UE 1 from the first authentication message based on the first identity of the cellular network authentication network element; the cellular network authentication network element may calculate the K1 based on the first identity of the cellular network authentication network element and the second identity of the UE 1 in the first authentication message; and the cellular network authentication network element further verifies the signature Sig_UE1 in the first authentication message based on the information in the first authentication message, and if the verification succeeds, it indicates that the information in the first authentication message is correct, and then the cellular network authentication network element generates a fresh parameter Nonce_AU.

Step S614: The cellular network authentication network element sends a second response message to the relay node, where the second response message may be (ID_AU, Nonce_AU, m' 1, Sig_AU, . . . ), where ID_AU is the first identity of the cellular network authentication network element, Nonce_AU is the fresh parameter nonce of the cellular network authentication network element, m'1 is the fresh parameter of the UE 1 and the fresh parameter is encrypted by using the second identity of the UE 1, " . . . " indicates that other information may also exist in the second response message, and Sig_AU is a signature affixed to all or a part of information other than the Sig_AU in the second response message by using a private key of the cellular network authentication network element.

Step S615: The relay node receives the second response message and relays the second response message to the UE 1.

Step S616: The UE 1 receives the second response message; the UE 1 decrypts the fresh parameter from the second response message by using the second identity of the UE 1, and verifies the signature Sig_AU in the second response message with reference to the information in the second response message; if the signature Sig_AU is verified successfully and the fresh parameter Nonce 1 of the UE 1 is decrypted, it indicates that the information in the second response message is correct; and then the UE 1 generates a session key between the UE 1 and the cellular network authentication network element with reference to the first identity of the cellular network authentication network element, the second identity of the UE 1, the fresh parameter of the cellular network authentication network element, and the fresh parameter of the UE 1. For example, the session key is K1'=KDF(K1, Nonce 1, Nonce_AU) and K1=e(xH (ID_UE1), H(ID_AU)), where xH(ID_UE1) is the private key of the UE 1 that is obtained based on the second identity of the UE 1, and H(ID_AU) is the public key of the cellular network authentication network element that is obtained based on the first identity of the cellular network authentication network element. Therefore, it may also be understood that the session key between the UE 1 and the cellular network authentication network element is generated based on the public key of the cellular network authentication network element, the private key of the UE 1, the fresh parameter of the cellular network authentication network element, and the fresh parameter of the UE 1.

Step S617: The UE 1 sends a second authentication message to the relay node, where the second authentication message may be (Nonce_AU, Sig_UE1, . . . ), where Nonce_AU is the fresh parameter of the cellular network authentication network element that is carried in the second response message, " . . . " indicates that the second authentication message may further include other information, and Sig_UE1 is a signature affixed to all or a part of information other than the Sig_UE1 in the second authentication message by using the private key of the UE 1.

Step S618: The relay node receives the second authentication message and relays the second authentication message to the cellular network authentication network element.

Step S619: The cellular network authentication network element receives the second authentication message, and verifies the signature Sig_UE1 in the second authentication message with reference to the information in the second authentication message; if the signature Sig_UE1 is verified successfully and the network-side nonce carried in the second authentication message is the Nonce_AU of the cellular network authentication network element, it indicates that the information in the second authentication message is correct; and then the cellular network authentication network element calculates a session key between the cellular network authentication network element and the UE 1 based on the first identity of the cellular network authentication network element, the fresh parameter of the cellular network authentication network element, the second identity of the UE 1, and the fresh parameter of the UE 1. For example, the session key is K1'=KDF(K1, Nonce 1, Nonce_AU) and K1=e(xH(ID_AU), H(ID_UE1)), where xH(ID_AU) is the private key of the cellular network authentication network element that is obtained through calculation based on the first identity of the cellular network authentication network element, H(ID_UE1) is a public key of the UE 1 that is obtained based on the second identity of the UE 1, Nonce 1 is the fresh parameter nonce of the UE 1, and Nonce_AU is the fresh parameter nonce of the cellular network authentication network element. Therefore, it may also be understood that the cellular network authentication network element calculates the session key between the cellular network authentication network element and the UE 1 based on the private key of the cellular network authentication network element, the fresh parameter of the cellular network authentication network element, the public key of the UE 1, and the fresh parameter of the UE 1.

It may be understood that, in the solution described in steps S601 to S619, the second identity may be not only used to identify a source and a destination of a corresponding message, but also used to calculate a session key between the user equipment and the cellular network authentication network element; the first identity may be not only used to identify a source and a destination of a corresponding message, but also used to calculate a session key between the user equipment and the cellular network authentication network element; both the first verification identifier and the second verification identifier are fresh parameters nonces, so that a parameter exchanged between the user equipment and the cellular network authentication network element is updated as time changes, and that security performance is improved; the second identity and the first identity may be further used to encrypt the first verification identifier carried in exchanged information, so that security performance is further improved.

In another optional solution, the first verification identifier is the nonce of the user equipment; the first authentication message includes the first identity of the cellular network authentication network element; that the relay node is further configured to send a first aggregation message to the cellular network authentication network element is specifically: the relay node is configured to send, based on the first identity, the first aggregation message to the cellular network authentication network element corresponding to the first identity;

the first verification identifier in the first authentication message is encrypted by using a prestored symmetric key between the user equipment and the cellular network authentication network element, and the cellular network authentication network element is configured to decrypt the first verification identifier by using the prestored symmetric key between the user equipment and the cellular network authentication network element; the first verification identifier in the first response message is encrypted by using the prestored symmetric key between the user equipment and the cellular network authentication network element, and the user equipment is configured to decrypt the first verification identifier by using the prestored symmetric key between the user equipment and the cellular network authentication network element;

the first encrypted identifier is a signature affixed to the information other than the first encrypted identifier in the first authentication message by using the private key of the user equipment; and that the user equipment generates a session key between the user equipment and the cellular network authentication network element is specifically: the user equipment generates the session key between the user equipment and the cellular network authentication network element based on the private key of the user equipment, the first verification identifier of the user equipment, the second verification identifier in the first response message, and the first identity in the first response message.

Figures 1, 3I:
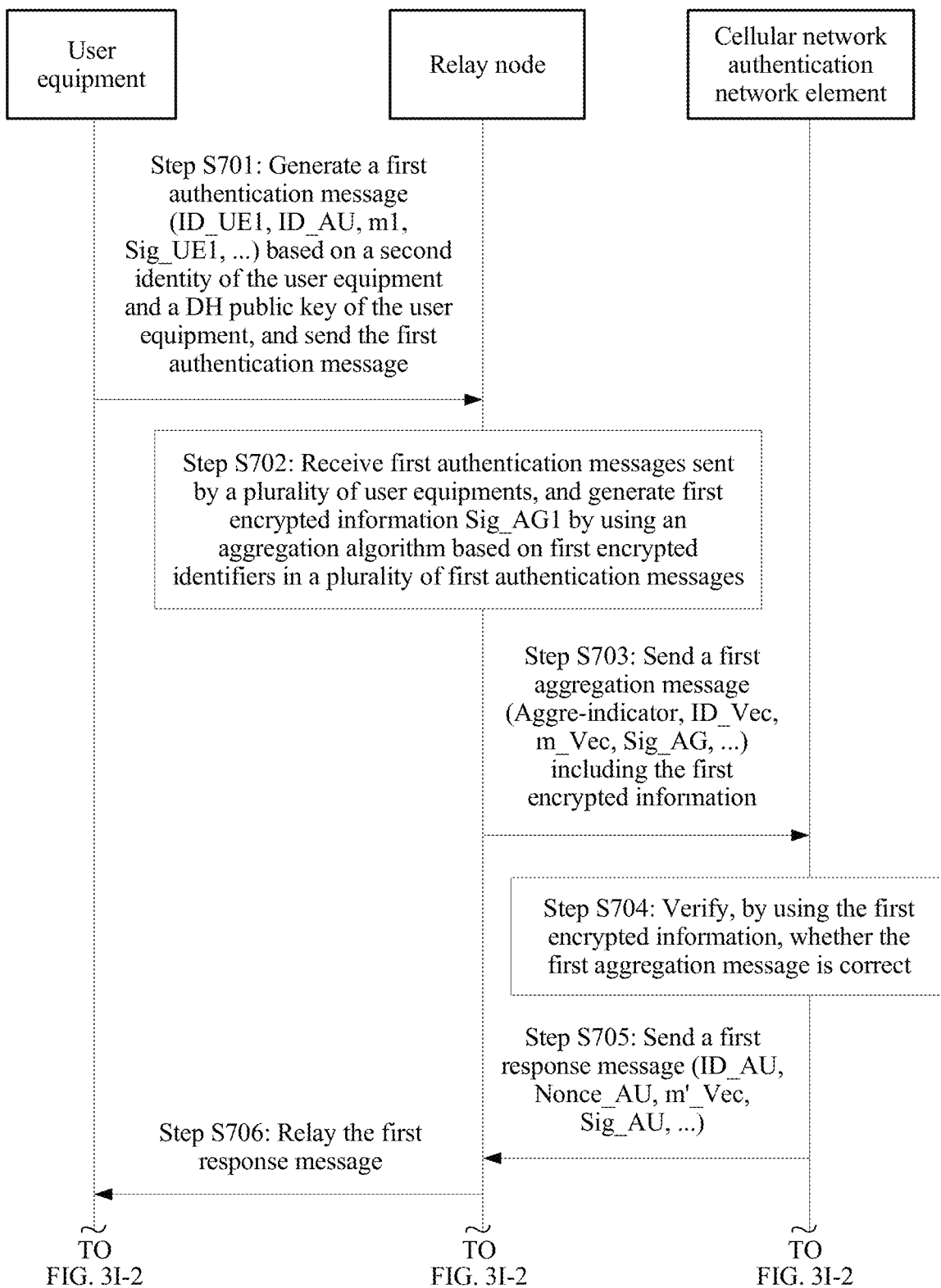
Figures 2, 3I:
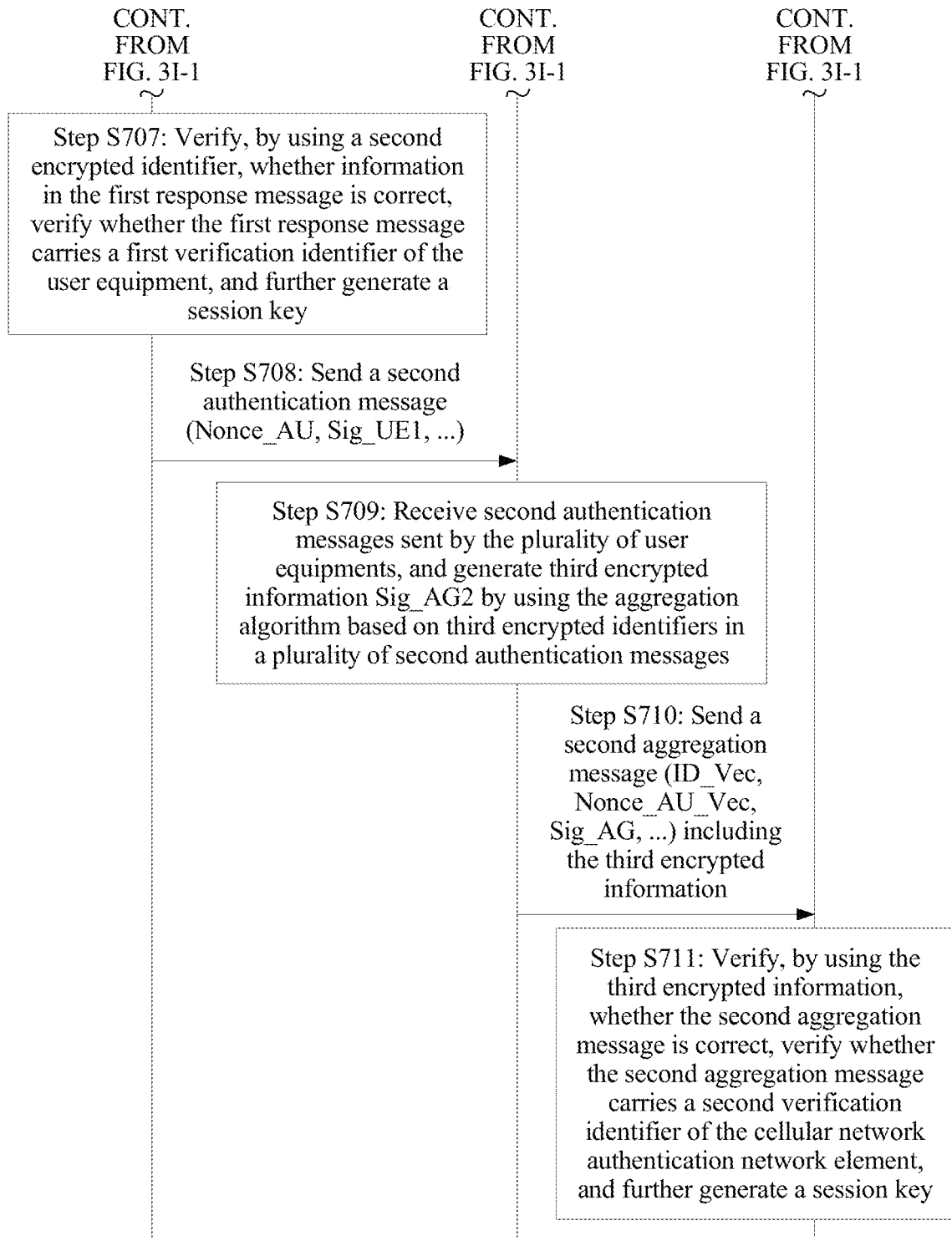

The second verification identifier is the nonce of the cellular network authentication network element, and the second encrypted identifier is a signature affixed to the information other than the second encrypted identifier in the first response message by using the private key of the cellular network authentication network element. The following uses steps S701 to S711 in FIG. 3I-1 and FIG. 3I-2 as an example for description.

Step S701: Each user equipment generates a first authentication message based on a second identity of the user equipment, a fresh parameter nonce of the user equipment, and a first identity of the cellular network authentication network element that is learned in advance, and sends the first authentication message to the relay node, where the first authentication message includes the second identity, the first identity, the nonce of the user equipment that is encrypted by using a symmetric key between the corresponding user equipment and the cellular network authentication network element, and a first encrypted identifier, where the first password identifier is a signature affixed to all or a part of information other than the first password identifier in the first authentication message by using a private key of the corresponding user equipment. For example:

1a. UE 1 generates a first authentication message and sends the first authentication message to the relay node, where the first authentication message may be (ID_UE1, ID_AU, m1, Sig_UE1, . . . ), where ID_UE1 is a second identity of the UE 1, ID_AU is the first identity of the cellular network authentication network element, m1 is a fresh parameter Nonce 1 of the UE 1 that is encrypted by using a symmetric key K1 between the UE 1 and the cellular network authentication network element, " . . . " indicates that other information may exist in the first authentication message, and Sig_UE1 is a signature affixed to the ID_UE1, the ID_AU, and the m1 by using a private key of the UE 1. The symmetric key K1 is obtained through calculation based on an IBS technology with reference to the second identity ID_UE1 of the UE 1 and the first identity ID_AU of the cellular network authentication network element. For example, the symmetric key is K1=e(xH(ID_UE1), H(ID_AU)).

1b UE 2 generates a first authentication message and sends the first authentication message to the relay node, where the first authentication message may be (ID_UE2, ID_AU, m2, Sig_UE2, . . . ), where ID_UE2 is a second identity of the UE 2, ID_AU is the first identity of the cellular network authentication network element, m2 is a fresh parameter Nonce 2 of the UE 2 that is encrypted by using a symmetric key K2 between the UE 2 and the cellular network authentication network element, " . . . " indicates that other information may exist in the first authentication message, and Sig_UE2 is a signature affixed to the ID_UE2, the ID_AU, and the m2 by using a private key of the UE 2. The symmetric key K2 is obtained through calculation based on the IBS technology with reference to the second identity ID_UE2 of the UE 1 and the first identity ID_AU of the cellular network authentication network element. For example, the symmetric key is K2=e(xH(ID_UE2), H(ID_AU)).

Step S702: The relay node receives the first authentication messages sent by the user equipments, and performs an aggregation operation on signatures in the received first authentication messages of the user equipments to generate an aggregated signature Sig_AG1, where the aggregated signature is the foregoing first encrypted information. When the user equipments are specifically the UE 1 and the UE 2, the relay node aggregates the signature in the first authentication message of the UE 1 and the signature in the first authentication message of the UE 2 to obtain an aggregated signature. For example, the aggregated signature is Sig_AG1=f(Sig_UE1, Sig_UE2). Optionally, a data length of the aggregated signature is the same as a data length of a separate signature of each user equipment.

Step S703: The relay node generates a first aggregation message and sends the first aggregation message to the cellular network authentication network element (Authenticator). The first aggregation message may be (Aggre-indicator, ID_Vec, m_Vec, Sig_AG . . . ), where Aggre-indicator is an aggregate authentication indicator, used to indicate that the message is an aggregate authentication request message, ID_Vec includes the second identity of each user equipment, m_Vec includes the fresh parameter nonce of each user equipment that is encrypted by using the corresponding symmetric key, " . . . " corresponds to other information that may exist in the first authentication message, and the Sig_AG is the aggregated signature. It should be noted that, the first identity in the first authentication message may be used to instruct the relay node to send the first aggregation message to the cellular network authentication network element corresponding to the first identity.

Step S704: The cellular network authentication network element receives the first aggregation message, and decrypts the fresh parameter of each user equipment from the first aggregation message based on the corresponding symmetric key, for example, decrypts the fresh parameter of the UE 1 based on the symmetric key K1, and decrypts the fresh parameter of the UE 2 based on the symmetric key K2. The cellular network authentication network element may calculate the K1 based on the first identity of the cellular network authentication network element and the second identity of the UE 1 in the first aggregation message, and calculate the K2 based on the first identity of the cellular network authentication network element and the second identity of the UE 2 in the first aggregation message, and so on. The cellular network authentication network element further verifies the aggregated signature Sig_AG1 with reference to information in the first aggregation message. If the verification succeeds, it indicates that the information in the first aggregation message is correct. It should be noted that, at least two network authentication modes, that is, aggregate authentication and non-aggregate authentication, may be preconfigured for the cellular network authentication network element. The cellular network authentication network element may determine, based on the aggregate authentication indicator Aggre-indicator in the first aggregation message, that the signature in the first aggregation message needs to be verified by using an aggregate authentication related policy.

Step S705: The cellular network authentication network element sends a first response message to the relay node, where the first response message may be (ID_AU, Nonce_AU, m'_Vec, Sig_AU, . . . ), where ID_AU is the first identity of the cellular network authentication network element, Nonce_AU is a fresh parameter nonce of the cellular network authentication network element, m'_Vec includes the fresh parameter of each user equipment and the fresh parameter of each user equipment is encrypted by using the symmetric key of the user equipment, for example, the included fresh parameter of the UE 1 is encrypted by using the K1, and the included fresh parameter of the UE 2 is encrypted by using the K2, " . . . " indicates that other information may exist in the first response message, Sig_AU is a signature affixed to all or a part of information other than the Sig_AU in the first response message by using a private key of the cellular network authentication network element, and the Sig_AU is the second password identifier described above.

Step S706: The relay node receives the first response message, and relays the first response message to each user equipment UE separately. For example:

6a. The relay node relays the first response message to the UE 1.

6b. The relay node relays the first response message to the UE 2.

Step S707: Each user equipment separately receives the first response message relayed by the relay node, decrypts the fresh parameter from the first response message by using the corresponding symmetric key of the user equipment, and verifies the signature Sig_AU with reference to the information in the first response message; if the signature Sig_AU is verified successfully and the nonce of the user equipment is decrypted, it indicates that the information in the first response message is correct; and then the user equipment generates a session key between the user equipment and the cellular network authentication network element with reference to the first identity of the cellular network authentication network element, the second identity of the user equipment, the fresh parameter of the user equipment, and the fresh parameter of the cellular network authentication network element. Because the first identity is a public key of the cellular network authentication network element, the private key of the user equipment may be obtained by using the identity based signature technology (English: Identity Based Signature, IBS for short) to process the second identity of the user equipment. Therefore, it may also be understood that the session key between the user equipment and the cellular network authentication network element is generated with reference to the public key of the cellular network authentication network element, the private key of the user equipment, the fresh parameter of the cellular network authentication network element, and the fresh parameter of the user equipment. For example:

7a. UE 1 decrypts the fresh parameter from the first response message by using the corresponding symmetric key K1 (that is, the symmetric key between the UE 1 and the cellular network authentication network element) of the UE 1, verifies the signature Sig_AU, and if the signature Sig_AU is verified successfully and the fresh parameter of the UE 1 is decrypted, generates a session key between the UE 1 and the cellular network authentication network element with reference to the first identity of the cellular network authentication network element, the second identity of the UE 1, the fresh parameter of the cellular network authentication network element, and the fresh parameter of the UE 1. For example, the session key is K1'=KDF(K1, Nonce 1, Nonce_AU) and K1=e(xH(ID_UE1), H(ID_AU)), where xH(ID_UE1) is the private key of the UE 1 that is obtained based on the second identity of the UE 1, and H(ID_AU) is the public key of the cellular network authentication network element that is obtained based on the first identity of the cellular network authentication network element. Therefore, it may also be understood that the session key between the UE 1 and the cellular network authentication network element is generated based on the public key of the cellular network authentication network element, the private key of the UE 1, the fresh parameter of the cellular network authentication network element, and the fresh parameter of the UE 1.

7b. UE 2 decrypts the fresh parameter from the first response message by using the corresponding symmetric key K2 (that is, the symmetric key between the UE 2 and the cellular network authentication network element) of the UE 2, verifies the signature Sig_AU, and if the signature Sig_AU is verified successfully and the fresh parameter of the UE 2 is decrypted, generates a session key between the UE 2 and the cellular network authentication network element with reference to the first identity of the cellular network authentication network element, the second identity of the UE 2, the fresh parameter of the cellular network authentication network element, and the fresh parameter of the UE 2. For example, the session key is K2'=KDF(K2, Nonce 2, Nonce_AU) and K2=e(xH(ID_UE2), H(ID_AU)), where xH(ID_UE2) is the private key of the UE 2 that is obtained based on the second identity of the UE 2, and H(ID_AU) is the public key of the cellular network authentication network element that is obtained based on the first identity of the cellular network authentication network element. Therefore, it may also be understood that the session key between the UE 2 and the cellular network authentication network element is generated based on the public key of the cellular network authentication network element, the private key of the UE 2, the fresh parameter of the cellular network authentication network element, and the fresh parameter of the UE 2.

Step S708: If each user equipment verifies the signature Sig_AU successfully and decrypts the nonce of the user equipment from the first response message, each user equipment sends a second authentication message to the relay node separately, where the second authentication message includes a DH public key of the cellular network authentication network element and a third password identifier, and the third password identifier is a signature affixed to all or a part of information other than the third password identifier in the second authentication message by using the private key of the user equipment. For example:

8a. The UE 1 sends a second authentication message (Nonce_AU, Sig_UE1, . . . ) to the relay node, where Nonce_AU is the nonce of the cellular network authentication network element, " . . . " indicates that the second authentication message may include other information, and Sig_UE1 is a signature affixed to the fresh parameter Nonce_AU of the cellular network authentication network element by using the private key of the UE 1.

8b. The UE 2 sends a second authentication message (Nonce_AU, Sig_UE2, . . . ) to the relay node, where Nonce_AU is the nonce of the cellular network authentication network element, " . . . " indicates that the second authentication message may include other information, and Sig_UE2 is a signature affixed to the fresh parameter Nonce_AU of the cellular network authentication network element by using the private key of the UE 2.

Step S709: The relay node receives the second authentication message, and performs an aggregation operation on the third password identifier (that is, the signature) in each received second authentication message to generate a new aggregated signature Sig_AG Step S710: The relay node sends the second aggregation message to the cellular network authentication network element, where the second aggregation message may be (ID_Vec, Nonce_AU_Vec, Sig_AG . . . ), where ID_Vec includes the second identity of each user equipment, Nonce_AU_Vec includes the nonce of the cellular network authentication network element that is sent by each user equipment to the relay node, " . . . " corresponds to other information that may exist in the second authentication message, and the Sig_AG is the aggregated signature.

Step S711: The cellular network authentication network element verifies the aggregated signature Sig_AG2 in the second aggregation message with reference to information in the second aggregation message, and if the aggregated signature Sig_AG2 is verified successfully and all network-side nonces carried in the second aggregation message are the Nonce_AU of the cellular network authentication network element, generates a session key between the cellular network authentication network element and each user equipment with reference to the first identity of the cellular network authentication network element, the fresh parameter of the cellular network authentication network element, the second identity of each user equipment in the plurality of user equipments, and the fresh parameter of each user equipment in the plurality of user equipments. For example:

11a. The cellular network authentication network element calculates a session key between the cellular network authentication network element and the UE 1 based on the first identity of the cellular network authentication network element, the fresh parameter of the cellular network authentication network element, the second identity of the UE 1, and the fresh parameter of the UE 1. For example, the session key is K1'=KDF(K1, Nonce 1, Nonce_AU) and K1=e(xH(ID_AU), H(ID_UE1)), where xH(ID_AU) is the private key of the cellular network authentication network element that is obtained through calculation based on the first identity of the cellular network authentication network element, H(ID_UE1) is a public key of the UE 1 that is obtained based on the second identity of the UE 1, Nonce 1 is the fresh parameter nonce of the UE 1, and Nonce_AU is the fresh parameter nonce of the cellular network authentication network element. Therefore, it may also be understood that the cellular network authentication network element calculates the session key between the cellular network authentication network element and the UE 1 based on the private key of the cellular network authentication network element, the fresh parameter of the cellular network authentication network element, the public key of the UE 1, and the fresh parameter of the UE 1.

11b. The cellular network authentication network element calculates a session key between the cellular network authentication network element and the UE 2 based on the first identity of the cellular network authentication network element, the fresh parameter of the cellular network authentication network element, the second identity of the UE 2, and the fresh parameter of the UE 2. For example, the session key is K2'=KDF(K2, Nonce 2, Nonce_AU) and K2=e(xH(ID_AU), H(ID_UE2)), where xH(ID_AU) is the private key of the cellular network authentication network element that is obtained through calculation based on the first identity of the cellular network authentication network element, H(ID_UE2) is a public key of the UE 2 that is obtained based on the second identity of the UE 2, Nonce 2 is the fresh parameter nonce of the UE 2, and Nonce_AU is the fresh parameter nonce of the cellular network authentication network element. Therefore, it may also be understood that the cellular network authentication network element calculates the session key between the cellular network authentication network element and the UE 2 based on the private key of the cellular network authentication network element, the fresh parameter of the cellular network authentication network element, the public key of the UE 2, and the fresh parameter of the UE 2.

With reference to steps 701 to 711, the foregoing describes how to aggregate the signature in the first authentication message sent by each user equipment to reduce data overheads. For some reason, some user equipments may not expect that signatures in first authentication messages sent by the user equipments are aggregated by the relay node. Therefore, the first authentication message in the foregoing step 701 may further include a preference indicator UE_AGindicator, where the preference indicator UE_AGindicator is used to represent whether the user equipment that sends the first authentication message prefers aggregation of the signature in the first authentication message. For example, when UE_AGindicator=1, it indicates a preference for aggregation; or when UE_AGindicator=0, it indicates a nonpreference for aggregation.

Figures 1, 3J:
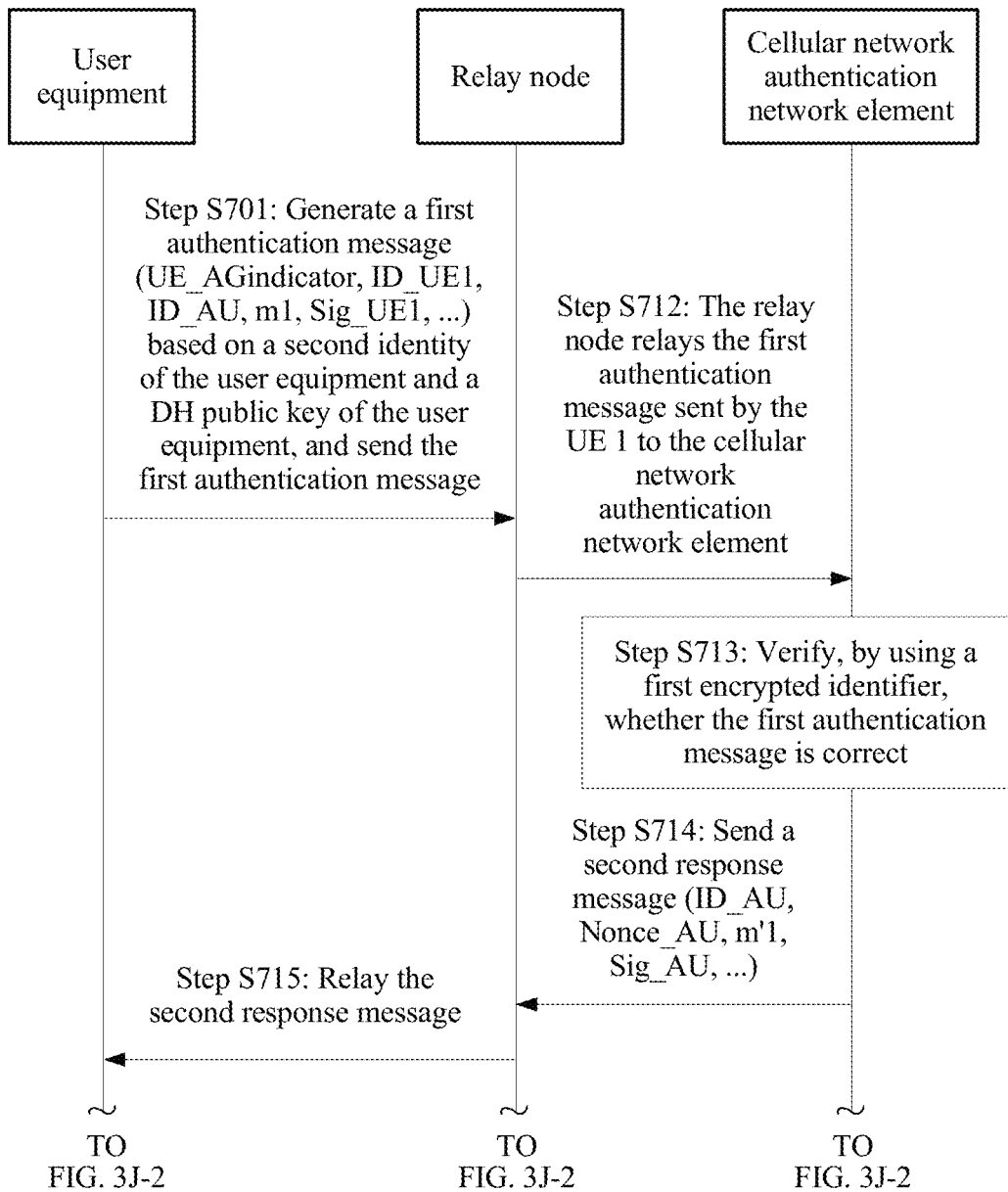
Figures 2, 3J:
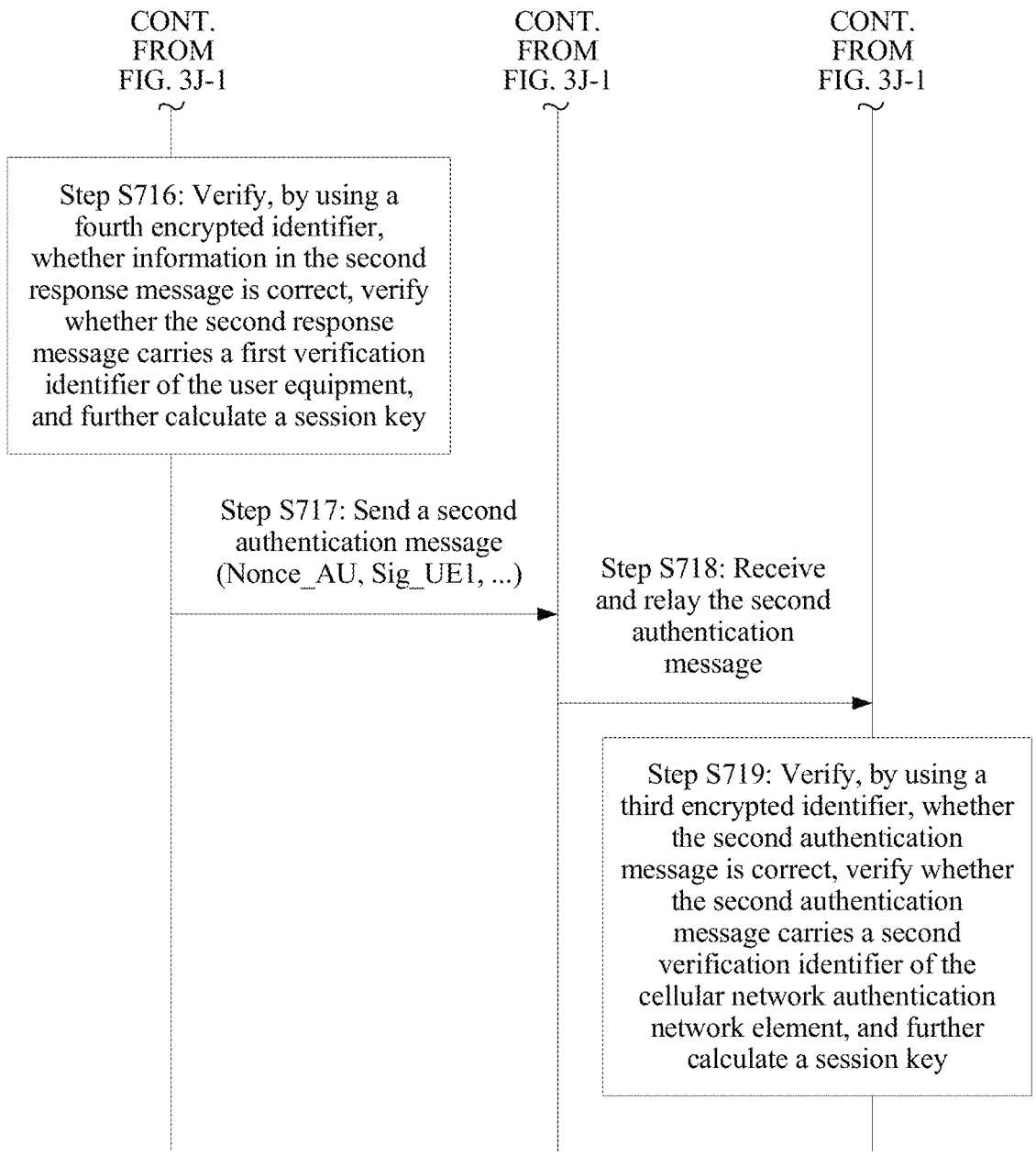

When the preference indicator indicates that the user equipment prefers aggregation of the signature in the first authentication message sent by the user equipment, the procedure of steps 702 to 711 is performed after the relay node learns the preference of the user equipment. Using the UE 1 as an example, when the preference indicator indicates that the UE does not prefer aggregation of the signature in the first authentication message sent by the UE 1, the procedure of steps 712 to 719 in FIG. 3J-1 and FIG. 3J-2 is performed after the relay node learns the nonpreference of the user equipment.

Step S712: The relay node relays the first authentication message sent by the UE 1 to the cellular network authentication network element, where the first authentication message may be (UE_AGindicator, ID_UE1, ID_AU, m1, Sig_UE1, . . . ), where ID_UE1 is the second identity of the UE 1, ID_AU is the first identity of the cellular network authentication network element, m1 is the fresh parameter Nonce 1 of the UE 1 that is encrypted by using the symmetric key K1 between the UE 1 and the cellular network authentication network element, " . . . " indicates that other information may exist in the first authentication message, and Sig_UE1 is a signature affixed to the ID_UE1, the ID_AU, and the m1 by using the private key of the UE 1. The symmetric key K1 is obtained through calculation based on the IBS technology with reference to the second identity ID_UE1 of the UE 1 and the first identity ID_AU of the cellular network authentication network element. For example, the symmetric key is K1=e(xH(ID_UE1), H(ID_AU)).

Step S713: The cellular network authentication network element receives the first authentication message sent by the relay node, and decrypts the fresh parameter of the UE 1 from the first authentication message based on the symmetric key K1 between the cellular network authentication network element and the UE 1; the cellular network authentication network element may calculate the symmetric key K1 based on the first identity of the cellular network authentication network element and the second identity of the UE 1 in the first authentication message; and the cellular network authentication network element further verifies the signature Sig_UE1 in the first authentication message based on information in the first authentication message, and if the verification succeeds, it indicates that the information in the first authentication message is correct, and then the cellular network authentication network element generates a fresh parameter Nonce_AU.

Step S714: The cellular network authentication network element sends a second response message to the relay node, where the second response message may be (ID_AU, Nonce_AU, m' 1, Sig_AU, . . . ), where ID_AU is the first identity of the cellular network authentication network element, Nonce_AU is the fresh parameter nonce of the cellular network authentication network element, m'1 is the fresh parameter of the UE 1 and the fresh parameter is encrypted by using the symmetric key K1 between the UE 1 and the cellular network authentication network element, " . . . " indicates that other information may also exist in the second response message, and Sig_AU is a signature affixed to all or a part of information other than the Sig_AU in the second response message by using a private key of the cellular network authentication network element.

Step S715: The relay node receives the second response message and relays the second response message to the UE 1.

Step S716: The UE 1 receives the second response message; the UE 1 decrypts the fresh parameter from the second response message by using the symmetric key K1 between the UE 1 and the cellular network authentication network element, and verifies the signature Sig_AU with reference to the information in the second response message; if the signature Sig_AU is verified successfully, and the fresh parameter Nonce 1 of the UE 1 is decrypted, it indicates that the information in the second response message is correct; and then the UE 1 generates a session key between the UE 1 and the cellular network authentication network element with reference to the first identity of the cellular network authentication network element, the second identity of the UE 1, the fresh parameter of the cellular network authentication network element, and the fresh parameter of the UE 1. For example, the session key is K1'=KDF(K1, Nonce 1, Nonce_AU) and K1=e(xH (ID_UE1), H(ID_AU)), where xH(ID_UE1) is the private key of the UE 1 that is obtained based on the second identity of the UE 1, and H(ID_AU) is a public key of the cellular network authentication network element that is obtained based on the first identity of the cellular network authentication network element. Therefore, it may also be understood that the session key between the UE 1 and the cellular network authentication network element is generated based on the public key of the cellular network authentication network element, the private key of the UE 1, the fresh parameter of the cellular network authentication network element, and the fresh parameter of the UE 1.

Step S717: The UE 1 sends a second authentication message to the relay node, where the second authentication message may be (Nonce_AU, Sig_UE1, . . . ), where Nonce_AU is the fresh parameter of the cellular network authentication network element that is carried in the second response message, " . . . " indicates that the second authentication message may further include other information, and Sig_UE1 is a signature affixed to all or a part of information other than the Sig_UE1 in the second authentication message by using the private key of the UE 1.

Step S718: The relay node receives the second authentication message and relays the second authentication message to the cellular network authentication network element.

Step S719: The cellular network authentication network element receives the second authentication message, and verifies the signature Sig_UE1 in the second authentication message with reference to the information in the second authentication message; if the signature Sig_UE1 is verified successfully and the network-side nonce carried in the second authentication message is the Nonce_AU of the cellular network authentication network element, it indicates that the information in the second authentication message is correct; and then the cellular network authentication network element calculates a session key between the cellular network authentication network element and the UE 1 based on the first identity of the cellular network authentication network element, the fresh parameter of the cellular network authentication network element, the second identity of the UE 1, and the fresh parameter of the UE 1. For example, the session key is K1'=KDF(K1, Nonce 1, Nonce_AU) and K1=e(xH(ID_AU), H(ID_UE1)), where xH(ID_AU) is the private key of the cellular network authentication network element that is obtained through calculation based on the first identity of the cellular network authentication network element, H(ID_UE1) is a public key of the UE 1 that is obtained based on the second identity of the UE 1, Nonce 1 is the fresh parameter nonce of the UE 1, and Nonce_AU is the fresh parameter nonce of the cellular network authentication network element. Therefore, it may also be understood that the cellular network authentication network element calculates the session key between the cellular network authentication network element and the UE 1 based on the private key of the cellular network authentication network element, the fresh parameter of the cellular network authentication network element, the public key of the UE 1, and the fresh parameter of the UE 1.

It may be understood that, in the solution described in steps S701 to S719, the second identity may be not only used to identify a source and a destination of a corresponding message, but also used to calculate a session key between the user equipment and the cellular network authentication network element; the first identity may be not only used to identify a source and a destination of a corresponding message, but also used to calculate a session key between the user equipment and the cellular network authentication network element; both the first verification identifier and the second verification identifier are fresh parameters nonces, so that a parameter exchanged between the user equipment and the cellular network authentication network element is updated as time changes, and that security performance is improved; the information carrying the first verification identifier is encrypted by using a symmetric key in an exchange process, so that security performance is further improved.

In another optional solution, the first verification identifier is the fresh parameter nonce of the user equipment; the first authentication message includes the first identity of the cellular network authentication network element; that the relay node is further configured to send a first aggregation message to the cellular network authentication network element is specifically: the relay node is configured to send, based on the first identity, the first aggregation message to the cellular network authentication network element corresponding to the first identity;

the first verification identifier in the first authentication message is encrypted by using a prestored symmetric key between the user equipment and the cellular network authentication network element, and the cellular network authentication network element is configured to decrypt the first verification identifier by using the prestored symmetric key between the user equipment and the cellular network authentication network element;

the first verification identifier in the first response message is encrypted by using the prestored symmetric key between the user equipment and the cellular network authentication network element, and the user equipment is configured to decrypt the first verification identifier by using the prestored symmetric key between the user equipment and the cellular network authentication network element;

the first encrypted identifier is a message authentication code MAC of the first authentication message; and that the user equipment generates a session key between the user equipment and the cellular network authentication network element is specifically: the user equipment generates the session key between the user equipment and the cellular network authentication network element based on the private key of the user equipment, the first verification identifier, the second verification identifier in the first response message, and the first identity in the first response message.

Figures 1, 3K:
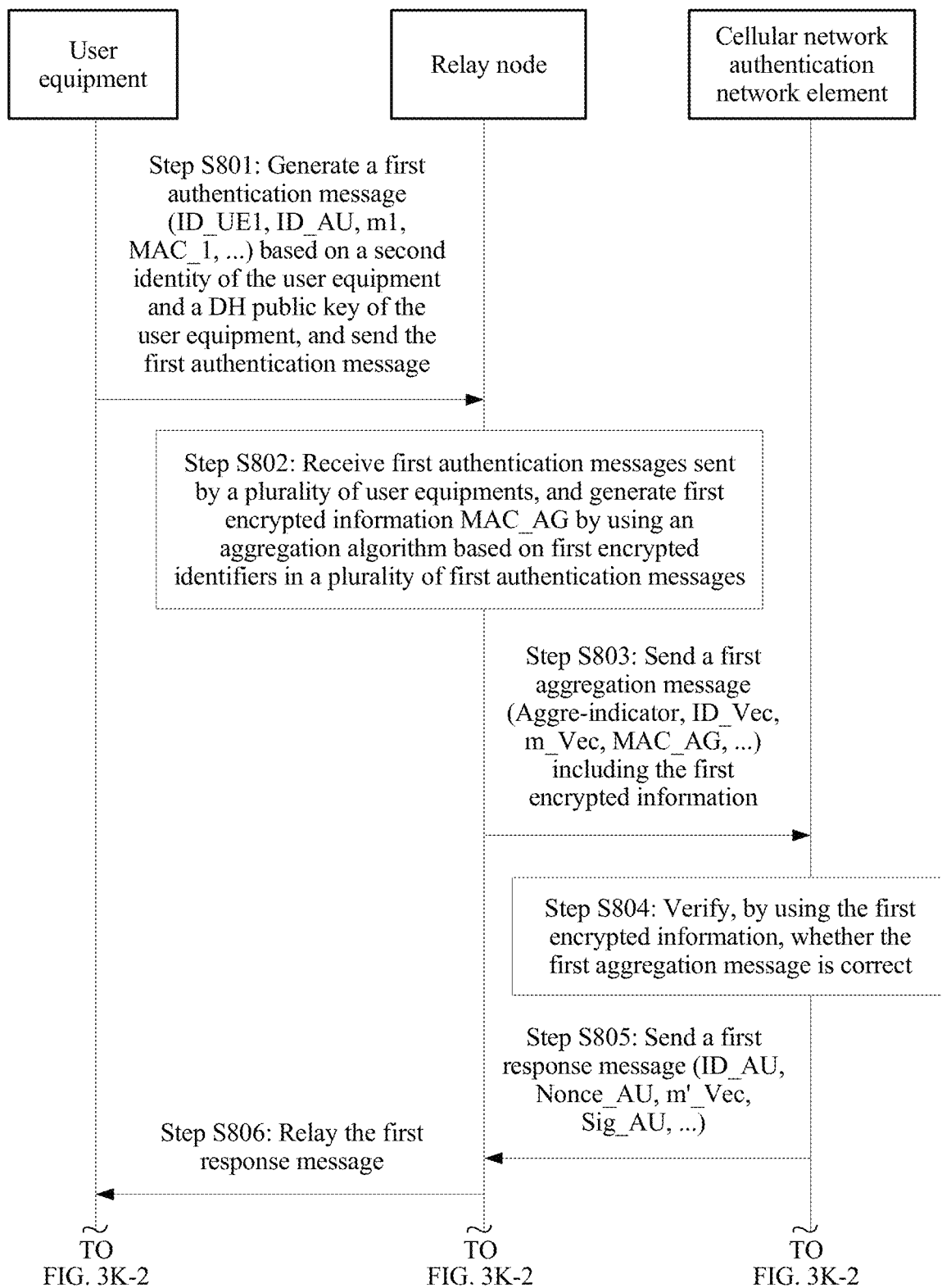
Figures 2, 3K:
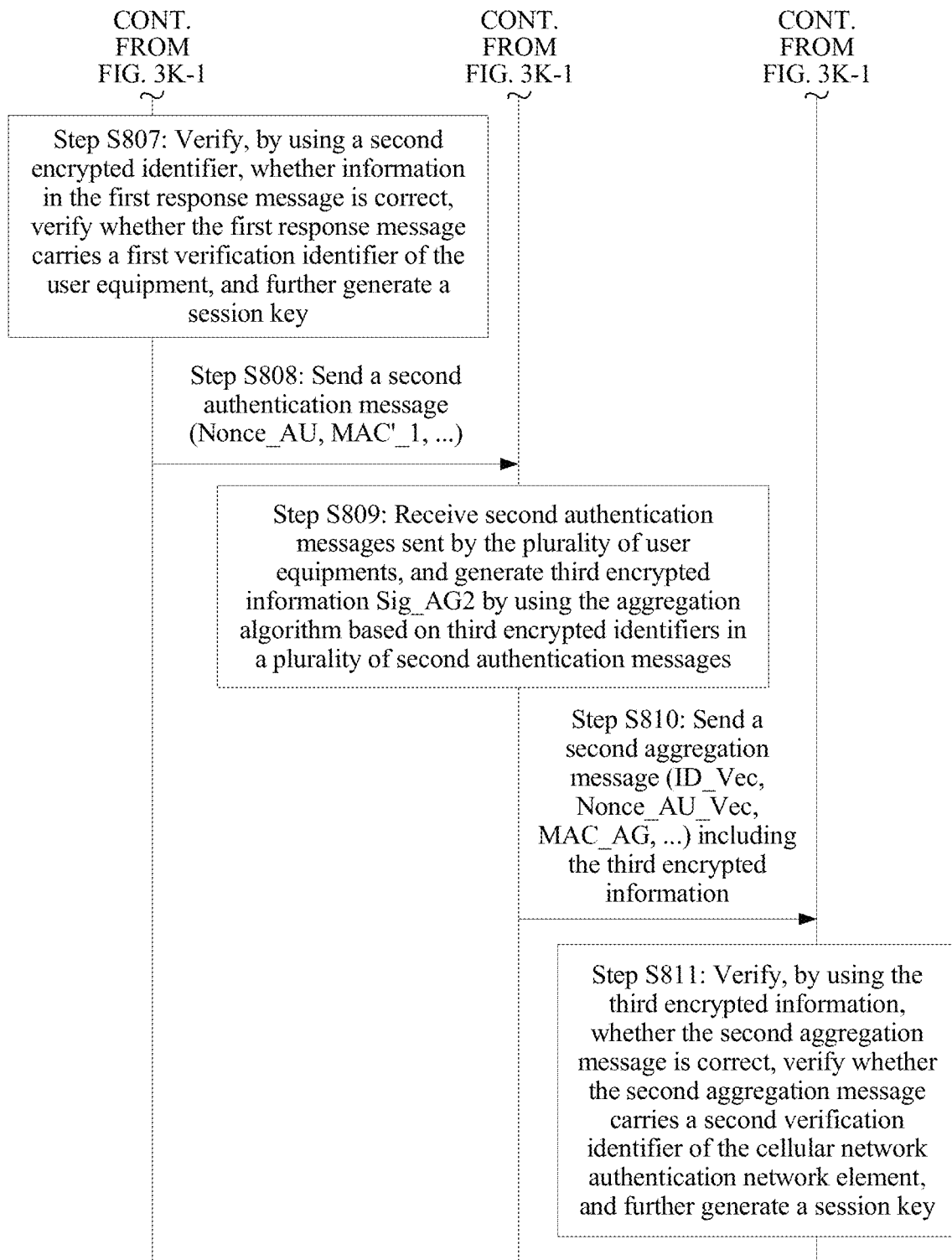

The second verification identifier is the nonce of the cellular network authentication network element, and the second encrypted identifier is a signature affixed to the information other than the second encrypted identifier in the first response message by using the private key of the cellular network authentication network element. The following uses steps S801 to S811 in FIG. 3K-1 and FIG. 3K-2 as an example for description.

Step S801: Each user equipment generates a first authentication message based on a second identity of the user equipment, a fresh parameter nonce of the user equipment, and a first identity of the cellular network authentication network element that is learned in advance, and sends the first authentication message to the relay node, where the first authentication message includes the second identity, the first identity, the nonce of the user equipment that is encrypted by using a symmetric key between the corresponding user equipment and the cellular network authentication network element, and a first encrypted identifier, where the first password identifier is a message authentication code MAC generated for the first authentication message by using the symmetric key, and the message authentication code MAC may be specifically generated based on an HMAC. For example:

1a. UE 1 generates a first authentication message and sends the first authentication message to the relay node, where the first authentication message may be (ID_UE1, ID_AU, m1, MAC_1, . . . ), where ID_UE1 is a second identity of the UE 1, ID_AU is the first identity of the cellular network authentication network element, m1 is a fresh parameter Nonce 1 of the UE 1 that is encrypted by using a symmetric key K1 between the UE 1 and the cellular network authentication network element, " . . . " indicates that other information may exist in the first authentication message, and MAC_1 is a message authentication code generated for the first authentication message by using the symmetric key of the UE 1. The symmetric key K1 is obtained through calculation based on an IBS technology with reference to the second identity ID_UE1 of the UE 1 and the first identity ID_AU of the cellular network authentication network element. For example, the symmetric key is K1=e(xH(ID_UE1), H(ID_AU)).

1b. UE 2 generates a first authentication message and sends the first authentication message to the relay node, where the first authentication message may be (ID_UE2, ID_AU, m2, MAC_2, . . . ), where ID_UE2 is a second identity of the UE 2, ID_AU is the first identity of the cellular network authentication network element, m2 is a fresh parameter Nonce 2 of the UE 2 that is encrypted by using a symmetric key K2 between the UE 2 and the cellular network authentication network element, " . . . " indicates that other information may exist in the first authentication message, and MAC_2 is a message authentication code generated for the first authentication message by using the symmetric key of the UE 2. The symmetric key K2 is obtained through calculation based on the IBS technology with reference to the second identity ID_UE2 of the UE 2 and the first identity ID_AU of the cellular network authentication network element. For example, the symmetric key is K2=e(xH(ID_UE2), H(ID_AU)).

Step S802: The relay node receives the first authentication messages sent by the user equipments, and performs an aggregation operation on message authentication codes in the received first authentication messages of the user equipments to generate an aggregated authentication code MAC_AG, where the aggregated authentication code is the foregoing first encrypted information. When the user equipments are specifically the UE 1 and the UE 2, the relay node aggregates the message authentication code in the first authentication message of the UE 1 and the message authentication code in the first authentication message of the UE 2 to obtain an aggregated authentication code. For example, the aggregated authentication code is MAC_AG=f(MAC_1, MAC_2). Optionally, a data length of the aggregated authentication code is the same as a data length of a separate authentication code of each user equipment.

Step S803: The relay node generates a first aggregation message and sends the first aggregation message to the cellular network authentication network element (Authenticator). The first aggregation message may be (Aggre-indicator, ID_Vec, m_Vec, MAC_AG . . . ), where Aggre-indicator is an aggregate authentication indicator, used to indicate that the message is an aggregate authentication request message, ID_Vec includes the second identity of each user equipment, m_Vec includes the fresh parameter nonce of each user equipment that is encrypted by using the corresponding symmetric key, " . . . " corresponds to other information that may exist in the first authentication message, and the MAC_AG is the aggregated authentication code. It should be noted that, the first identity in the first authentication message may be used to instruct the relay node to send the first aggregation message to the cellular network authentication network element corresponding to the first identity.

Step S804: The cellular network authentication network element receives the first aggregation message, and decrypts the fresh parameter of each user equipment from the first aggregation message based on the corresponding symmetric key, for example, decrypts the fresh parameter of the UE 1 based on the symmetric key K1, and decrypts the fresh parameter of the UE 2 based on the symmetric key K2. The cellular network authentication network element may calculate the K1 based on the first identity of the cellular network authentication network element and the second identity of the UE 1 in the first aggregation message, and calculate the K2 based on the first identity of the cellular network authentication network element and the second identity of the UE 2 in the first aggregation message, and so on. The cellular network authentication network element further verifies the aggregated authentication code MAC_AG with reference to information in the first aggregation message. If the verification succeeds, it indicates that the information in the first aggregation message is correct. It should be noted that, at least two network authentication modes, that is, aggregate authentication and non-aggregate authentication, may be preconfigured for the cellular network authentication network element. The cellular network authentication network element may determine, based on the aggregate authentication indicator Aggre-indicator in the first aggregation message, that the message authentication code in the first aggregation message needs to be verified by using an aggregate authentication related policy.

Step S805: The cellular network authentication network element sends a first response message to the relay node, where the first response message may be (ID_AU, Nonce_AU, m'_Vec, Sig_AU, . . . ), where ID_AU is the first identity of the cellular network authentication network element, Nonce_AU is a fresh parameter nonce of the cellular network authentication network element, m'_Vec includes the fresh parameter of each user equipment and the fresh parameter of each user equipment is encrypted by using the symmetric key of the user equipment, for example, the included fresh parameter of the UE 1 is encrypted by using the K1, and the included fresh parameter of the UE 2 is encrypted by using the K2, " . . . " indicates that other information may exist in the first response message, Sig_AU is a signature affixed to all or a part of information other than the Sig_AU in the first response message by using a private key of the cellular network authentication network element, and the Sig_AU is the second password identifier described above.

Step S806: The relay node receives the first response message, and relays the first response message to each user equipment UE separately. For example:

6a. The relay node relays the first response message to the UE 1.

6b. The relay node relays the first response message to the UE 2.

Step S807: Each user equipment separately receives the first response message relayed by the relay node, decrypts the fresh parameter from the first response message by using the corresponding symmetric key of the user equipment, and verifies the signature Sig_AU with reference to the information in the first response message; if the signature Sig_AU is verified successfully and the nonce of the user equipment is decrypted, it indicates that the information in the first response message is correct; and then the user equipment generates a session key between the user equipment and the cellular network authentication network element with reference to the first identity of the cellular network authentication network element, the second identity of the user equipment, the fresh parameter of the user equipment, and the fresh parameter of the cellular network authentication network element. Because the first identity is a public key of the cellular network authentication network element, a private key of the user equipment may be obtained by using the identity based signature technology (English: Identity Based Signature, IBS for short) to process the second identity of the user equipment. Therefore, it may also be understood that the session key between the user equipment and the cellular network authentication network element is generated with reference to the public key of the cellular network authentication network element, the private key of the user equipment, the fresh parameter of the cellular network authentication network element, and the fresh parameter of the user equipment. For example:

7a. UE 1 decrypts the fresh parameter from the first response message by using the corresponding symmetric key K1 (that is, the symmetric key between the UE 1 and the cellular network authentication network element) of the UE 1, verifies the signature Sig_AU, and if the signature Sig_AU is verified successfully and the fresh parameter of the UE 1 is decrypted, generates a session key between the UE 1 and the cellular network authentication network element with reference to the first identity of the cellular network authentication network element, the second identity of the UE 1, the fresh parameter of the cellular network authentication network element, and the fresh parameter of the UE 1. For example, the session key is K1'=KDF(K1, Nonce 1, Nonce_AU) and K1=e(xH(ID_UE1), H(ID_AU)), where xH(ID_UE1) is a private key of the UE 1 that is obtained based on the second identity of the UE 1, and H(ID_AU) is the public key of the cellular network authentication network element that is obtained based on the first identity of the cellular network authentication network element. Therefore, it may also be understood that the session key between the UE 1 and the cellular network authentication network element is generated based on the public key of the cellular network authentication network element, the private key of the UE 1, the fresh parameter of the cellular network authentication network element, and the fresh parameter of the UE 1.

7b. UE 2 decrypts the fresh parameter from the first response message by using the corresponding symmetric key K2 (that is, the symmetric key between the UE 2 and the cellular network authentication network element) of the UE 2, verifies the signature Sig_AU, and if the signature Sig_AU is verified successfully and the fresh parameter of the UE 2 is decrypted, generates a session key between the UE 2 and the cellular network authentication network element with reference to the first identity of the cellular network authentication network element, the second identity of the UE 2, the fresh parameter of the cellular network authentication network element, and the fresh parameter of the UE 2. For example, the session key is K2'=KDF(K2, Nonce 2, Nonce_AU) and K2=e(xH(ID_UE2), H(ID_AU)), where xH(ID_UE2) is a private key of the UE 2 that is obtained based on the second identity of the UE 2, and H(ID_AU) is the public key of the cellular network authentication network element that is obtained based on the first identity of the cellular network authentication network element. Therefore, it may also be understood that the session key between the UE 2 and the cellular network authentication network element is generated based on the public key of the cellular network authentication network element, the private key of the UE 2, the fresh parameter of the cellular network authentication network element, and the fresh parameter of the UE 2.

Step S808: If each user equipment verifies the signature Sig_AU successfully and decrypts the nonce of the user equipment from the first response message, each user equipment sends a second authentication message to the relay node separately, where the second authentication message includes a DH public key of the cellular network authentication network element and a third password identifier, and the third password identifier is a message authentication code MAC generated for the second authentication message by using the corresponding symmetric key. For example:

8a. The UE 1 sends a second authentication message (Nonce_AU, MAC'_1, . . . ) to the relay node, where Nonce_AU is the nonce of the cellular network authentication network element, " . . . " indicates that the second authentication message may include other information, and MAC'_1 is a message authentication code generated for the second authentication message by using the symmetric key K1 between the UE 1 and the cellular network authentication network element.

8b. The UE 2 sends a second authentication message (Nonce_AU, MAC'_2, . . . ) to the relay node, where Nonce_AU is the nonce of the cellular network authentication network element, " . . . " indicates that the second authentication message may include other information, and MAC'_2 is a message authentication code generated for the second authentication message by using the symmetric key K2 between the UE 2 and the cellular network authentication network element.

Step S809: The relay node receives the second authentication message, and performs an aggregation operation on the third password identifier (that is, the signature) in each received second authentication message to generate a new aggregated authentication code MAC_AG Step S810: The relay node sends the second aggregation message to the cellular network authentication network element, where the second aggregation message may be (ID_Vec, Nonce_AU_Vec, MAC_AG . . . ), where ID_Vec includes the second identity of each user equipment, Nonce_AU_Vec includes the nonce of the cellular network authentication network element that is sent by each user equipment to the relay node, " . . . " corresponds to other information that may exist in the second authentication message, and the MAC_AG is the aggregated authentication code.

Step S811: The cellular network authentication network element verifies the aggregated authentication code MAC_AG in the second aggregation message with reference to information in the second aggregation message, and if the aggregated authentication code MAC_AG is verified successfully and all network-side nonces carried in the second aggregation message are the Nonce_AU of the cellular network authentication network element, generates a session key between the cellular network authentication network element and each user equipment with reference to the first identity of the cellular network authentication network element, the fresh parameter of the cellular network authentication network element, the second identity of each user equipment in the plurality of user equipments, and the fresh parameter of each user equipment in the plurality of user equipments. For example:

11a. The cellular network authentication network element calculates a session key between the cellular network authentication network element and the UE 1 based on the first identity of the cellular network authentication network element, the fresh parameter of the cellular network authentication network element, the second identity of the UE 1, and the fresh parameter of the UE 1. For example, the session key is K1'=KDF(K1, Nonce 1, Nonce_AU) and K1=e(xH(ID_AU), H(ID_UE1)), where xH(ID_AU) is the private key of the cellular network authentication network element that is obtained through calculation based on the first identity of the cellular network authentication network element, H(ID_UE1) is a public key of the UE 1 that is obtained based on the second identity of the UE 1, Nonce 1 is the fresh parameter nonce of the UE 1, and Nonce_AU is the fresh parameter nonce of the cellular network authentication network element. Therefore, it may also be understood that the cellular network authentication network element calculates the session key between the cellular network authentication network element and the UE 1 based on the private key of the cellular network authentication network element, the fresh parameter of the cellular network authentication network element, the public key of the UE 1, and the fresh parameter of the UE 1.

11b. The cellular network authentication network element calculates a session key between the cellular network authentication network element and the UE 2 based on the first identity of the cellular network authentication network element, the fresh parameter of the cellular network authentication network element, the second identity of the UE 2, and the fresh parameter of the UE 2. For example, the session key is K2'=KDF(K2, Nonce 2, Nonce_AU) and K2=e(xH(ID_AU), H(ID_UE2)), where xH(ID_AU) is the private key of the cellular network authentication network element that is obtained through calculation based on the first identity of the cellular network authentication network element, H(ID_UE2) is a public key of the UE 2 that is obtained based on the second identity of the UE 2, Nonce 2 is the fresh parameter nonce of the UE 2, and Nonce_AU is the fresh parameter nonce of the cellular network authentication network element. Therefore, it may also be understood that the cellular network authentication network element calculates the session key between the cellular network authentication network element and the UE 2 based on the private key of the cellular network authentication network element, the fresh parameter of the cellular network authentication network element, the public key of the UE 2, and the fresh parameter of the UE 2.

With reference to steps 801 to 811, the foregoing describes how to aggregate the message authentication code in the first authentication message sent by each user equipment to reduce data overheads. For some reason, some user equipments may not expect that message authentication codes in first authentication messages sent by the user equipments are aggregated by the relay node. Therefore, the first authentication message in the foregoing step 801 may further include a preference indicator UE_AGindicator, where the preference indicator UE_AGindicator is used to represent whether the user equipment that sends the first authentication message prefers aggregation of the message authentication code in the first authentication message. For example, when UE_AGindicator=1, it indicates a preference for aggregation; or when UE_AGindicator=0, it indicates a nonpreference for aggregation.

Figures 1, 3L:
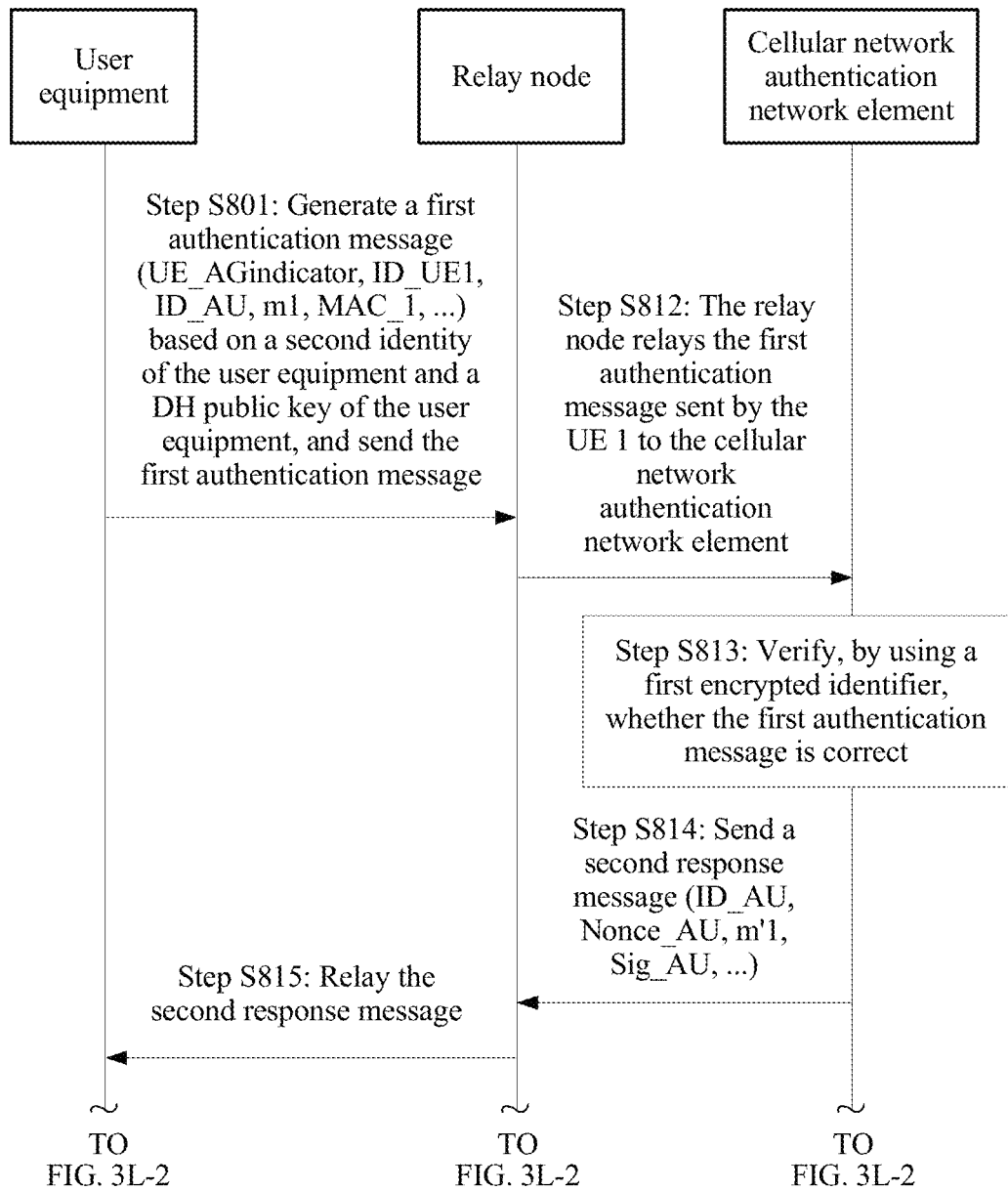
Figures 2, 3L:
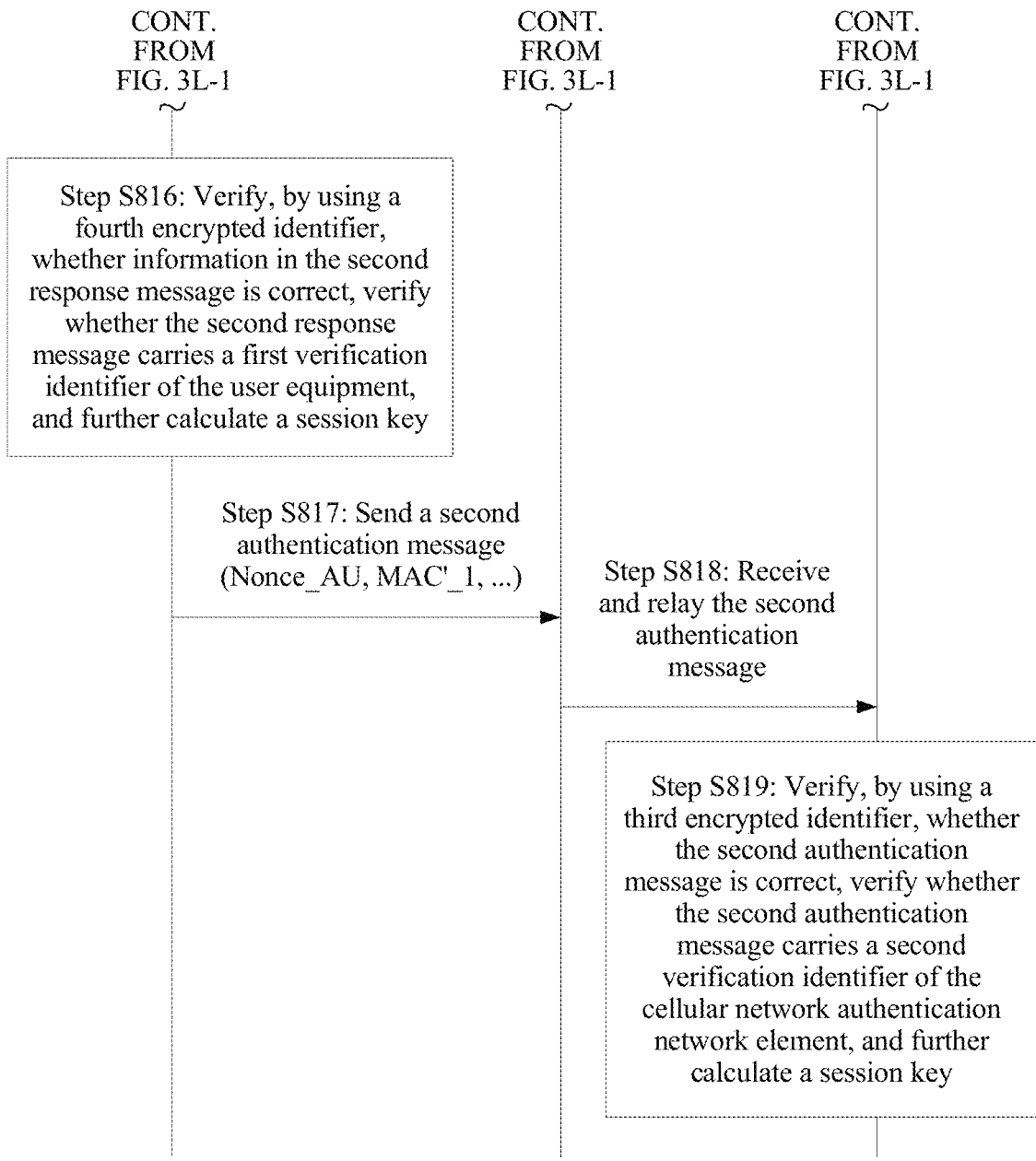

When the preference indicator indicates that the user equipment prefers aggregation of the message authentication code in the first authentication message sent by the user equipment, the procedure of steps 802 to 811 is performed after the relay node learns the preference of the user equipment. Using the UE 1 as an example, when the preference indicator indicates that the UE does not prefer aggregation of the message authentication code in the first authentication message sent by the UE 1, the procedure of steps 812 to 819 in FIG. 3L-1 and FIG. 3L-2 is performed after the relay node learns the nonpreference of the user equipment.

Step S812: The relay node relays the first authentication message sent by the UE 1 to the cellular network authentication network element, where the first authentication message may be (UE_AGindicator, ID_UE1, ID_AU, m1, MAC_1, . . . ), where ID_UE1 is the second identity of the UE 1, ID_AU is the first identity of the cellular network authentication network element, m1 is the fresh parameter Nonce 1 of the UE 1 that is encrypted by using the symmetric key K1 between the UE 1 and the cellular network authentication network element, " . . . " indicates that other information may exist in the first authentication message, and MAC_1 is a message authentication code generated for the first authentication message by using the symmetric key K1. The symmetric key K1 is obtained through calculation based on the IBS technology with reference to the second identity ID_UE1 of the UE 1 and the first identity ID_AU of the cellular network authentication network element. For example, the symmetric key K1 is K1=e(xH(ID_UE1), H(ID_AU)).

Step S813: The cellular network authentication network element receives the first authentication message sent by the relay node, and decrypts the fresh parameter of the UE 1 from the first authentication message based on the symmetric key K1 between the cellular network authentication network element and the UE 1; the cellular network authentication network element may calculate the symmetric key K1 based on the first identity of the cellular network authentication network element and the second identity of the UE 1 in the first authentication message; and the cellular network authentication network element further verifies the message authentication code MAC_1 in the first authentication message based on information in the first authentication message, and if the verification succeeds, it indicates that the information in the first authentication message is correct, and then the cellular network authentication network element generates a fresh parameter Nonce_AU.

Step S814: The cellular network authentication network element sends a second response message to the relay node, where the second response message may be (ID_AU, Nonce_AU, m'1, Sig_AU, . . . ), where ID_AU is the first identity of the cellular network authentication network element, Nonce_AU is the fresh parameter nonce of the cellular network authentication network element, m'1 is the fresh parameter of the UE 1 and the fresh parameter is encrypted by using the symmetric key K1 between the UE 1 and the cellular network authentication network element, " . . . " indicates that other information may also exist in the second response message, and Sig_AU is a signature affixed to all or a part of information other than the Sig_AU in the second response message by using a private key of the cellular network authentication network element.

Step S815: The relay node receives the second response message and relays the second response message to the UE 1.

Step S816: The UE 1 receives the second response message; the UE 1 decrypts the fresh parameter from the second response message by using the symmetric key K1 between the UE 1 and the cellular network authentication network element, and verifies the signature Sig_AU with reference to the information in the second response message; if the signature Sig_AU is verified successfully, and the fresh parameter Nonce 1 of the UE 1 is decrypted, it indicates that the information in the second response message is correct; and then the UE 1 generates a session key between the UE 1 and the cellular network authentication network element with reference to the first identity of the cellular network authentication network element, the second identity of the UE 1, the fresh parameter of the cellular network authentication network element, and the fresh parameter of the UE 1. For example, the session key is K1'=KDF(K1, Nonce 1, Nonce_AU) and K1=e(xH(ID_UE1), H(ID_AU)), where xH(ID_UE1) is a private key of the UE 1 that is obtained based on the second identity of the UE 1, and H(ID_AU) is a public key of the cellular network authentication network element that is obtained based on the first identity of the cellular network authentication network element. Therefore, it may also be understood that the session key between the UE 1 and the cellular network authentication network element is generated based on the public key of the cellular network authentication network element, the private key of the UE 1, the fresh parameter of the cellular network authentication network element, and the fresh parameter of the UE 1.

Step S817: The UE 1 sends a second authentication message to the relay node, where the second authentication message may be (Nonce_AU, MAC'_1, . . . ), where Nonce_AU is the fresh parameter of the cellular network authentication network element that is carried in the second response message, " . . . " indicates that the second authentication message may further include other information, and MAC'_1 is a message authentication code generated for the second authentication message by using the symmetric key K1.

Step S818: The relay node receives the second authentication message and relays the second authentication message to the cellular network authentication network element.

Step S819: The cellular network authentication network element receives the second authentication message, and verifies the message authentication code MAC'_1 in the second authentication message with reference to information in the second authentication message; if the message authentication code MAC'_1 is verified successfully and the network-side nonce carried in the second authentication message is the Nonce_AU of the cellular network authentication network element, it indicates that the information in the second authentication message is correct; and then the cellular network authentication network element calculates a session key between the cellular network authentication network element and the UE 1 based on the first identity of the cellular network authentication network element, the fresh parameter of the cellular network authentication network element, the second identity of the UE 1, and the fresh parameter of the UE 1. For example, the session key is K1'=KDF(K1, Nonce 1, Nonce_AU) and K1=e(xH (ID_AU), H(ID_UE1)), where xH(ID_AU) is the private key of the cellular network authentication network element that is obtained through calculation based on the first identity of the cellular network authentication network element, H(ID_UE1) is a public key of the UE 1 that is obtained based on the second identity of the UE 1, Nonce 1 is the fresh parameter nonce of the UE 1, and Nonce_AU is the fresh parameter nonce of the cellular network authentication network element. Therefore, it may also be understood that the cellular network authentication network element calculates the session key between the cellular network authentication network element and the UE 1 based on the private key of the cellular network authentication network element, the fresh parameter of the cellular network authentication network element, the public key of the UE 1, and the fresh parameter of the UE 1.

It may be understood that, in the solution described in steps S801 to S819, the second identity may be not only used to identify a source and a destination of a corresponding message, but also used to calculate a session key between the user equipment and the cellular network authentication network element; the first identity may be not only used to identify a source and a destination of a corresponding message, but also used to calculate a session key between the user equipment and the cellular network authentication network element; both the first verification identifier and the second verification identifier are fresh parameters nonces, so that a parameter exchanged between the user equipment and the cellular network authentication network element is updated as time changes, and that security performance is improved; the information carrying the first verification identifier is encrypted by using a symmetric key in an exchange process, so that security performance is further improved.

Figures 1, 3M:
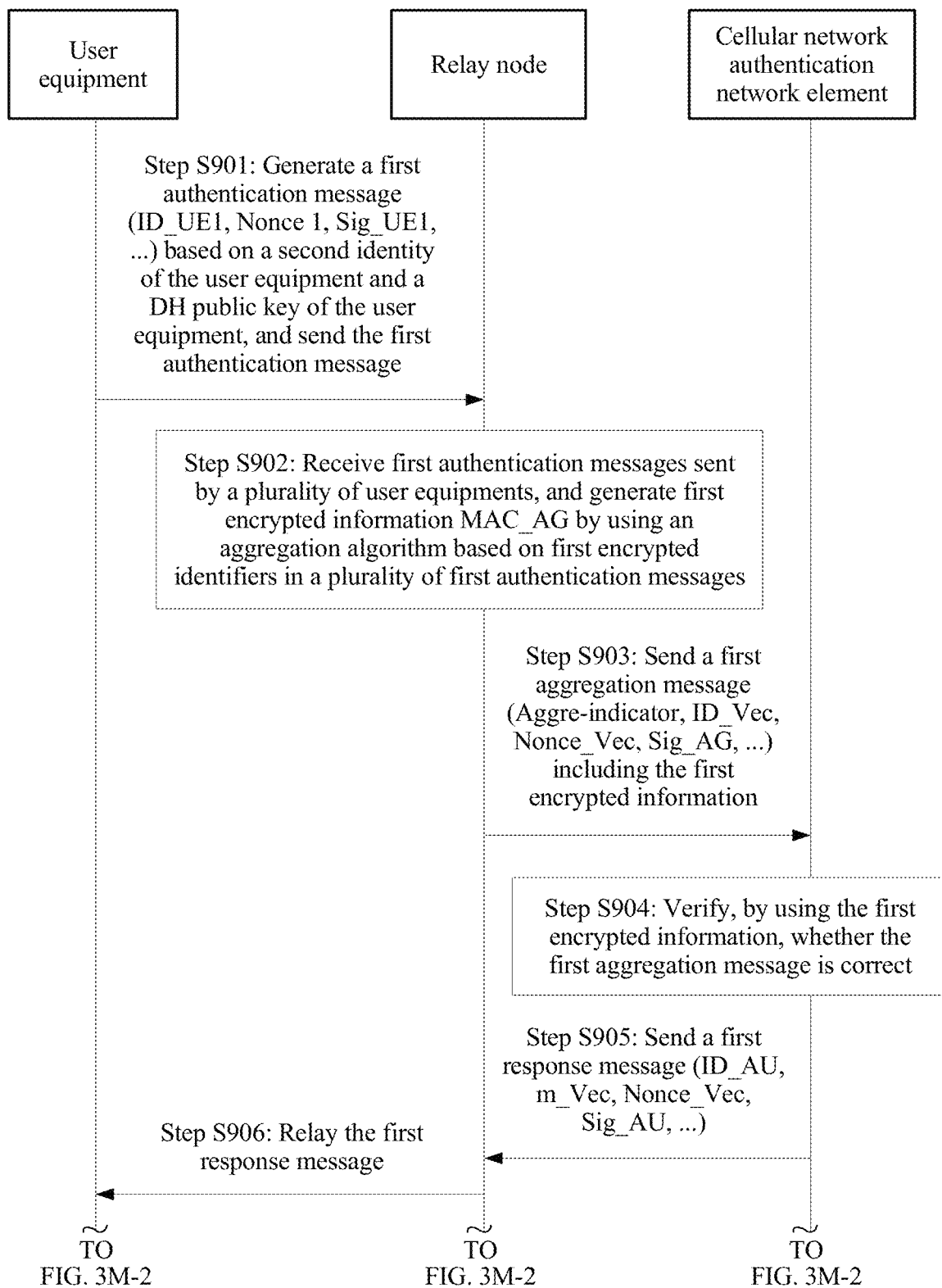
Figures 2, 3M:
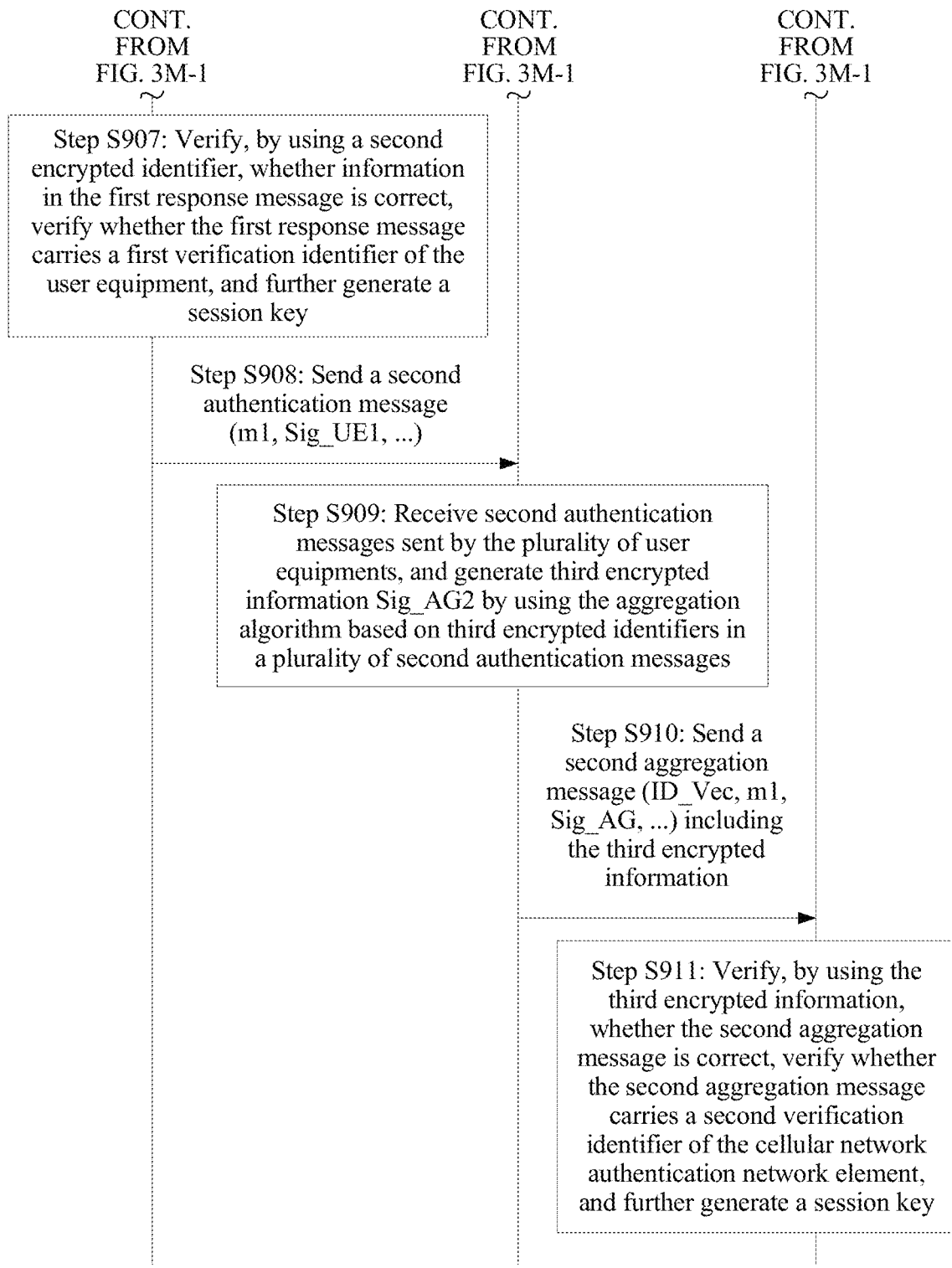

In another optional solution, the second verification identifier in the second authentication message is encrypted by using the first identity of the cellular network authentication network element. The following uses steps S901 to S911 in FIG. 3M-1 and FIG. 3M-2 as an example for description.

Step S901: Each user equipment generates a first authentication message based on a second identity of the user equipment and a fresh parameter nonce (the nonce may be a parameter such as a random number or a sequence number) of the user equipment, and sends the first authentication message to the relay node, where the first authentication message includes the second identity, the nonce, and a first password identifier, and the first password identifier is a signature affixed to all or a part of information other than the first password identifier in the first authentication message by using a private key of the corresponding user equipment. For example:

1a. UE 1 generates a first authentication message and sends the first authentication message to the relay node, where the first authentication message may be (ID_UE1, Nonce 1, Sig_UE1, . . . ), where ID_UE1 is a second identity of the UE 1, Nonce 1 is a fresh parameter nonce of the UE 1, " . . . " indicates that other information may exist in the first authentication message, and Sig_UE1 is a signature affixed to the ID_UE1 and the Nonce 1 by using a private key of the UE 1.

1b UE 2 generates a first authentication message and sends the first authentication message to the relay node, where the first authentication message may be (ID_UE2, Nonce 2, Sig_UE2, . . . ), where ID_UE2 is a second identity of the UE 2, Nonce 2 is a fresh parameter nonce of the UE 2, " . . . " indicates that other information may exist in the first authentication message and Sig_UE2 is a signature affixed to the ID_UE2 and the Nonce 2 by using a private key of the UE 2.

Step S902: The relay node receives the first authentication messages sent by the user equipments, and performs an aggregation operation on signatures in the received first authentication messages of the user equipments to generate an aggregated signature Sig_AG1, where the aggregated signature is the foregoing first encrypted information. When the user equipments are specifically the UE 1 and the UE 2, the relay node aggregates the signature in the first authentication message of the UE 1 and the signature in the first authentication message of the UE 2 to obtain an aggregated signature. For example, the aggregated signature is Sig_AG1=f(Sig_UE1, Sig_UE2). Optionally, a data length of the aggregated signature is the same as a data length of a separate signature of each user equipment.

Step S903: The relay node generates a first aggregation message and sends the first aggregation message to a cellular network authentication network element (Authenticator). The first aggregation message may be (Aggre-indicator, ID_Vec, Nonce_Vec, Sig_AG . . . ), where Aggre-indicator is an aggregate authentication indicator, ID_Vec includes the second identity of each user equipment, Nonce_Vec includes the nonce of each user equipment, " . . . " corresponds to other information that may exist in the first authentication message, and Sig_AG is the aggregated signature.

Step S904: The cellular network authentication network element receives the first aggregation message, and verifies the aggregated signature Sig_AG1 with reference to information in the first aggregation message. If the verification succeeds, it indicates that the information in the first aggregation message is correct. It should be noted that, at least two network authentication modes, that is, aggregate authentication and non-aggregate authentication, may be preconfigured for the cellular network authentication network element. The cellular network authentication network element may determine, based on the aggregate authentication indicator Aggre-indicator in the first aggregation message, that the signature in the first aggregation message needs to be verified by using an aggregate authentication related policy.

Step S905: The cellular network authentication network element sends a first response message to the relay node, where the first response message may be (ID_AU, m_Vec, Nonce_Vec, Sig_AU, ... ), where ID_AU is a first identity of the cellular network authentication network element, m_Vec includes a plurality of encrypted nonces, each encrypted nonce is obtained by encrypting a fresh parameter Nonce_AU of the cellular network authentication network element by using a second identity of user equipment, optionally, m_Vec=[En(Nonce_AU, ID_UE1), En(Nonce_AU, ID_UE2)]^T, where En(Nonce_AU, ID_UE1) indicates a result of encrypting the fresh parameter Nonce_AU of the cellular network authentication network element by using the second identity of the UE 1, Nonce_Vec includes the nonce of each user equipment, " . . . " indicates that other information may exist in the first response message, Sig_AU is a signature affixed to all or a part of information other than the Sig_AU in the first response message by using a private key of the cellular network authentication network element, and the Sig_AU is the second password identifier described above.

Step S906: The relay node receives the first response message, and relays the first response message to each user equipment UE separately. For example:

6a. The relay node relays the first response message to the UE 1.

6b. The relay node relays the first response message to the UE 2.

Step S907: Each user equipment separately receives the first response message relayed by the relay node, and verifies the signature Sig_AU with reference to the information in the first response message; if the signature Sig_AU is verified successfully and the first response message carries the nonce of the user equipment, it indicates that the information in the first response message is correct; and then the user equipment generates a session key between the user equipment and the cellular network authentication network element with reference to the first identity of the cellular network authentication network element, the second identity of the user equipment, the fresh parameter of the user equipment, and the fresh parameter of the cellular network authentication network element, where the fresh parameter Nonce_AU of the cellular network authentication network element is decrypted by each user equipment from the m_Vec in the first response message by using the second identity of the user equipment. Because the first identity is a public key of the cellular network authentication network element, the private key of the user equipment may be obtained by using an identity based signature technology (IBS) to process the second identity of the user equipment. Therefore, it may also be understood that the session key between the user equipment and the cellular network authentication network element is generated with reference to the public key of the cellular network authentication network element, the private key of the user equipment, the fresh parameter of the cellular network authentication network element, and the fresh parameter of the user equipment. For example:

7a. The UE 1 verifies the signature Sig_AU, and if the signature Sig_AU is verified successfully and the first response message carries the Nonce 1 of the UE 1, generates a session key between the UE 1 and the cellular network authentication network element with reference to the first identity of the cellular network authentication network element, the second identity of the UE 1, the fresh parameter of the cellular network authentication network element, and the fresh parameter of the UE 1. For example, the session key is K1'=KDF(K1, Nonce 1, Nonce_AU) and K1=e(xH(ID_UE1), where xH(ID_UE1) is the private key of the UE 1 that is obtained based on the second identity of the UE 1, and H(ID_AU) is the public key of the cellular network authentication network element that is obtained based on the first identity of the cellular network authentication network element. Therefore, it may also be understood that the session key between the UE 1 and the cellular network authentication network element is generated based on the public key of the cellular network authentication network element, the private key of the UE 1, the fresh parameter of the cellular network authentication network element, and the fresh parameter of the UE 1. The fresh parameter Nonce_AU of the cellular network authentication network element is decrypted by the UE 1 from the m_Vec in the first response message by using the second identity of the UE 1.

7b. The UE 2 verifies the signature Sig_AU, and if the signature Sig_AU is verified successfully and the first response message carries the Nonce 2 of the UE 2, generates a session key between the UE 2 and the cellular network authentication network element with reference to the first identity of the cellular network authentication network element, the second identity of the UE 2, the fresh parameter of the cellular network authentication network element, and the fresh parameter of the UE 2. For example, the session key is K2'=KDF(K2, Nonce 2, Nonce_AU) and K2=e(xH(ID_UE2), where xH(ID_UE2) is the private key of the UE 2 that is obtained based on the second identity of the UE 2, and H(ID_AU) is the public key of the cellular network authentication network element that is obtained based on the first identity of the cellular network authentication network element. Therefore, it may also be understood that the session key between the UE 2 and the cellular network authentication network element is generated based on the public key of the cellular network authentication network element, the private key of the UE 2, the fresh parameter of the cellular network authentication network element, and the fresh parameter of the UE 2. The fresh parameter Nonce_AU of the cellular network authentication network element is decrypted by the UE 2 from the m_Vec in the first response message by using the second identity of the UE 2.

Step S908: If each user equipment verifies the signature Sig_AU successfully and confirms that the first response message carries the nonce of the user equipment, each user equipment sends a second authentication message to the relay node separately, where the second authentication message includes a DH public key of the cellular network authentication network element and a third password identifier, and the third password identifier is a signature affixed to a part or all of information other than the third password identifier in the second authentication message by using the private key of the user equipment. For example:

8a. The UE 1 sends a second authentication message (m1, Sig_UE1, ... ) to the relay node, where m1 is the fresh parameter Nonce_AU of the cellular network authentication network element that is encrypted by using the first identity of the cellular network authentication network element, " . . . " indicates that the second authentication message may include other information, and Sig_UE1 is a signature affixed to the m1 by using the private key of the UE 1.

8b. The UE 2 sends a second authentication message (m2, Sig_UE2, ... ) to the relay node, where m2 is the fresh parameter Nonce_AU of the cellular network authentication network element that is encrypted by using the first identity of the cellular network authentication network element, " . . . " indicates that the second authentication message may include other information, and Sig_UE2 is a signature affixed to the m2 by using the private key of the UE 2.

Step S909: The relay node receives the second authentication message, and performs an aggregation operation on the third password identifier (that is, the signature) in each received second authentication message to generate a new aggregated signature Sig_AG Step S910: The relay node sends the second aggregation message to the cellular network authentication network element, where the second aggregation message may be (ID_Vec, m1, Sig_AG . . . ), where ID_Vec includes the second identity of each user equipment, m 1 is the fresh parameter Nonce_AU of the cellular network authentication network element that is encrypted by using the first identity of the cellular network authentication network element, " . . . " corresponds to other information that may exist in the second authentication message, and the Sig_AG is the aggregated signature.

Step S911: The cellular network authentication network element decrypts, by using the first identity of the cellular network authentication network element, the network-side nonce carried in the second aggregation message, verifies the aggregated signature Sig_AG2 in the second aggregation message with reference to information in the second aggregation message, and if the signature Sig_AG2 is verified successfully and the decrypted network-side nonce is the Nonce_AU of the cellular network authentication network element, generates a session key between the cellular network authentication network element and each user equipment with reference to the first identity of the cellular network authentication network element, the fresh parameter of the cellular network authentication network element, the second identity of each user equipment in the plurality of user equipments, and the fresh parameter of each user equipment in the plurality of user equipments. For example:

11a. The cellular network authentication network element calculates a session key between the cellular network authentication network element and the UE 1 based on the first identity of the cellular network authentication network element, the fresh parameter of the cellular network authentication network element, the second identity of the UE 1, and the fresh parameter of the UE 1. For example, the session key is K1'=KDF(K1, Nonce 1, Nonce_AU) and K1=e(xH(ID_AU), H(ID_UE1)), where xH(ID_AU) is the private key of the cellular network authentication network element that is obtained through calculation based on the first identity of the cellular network authentication network element, H(ID_UE1) is a public key of the UE 1 that is obtained based on the second identity of the UE 1, Nonce 1 is the fresh parameter nonce of the UE 1, and Nonce_AU is the fresh parameter nonce of the cellular network authentication network element. Therefore, it may also be understood that the cellular network authentication network element calculates the session key between the cellular network authentication network element and the UE 1 based on the private key of the cellular network authentication network element, the fresh parameter of the cellular network authentication network element, the public key of the UE 1, and the fresh parameter of the UE 1.

11b. The cellular network authentication network element calculates a session key between the cellular network authentication network element and the UE 2 based on the first identity of the cellular network authentication network element, the fresh parameter of the cellular network authentication network element, the second identity of the UE 2, and the fresh parameter of the UE 2. For example, the session key is K2'=KDF(K2, Nonce 2, Nonce_AU) and K2=e(xH(ID_AU), H(ID_UE2)), where xH(ID_AU) is the private key of the cellular network authentication network element that is obtained through calculation based on the first identity of the cellular network authentication network element, H(ID_UE2) is a public key of the UE 2 that is obtained based on the second identity of the UE 2, Nonce 2 is the fresh parameter nonce of the UE 2, and Nonce_AU is the fresh parameter nonce of the cellular network authentication network element. Therefore, it may also be understood that the cellular network authentication network element calculates the session key between the cellular network authentication network element and the UE 2 based on the private key of the cellular network authentication network element, the fresh parameter of the cellular network authentication network element, the public key of the UE 2, and the fresh parameter of the UE 2.

With reference to steps 901 to 911, the foregoing describes how to aggregate the signature in the first authentication message sent by each user equipment to reduce data overheads. For some reason, some user equipments may not expect that signatures in first authentication messages sent by the user equipments are aggregated by the relay node. Therefore, the first authentication message in the foregoing step 901 may further include a preference indicator UE_AGindicator, where the preference indicator UE_AGindicator is used to represent whether the user equipment that sends the first authentication message prefers aggregation of the signature in the first authentication message. For example, when UE_AGindicator=1, it indicates a preference for aggregation; or when UE_AGindicator=0, it indicates a nonpreference for aggregation.

Figures 1, 3N:
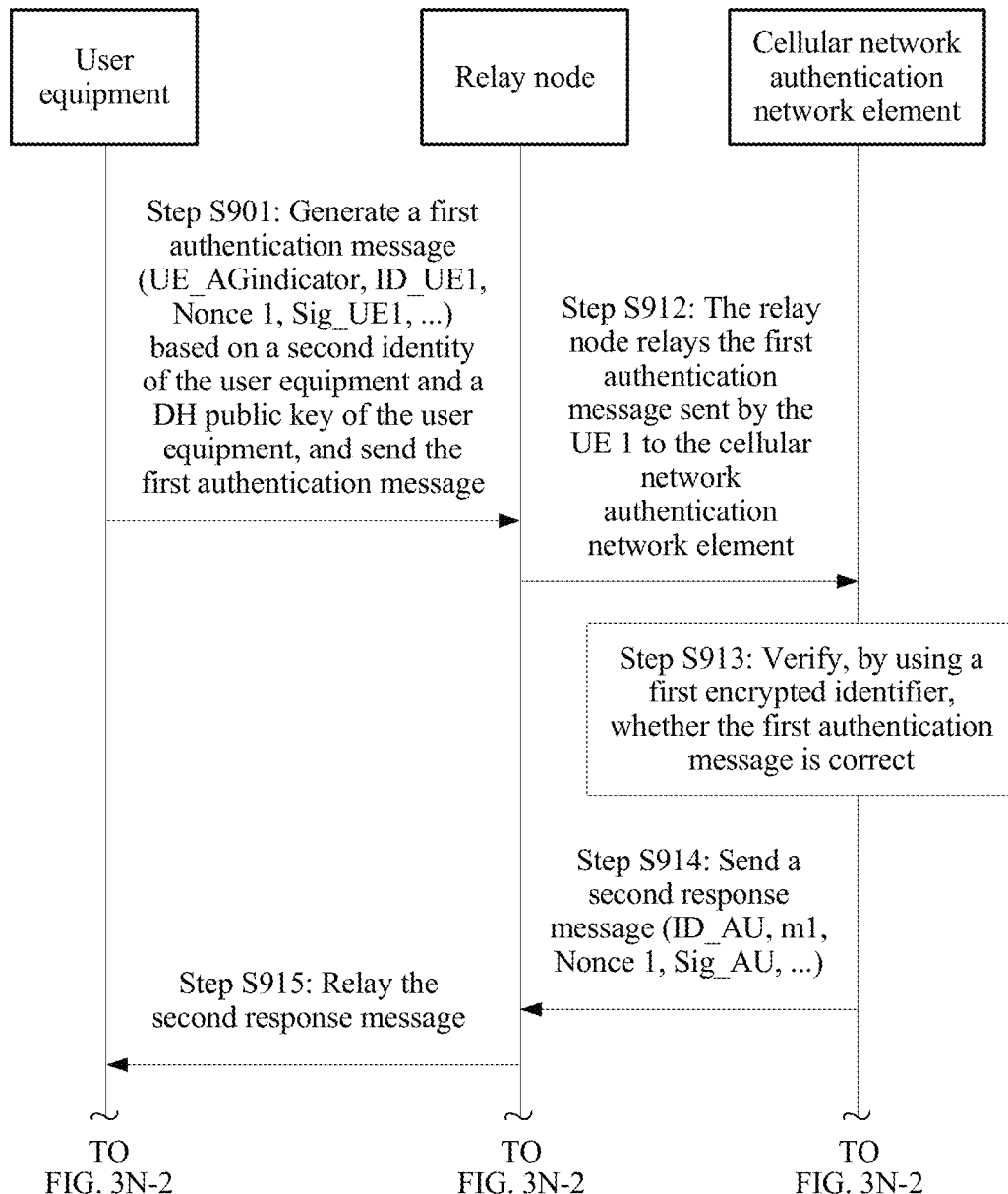
Figures 2, 3N:
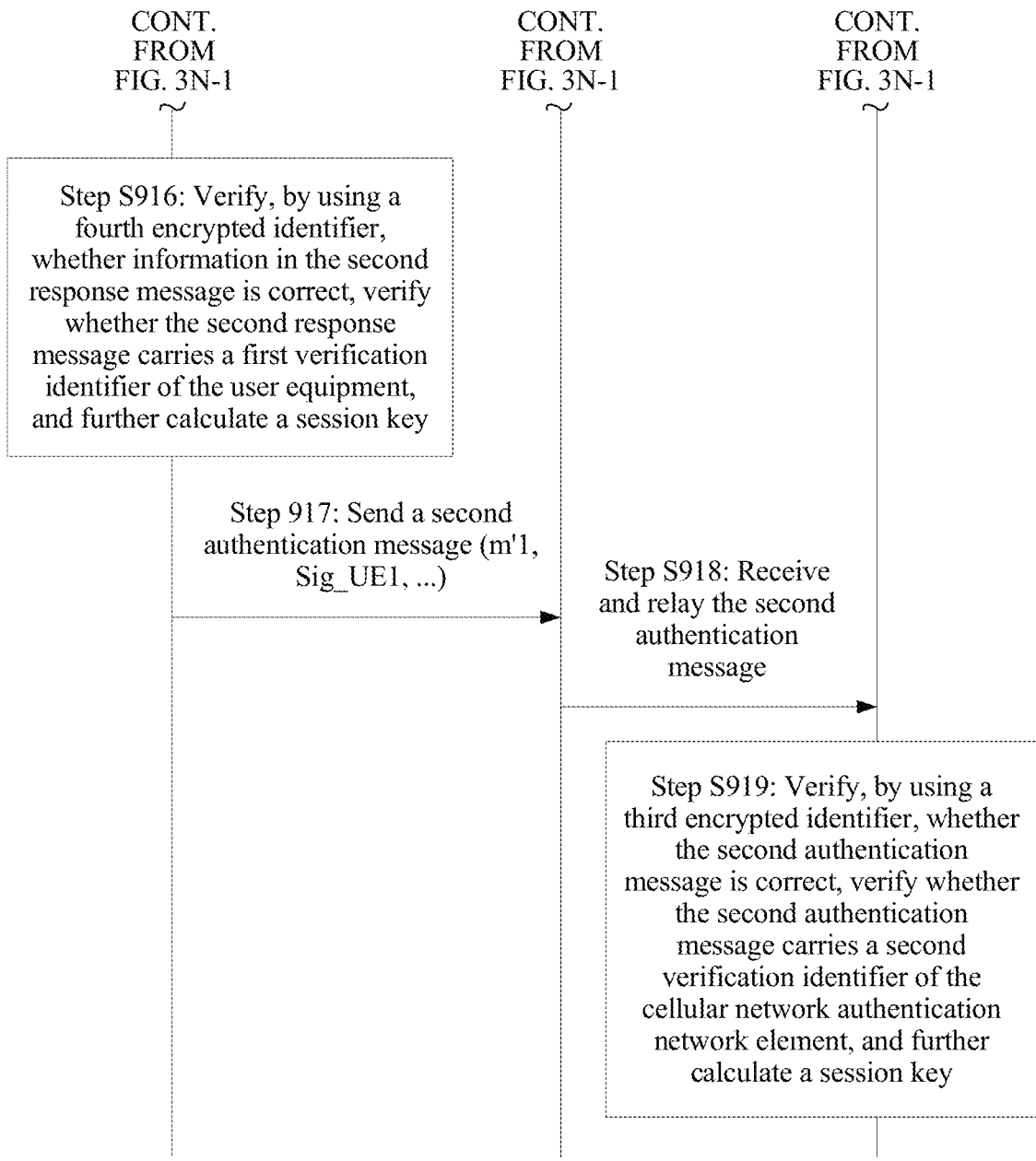

When the preference indicator indicates that the user equipment prefers aggregation of the signature in the first authentication message sent by the user equipment, the procedure of steps 902 to 911 is performed after the relay node learns the preference of the user equipment. Using the UE 1 as an example, when the preference indicator indicates that the UE does not prefer aggregation of the signature in the first authentication message sent by the UE 1, the procedure of steps 912 to 919 in FIG. 3N-1 and FIG. 3N-2 is performed after the relay node learns the nonpreference of the user equipment.

Step S912: The relay node relays the first authentication message sent by the UE 1 to the cellular network authentication network element, where the first authentication message may be (UE_AGindicator, ID_UE1, Nonce 1, Sig_UE1, . . . ), where preference indicator UE_AGindicator indicates that the UE 1 does not prefer aggregation of the signature in the first authentication message of the UE 1, ID_UE1 is the second identity of the UE 1, Nonce 1 is the fresh parameter of the UE 1, " . . . " indicates that other information may also exist in the first authentication message, and Sig_UE1 is a signature affixed to all or a part of information other than the Sig_UE1 in the first authentication message by using the private key of the user equipment UE 1.

Step S913: The cellular network authentication network element receives the first authentication message sent by the relay node, and verifies the signature Sig_UE1 in the first authentication message based on the information in the first authentication message; if the verification succeeds, it indicates that the information in the first authentication message is correct; and then the cellular network authentication network element generates a fresh parameter Nonce_AU.

Step S914: The cellular network authentication network element sends a second response message to the relay node, where the second response message may be (ID_AU, m1, Nonce 1, Sig_AU, . . . ), where ID_AU is a first identity of the cellular network authentication network element, m1 is the fresh parameter Nonce_AU of the cellular network authentication network element that is encrypted by using the second identity of the UE 1, Nonce 1 is the nonce of the UE 1 that is carried in the first authentication message, " . . . " indicates that other information may also exist in the second response message, and Sig_AU is a signature affixed to all or a part of information other than the Sig_AU in the second response message by using a private key of the cellular network authentication network element.

Step S915: The relay node receives the second response message and relays the second response message to the UE 1.

Step S916: The UE 1 receives the second response message, decrypts the fresh parameter Nonce_AU of the cellular network authentication network element from the second response message based on the second identity of the UE 1, and verifies the signature Sig_AU in the second response message with reference to the information in the second response message; if the signature Sig_AU is verified successfully and the second response message carries the fresh parameter Nonce 1 of the UE 1, it indicates that the information in the second response message is correct; and then the UE 1 generates a session key between the UE 1 and the cellular network authentication network element with reference to the first identity of the cellular network authentication network element, the second identity of the UE 1, the fresh parameter of the cellular network authentication network element, and the fresh parameter of the UE 1. For example, the session key is K1'=KDF(K1, Nonce 1, Nonce_AU) and K1=e(xH(ID_UE1), H(ID_AU)), where xH(ID_UE1) is the private key of the UE 1 that is obtained based on the second identity of the UE 1, and H(ID_AU) is a public key of the cellular network authentication network element that is obtained based on the first identity of the cellular network authentication network element. Therefore, it may also be understood that the session key between the UE 1 and the cellular network authentication network element is generated based on the public key of the cellular network authentication network element, the private key of the UE 1, the fresh parameter of the cellular network authentication network element, and the fresh parameter of the UE 1.

Step S917: The UE 1 sends a second authentication message to the relay node, where the second authentication message may be (m'1, Sig_UE1, . . . ), where m'1 is the fresh parameter Nonce_AU of the cellular network authentication network element that is encrypted by using the first identity of the cellular network authentication network element, " . . . " indicates that the second authentication message may further include other information, and Sig_UE1 is a signature affixed to all or a part of information other than the Sig_UE1 in the second authentication message by using the private key of the UE 1.

Step S918: The relay node receives the second authentication message and relays the second authentication message to the cellular network authentication network element.

Step S919: The cellular network authentication network element receives the second authentication message, decrypts the network-side fresh parameter nonce from the second authentication message by using the first identity of the cellular network authentication network element, and verifies the signature Sig_UE1 in the second authentication message with reference to the information in the second authentication message; if the signature Sig_UE1 is verified successfully and the decrypted network-side fresh parameter is the fresh parameter Nonce_AU of the cellular network authentication network element, it indicates that the information in the second authentication message is correct; and then the cellular network authentication network element calculates a session key between the cellular network authentication network element and the UE 1 based on the first identity of the cellular network authentication network element, the fresh parameter of the cellular network authentication network element, the second identity of the UE 1, and the fresh parameter of the UE 1. For example, the session key is K1'=KDF(K1, Nonce 1, Nonce_AU) and K1=e(xH(ID_AU), H(ID_UE1)), where xH(ID_AU) is the private key of the cellular network authentication network element that is obtained through calculation based on the first identity of the cellular network authentication network element, H(ID_UE1) is a public key of the UE 1 that is obtained based on the second identity of the UE 1, Nonce 1 is the fresh parameter nonce of the UE 1, and Nonce_AU is the fresh parameter nonce of the cellular network authentication network element. Therefore, it may also be understood that the cellular network authentication network element calculates the session key between the cellular network authentication network element and the UE 1 based on the private key of the cellular network authentication network element, the fresh parameter of the cellular network authentication network element, the public key of the UE 1, and the fresh parameter of the UE 1.

It may be understood that, in the solution described in steps S801 to S819, the second identity may be not only used to identify a source and a destination of a corresponding message, but also used to calculate a session key between the user equipment and the cellular network authentication network element; the first identity may be not only used to identify a source and a destination of a corresponding message, but also used to calculate a session key between the user equipment and the cellular network authentication network element; both the first verification identifier and the second verification identifier are fresh parameters nonces, so that a parameter exchanged between the user equipment and the cellular network authentication network element is updated as time changes, and that security performance is improved; the second identity and the first identity may be further used to encrypt the second verification identifier carried in an exchange process, so that security performance is further improved.

Figures 1, 3O:
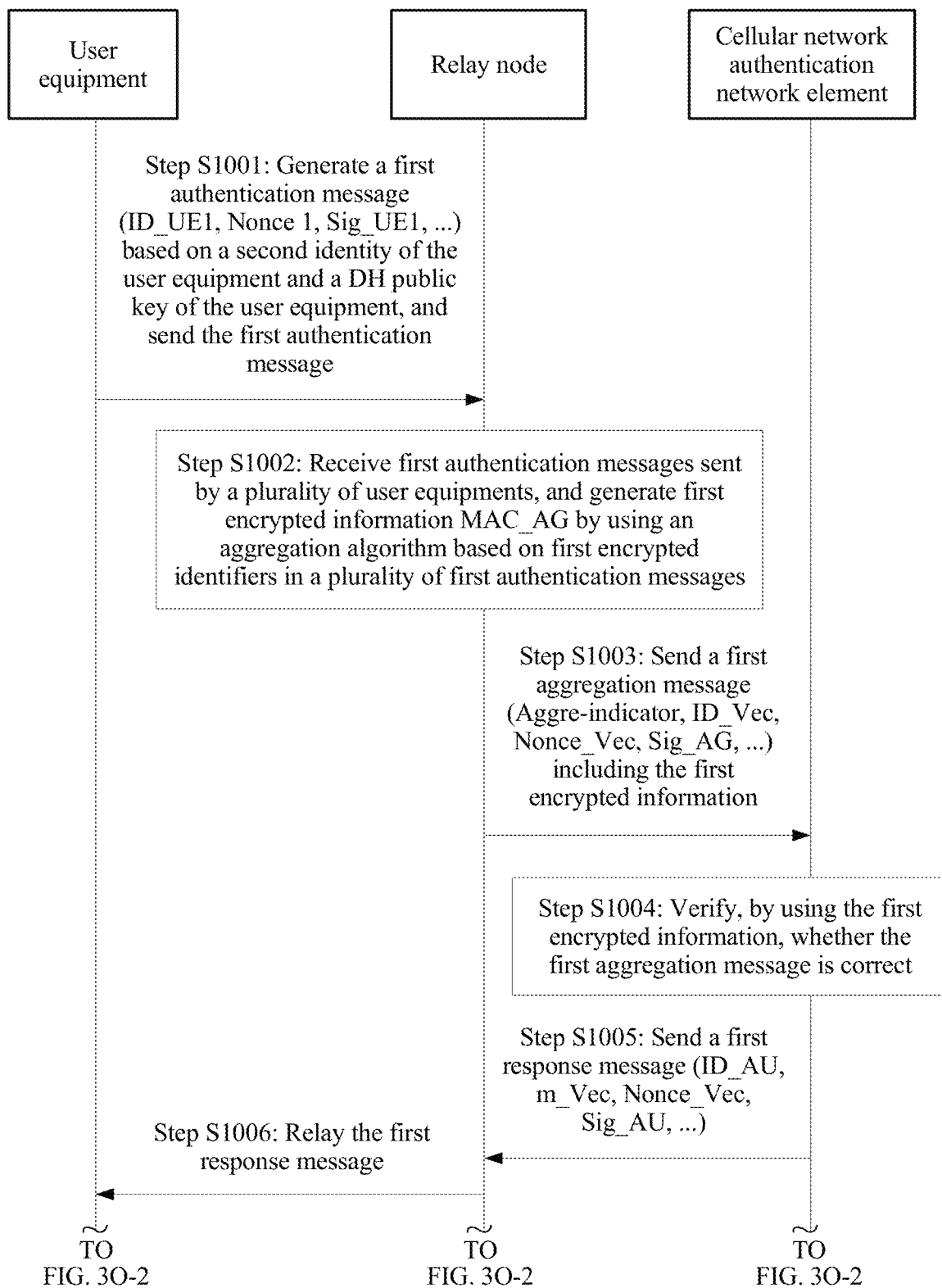
Figures 2, 3O:
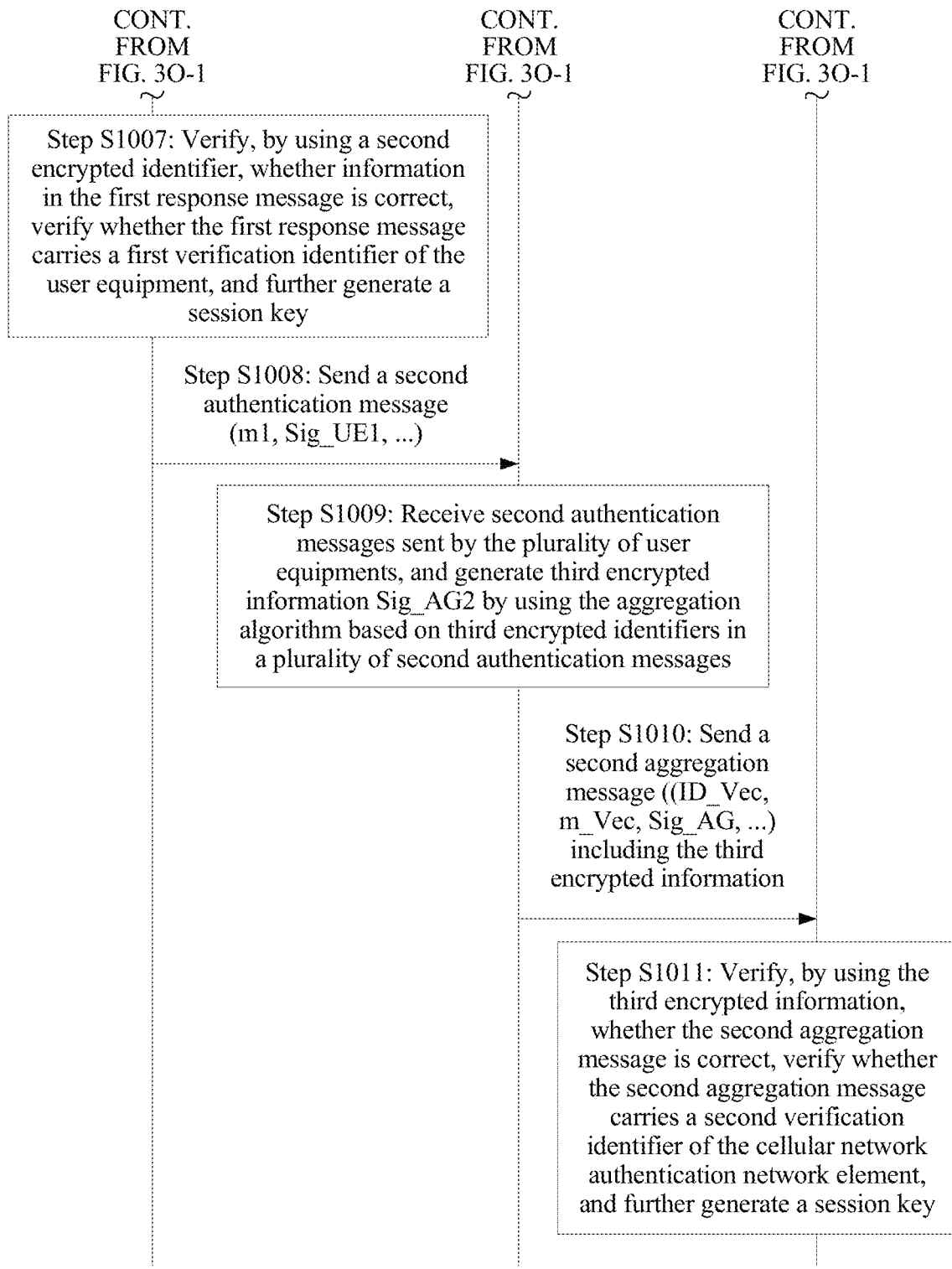

In another optional solution, the cellular network authentication network element is further configured to generate a symmetric key between the cellular network authentication network element and the user equipment based on the second identity, and the second verification identifier in the second authentication message is encrypted by using the symmetric key between the cellular network authentication network element and the user equipment. The following uses steps S1001 to S1011 in FIG. 3O-1 and FIG. 3O-2 as an example for description.

Step S1001: Each user equipment generates a first authentication message based on a second identity of the user equipment and a fresh parameter nonce (the nonce may be a parameter such as a random number or a sequence number) of the user equipment, and sends the first authentication message to the relay node, where the first authentication message includes the second identity, the nonce, and a first password identifier, and the first password identifier is a signature affixed to all or a part of information other than the first password identifier in the first authentication message by using a private key of the corresponding user equipment. For example:

1a. UE 1 generates a first authentication message and sends the first authentication message to the relay node, where the first authentication message may be (ID_UE1, Nonce 1, Sig_UE1, . . . ), where ID_UE1 is a second identity of the UE 1, Nonce 1 is a fresh parameter nonce of the UE 1, " . . . " indicates that other information may exist in the first authentication message, and Sig_UE1 is a signature affixed to the ID_UE1 and the Nonce 1 by using a private key of the UE 1.

1b UE 2 generates a first authentication message and sends the first authentication message to the relay node, where the first authentication message may be (ID_UE2, Nonce 2, Sig_UE2, . . . ), where ID_UE2 is a second identity of the UE 2, Nonce 2 is a fresh parameter nonce of the UE 2, " . . . " indicates that other information may exist in the first authentication message and Sig_UE2 is a signature affixed to the ID_UE2 and the Nonce 2 by using a private key of the UE 2.

Step S1002: The relay node receives the first authentication messages sent by the user equipments, and performs an aggregation operation on signatures in the received first authentication messages of the user equipments to generate an aggregated signature Sig_AG1, where the aggregated signature is the foregoing first encrypted information. When the user equipments are specifically the UE 1 and the UE 2, the relay node aggregates the signature in the first authentication message of the UE 1 and the signature in the first authentication message of the UE 2 to obtain an aggregated signature. For example, the aggregated signature is Sig_AG1=f(Sig_UE1, Sig_UE2). Optionally, a data length of the aggregated signature is the same as a data length of a separate signature of each user equipment.

Step S1003: The relay node generates a first aggregation message and sends the first aggregation message to a cellular network authentication network element (Authenticator). The first aggregation message may be (Aggre-indicator, ID_Vec, Nonce_Vec, Sig_AG, . . . ), where Aggre-indicator is an aggregate authentication indicator, ID_Vec includes the second identity of each user equipment, Nonce_Vec includes the nonce of each user equipment, " . . . " corresponds to other information that may exist in the first authentication message, and Sig_AG is the aggregated signature.

Step S1004: The cellular network authentication network element receives the first aggregation message, and verifies the aggregated signature Sig_AG1 with reference to information in the first aggregation message. If the verification succeeds, it indicates that the information in the first aggregation message is correct. It should be noted that, at least two network authentication modes, that is, aggregate authentication and non-aggregate authentication, may be preconfigured for the cellular network authentication network element. The cellular network authentication network element may determine, based on the aggregate authentication indicator Aggre-indicator in the first aggregation message, that the signature in the first aggregation message needs to be verified by using an aggregate authentication related policy.

Step S1005: The cellular network authentication network element sends a first response message to the relay node, where the first response message may be (ID_AU, m_Vec, Nonce_Vec, Sig_AU, . . . ), where ID_AU is a first identity of the cellular network authentication network element, m_Vec includes a plurality of encrypted nonces, each encrypted nonce is specifically obtained by encrypting a fresh parameter Nonce_AU of the cellular network authentication network element by using a symmetric key between the cellular network authentication network element and user equipment, and a symmetric key exists between each user equipment in the plurality of user equipments and the cellular network authentication network element. Optionally, m_Vec=[En(Nonce_AU, K1), En(Nonce_AU, K2)]^T, where En(Nonce_AU,K1) indicates a result of encrypting the fresh parameter Nonce_AU of the cellular network authentication network element by using a symmetric key K1 between the cellular network authentication network element and the UE 1; Nonce_Vec includes the nonce of each user equipment, " . . . " indicates that other information may exist in the first response message, Sig_AU is a signature affixed to all or a part of information other than the Sig_AU in the first response message by using a private key of the cellular network authentication network element, and the Sig_AU is the second password identifier described above.

Step S1006: The relay node receives the first response message, and relays the first response message to each user equipment UE separately. For example:

6a. The relay node relays the first response message to the UE 1.

6b. The relay node relays the first response message to the UE 2.

Step S1007: Each user equipment separately receives the first response message relayed by the relay node, and verifies the signature Sig_AU with reference to the information in the first response message; if the signature Sig_AU is verified successfully and the first response message carries the nonce of the user equipment, it indicates that the information in the first response message is correct; and then the user equipment generates a session key between the user equipment and the cellular network authentication network element with reference to the first identity of the cellular network authentication network element, the second identity of the user equipment, the fresh parameter of the user equipment, and the fresh parameter of the cellular network authentication network element, where the fresh parameter Nonce_AU of the cellular network authentication network element is decrypted by each user equipment from the m_Vec in the first response message by using the corresponding symmetric key of the user equipment (for example, the corresponding symmetric key of the UE 1 is K1, and a corresponding symmetric key of the UE 2 is K2). Because the first identity is a public key of the cellular network authentication network element, the private key of the user equipment may be obtained by using an identity based signature technology (English: Identity Based Signature, IBS for short) to process the second identity of the user equipment. Therefore, it may also be understood that the session key between the user equipment and the cellular network authentication network element is generated with reference to the public key of the cellular network authentication network element, the private key of the user equipment, the fresh parameter of the cellular network authentication network element, and the fresh parameter of the user equipment. For example:

7a. The UE 1 verifies the signature Sig_AU, and if the signature Sig_AU is verified successfully and the first response message carries the Nonce 1 of the UE 1, generates a session key between the UE 1 and the cellular network authentication network element with reference to the first identity of the cellular network authentication network element, the second identity of the UE 1, the fresh parameter of the cellular network authentication network element, and the fresh parameter of the UE 1. For example, the session key is K1'=KDF(K1, Nonce 1, Nonce_AU) and K1=e(xH (ID_UE1), where xH(ID_UE1) is the private key of the UE 1 that is obtained based on the second identity of the UE 1, and H(ID_AU) is the public key of the cellular network authentication network element that is obtained based on the first identity of the cellular network authentication network element. Therefore, it may also be understood that the session key between the UE 1 and the cellular network authentication network element is generated based on the public key of the cellular network authentication network element, the private key of the UE 1, the fresh parameter of the cellular network authentication network element, and the fresh parameter of the UE 1. The fresh parameter Nonce_AU of the cellular network authentication network element is decrypted by the UE 1 from the m_Vec in the first response message by using the symmetric key K1 between the UE 1 and the cellular network authentication network element.

7b. The UE 2 verifies the signature Sig_AU, and if the signature Sig_AU is verified successfully and the first response message carries the Nonce 2 of the UE 2, generates a session key between the UE 2 and the cellular network authentication network element with reference to the first identity of the cellular network authentication network element, the second identity of the UE 2, the fresh parameter of the cellular network authentication network element, and the fresh parameter of the UE 2. For example, the session key is K2'=KDF(K2, Nonce 2, Nonce_AU) and K2=e(xH (ID_UE2), where xH(ID_UE2) is the private key of the UE 2 that is obtained based on the second identity of the UE 2, and H(ID_AU) is the public key of the cellular network authentication network element that is obtained based on the first identity of the cellular network authentication network element. Therefore, it may also be understood that the session key between the UE 2 and the cellular network authentication network element is generated based on the public key of the cellular network authentication network element, the private key of the UE 2, the fresh parameter of the cellular network authentication network element, and the fresh parameter of the UE 2. The fresh parameter Nonce_AU of the cellular network authentication network element is decrypted by the UE 2 from the m_Vec in the first response message by using the symmetric key K2 between the UE 2 and the cellular network authentication network element.

Step S1008: If each user equipment verifies the signature Sig_AU successfully and confirms that the first response message carries the nonce of the user equipment, each user equipment sends a second authentication message to the relay node separately, where the second authentication message includes a DH public key of the cellular network authentication network element and a third password identifier, and the third password identifier is a signature affixed to a part or all of information other than the third password identifier in the second authentication message by using the private key of the user equipment. For example:

8a. The UE 1 sends a second authentication message (m1, Sig_UE1, . . . ) to the relay node, where m1 is the fresh parameter Nonce_AU of the cellular network authentication network element that is encrypted by using the symmetric key K1 between the UE 1 and the cellular network authentication network element, " . . . " indicates that the second authentication message may include other information, and Sig_UE1 is a signature affixed to the m1 by using the private key of the UE 1.

8b. The UE 2 sends a second authentication message (m2, Sig_UE2, . . . ) to the relay node, where m2 is the fresh parameter Nonce_AU of the cellular network authentication network element that is encrypted by using the symmetric key K2 between the UE 2 and the cellular network authentication network element, " . . . " indicates that the second authentication message may include other information, and Sig_UE2 is a signature affixed to the m2 by using the private key of the UE 2.

Step S1009: The relay node receives the second authentication message, and performs an aggregation operation on the third password identifier (that is, the signature) in each received second authentication message to generate a new aggregated signature Sig_AG Step S1010: The relay node sends the second aggregation message to the cellular network authentication network element, where the second aggregation message may be (ID_Vec, m_Vec, Sig_AG, . . . ), where ID_Vec includes the second identity of each user equipment, m_Vec includes a plurality of encrypted nonces, each encrypted nonce is specifically obtained by encrypting the fresh parameter Nonce_AU of the cellular network authentication network element by using the symmetric key between the cellular network authentication network element and the user equipment in the plurality of user equipments, the plurality of encrypted nonces correspond to the plurality of user equipments on a one-to-one basis, " . . . " corresponds to other information that may exist in the second authentication message, and the Sig_AG is the aggregated signature.

Step S1011: The cellular network authentication network element decrypts, by using the corresponding symmetric key, the network-side nonce carried in the second aggregation message, verifies the aggregated signature Sig_AG2 in the second aggregation message with reference to information in the second aggregation message, and if the signature Sig_AG2 is verified successfully and the decrypted network-side nonce is the Nonce_AU of the cellular network authentication network element, generates a session key between the cellular network authentication network element and each user equipment with reference to the first identity of the cellular network authentication network element, the fresh parameter of the cellular network authentication network element, the second identity of each user equipment in the plurality of user equipments, and the fresh parameter of each user equipment in the plurality of user equipments. For example:

11a. The cellular network authentication network element calculates a session key between the cellular network authentication network element and the UE 1 based on the first identity of the cellular network authentication network element, the fresh parameter of the cellular network authentication network element, the second identity of the UE 1, and the fresh parameter of the UE 1. For example, the session key is K1'=KDF(K1, Nonce 1, Nonce_AU) and K1=e(xH(ID_AU), H(ID_UE1)), where xH(ID_AU) is the private key of the cellular network authentication network element that is obtained through calculation based on the first identity of the cellular network authentication network element, H(ID_UE1) is a public key of the UE 1 that is obtained based on the second identity of the UE 1, Nonce 1 is the fresh parameter nonce of the UE 1, and Nonce_AU is the fresh parameter nonce of the cellular network authentication network element. Therefore, it may also be understood that the cellular network authentication network element calculates the session key between the cellular network authentication network element and the UE 1 based on the private key of the cellular network authentication network element, the fresh parameter of the cellular network authentication network element, the public key of the UE 1, and the fresh parameter of the UE 1.

11b. The cellular network authentication network element calculates a session key between the cellular network authentication network element and the UE 2 based on the first identity of the cellular network authentication network element, the fresh parameter of the cellular network authentication network element, the second identity of the UE 2, and the fresh parameter of the UE 2. For example, the session key is K2'=KDF(K2, Nonce 2, Nonce_AU) and K2=e(xH(ID_AU), H(ID_UE2)), where xH(ID_AU) is the private key of the cellular network authentication network element that is obtained through calculation based on the first identity of the cellular network authentication network element, H(ID_UE2) is a public key of the UE 2 that is obtained based on the second identity of the UE 2, Nonce 2 is the fresh parameter nonce of the UE 2, and Nonce_AU is the fresh parameter nonce of the cellular network authentication network element. Therefore, it may also be understood that the cellular network authentication network element calculates the session key between the cellular network authentication network element and the UE 2 based on the private key of the cellular network authentication network element, the fresh parameter of the cellular network authentication network element, the public key of the UE 2, and the fresh parameter of the UE 2.

With reference to steps 1001 to 1011, the foregoing describes how to aggregate the signature in the first authentication message sent by each user equipment to reduce data overheads. For some reason, some user equipments may not expect that signatures in first authentication messages sent by the user equipments are aggregated by the relay node. Therefore, the first authentication message in the foregoing step 1001 may further include a preference indicator UE_AGindicator, where the preference indicator UE_AGindicator is used to represent whether the user equipment that sends the first authentication message prefers aggregation of the signature in the first authentication message. For example, when UE_AGindicator=1, it indicates a preference for aggregation; or when UE_AGindicator=0, it indicates a nonpreference for aggregation.

Figures 1, 3P:
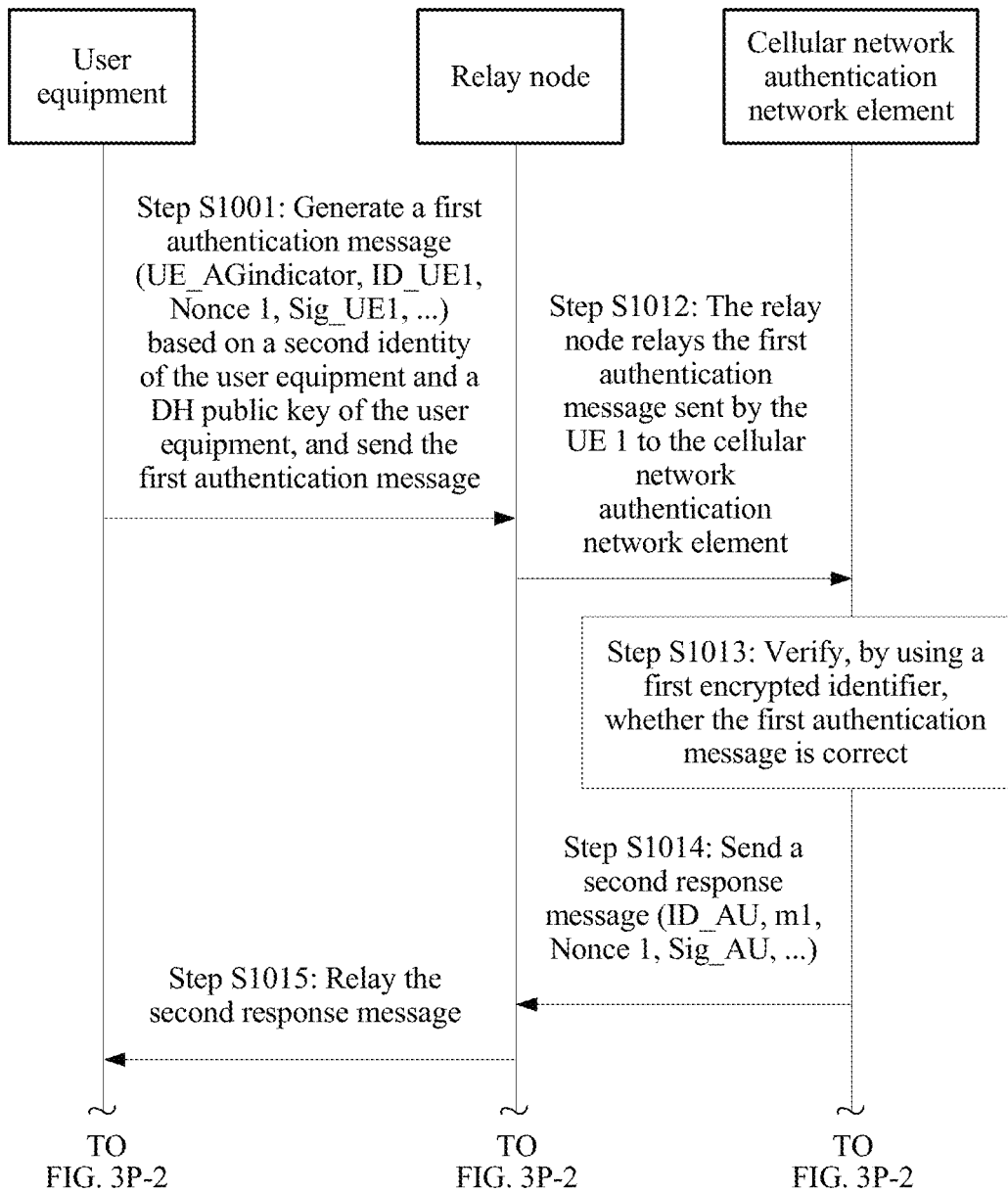
Figures 2, 3P:
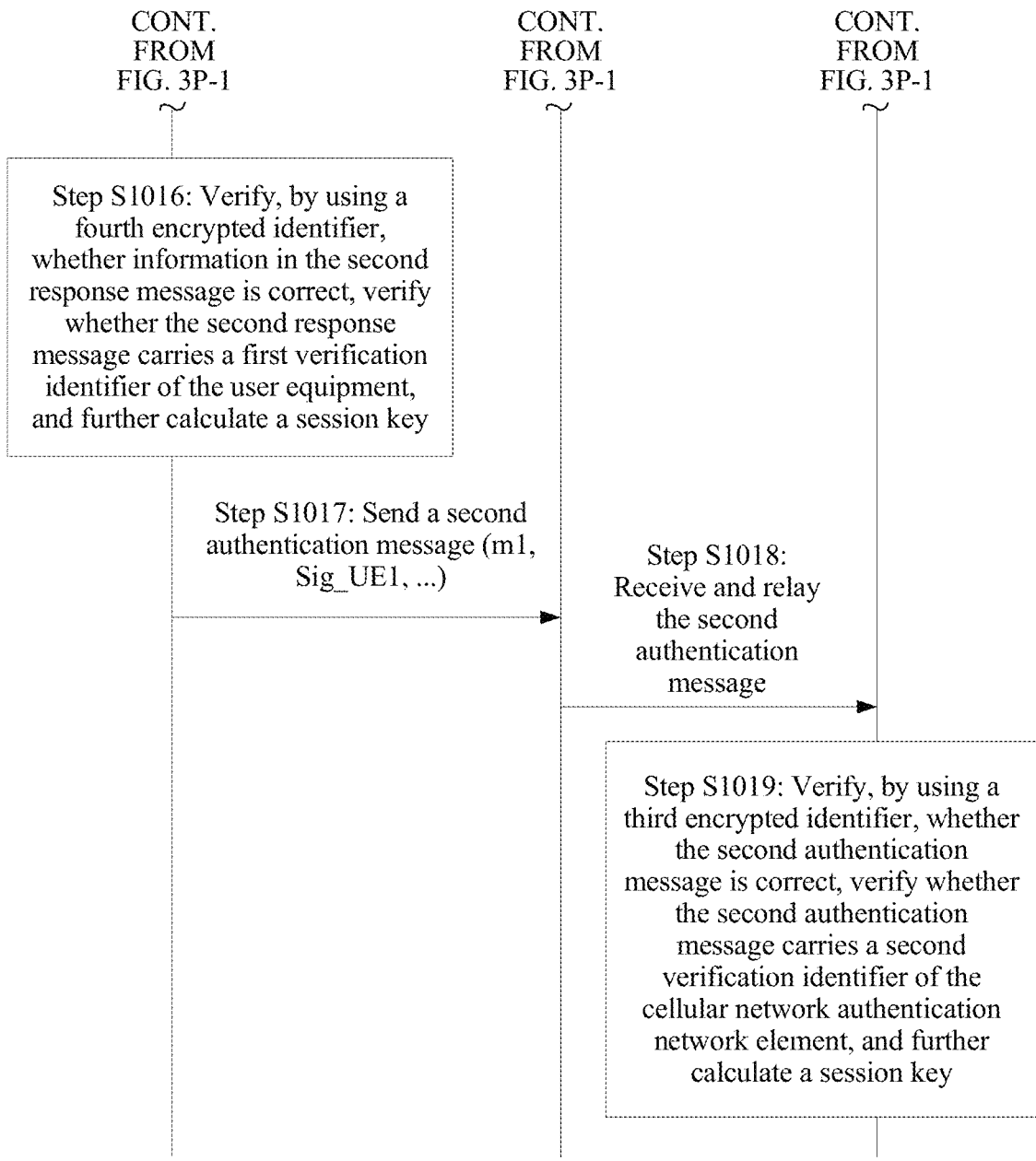

When the preference indicator indicates that the user equipment prefers aggregation of the signature in the first authentication message sent by the user equipment, the procedure of steps 1002 to 1011 is performed after the relay node learns the preference of the user equipment. Using the UE 1 as an example, when the preference indicator indicates that the UE does not prefer aggregation of the signature in the first authentication message sent by the UE 1, the procedure of steps 1012 to 1019 in FIG. 3P-1 and FIG. 3P-2 is performed after the relay node learns the nonpreference of the user equipment.

Step S1012: The relay node relays the first authentication message sent by the UE 1 to the cellular network authentication network element, where the first authentication message may be (UE_AGindicator, ID_UE1, Nonce 1, Sig_UE1, . . . ), where preference indicator UE_AGindicator indicates that the UE 1 does not prefer aggregation of the signature in the first authentication message of the UE 1, ID_UE1 is the second identity of the UE 1, Nonce 1 is the fresh parameter of the UE 1, " . . . " indicates that other information may also exist in the first authentication message, and Sig_UE1 is a signature affixed to all or a part of information other than the Sig_UE1 in the first authentication message by using the private key of the user equipment UE 1.

Step S1013: The cellular network authentication network element receives the first authentication message sent by the relay node, and verifies the signature Sig_UE1 in the first authentication message based on the information in the first authentication message; if the verification succeeds, it indicates that the information in the first authentication message is correct; and then the cellular network authentication network element generates a fresh parameter Nonce_AU.

Step S1014: The cellular network authentication network element sends a second response message to the relay node, where the second response message may be (ID_AU, m1, Nonce 1, Sig_AU, . . . ), where ID_AU is a first identity of the cellular network authentication network element, m1 is the fresh parameter Nonce_AU of the cellular network authentication network element that is encrypted by using a symmetric key between the UE 1 and the cellular network authentication network element, Nonce 1 is the nonce of the UE 1 that is carried in the first authentication message, " . . . " indicates that other information may also exist in the second response message, and Sig_AU is a signature affixed to all or a part of information other than the Sig_AU in the second response message by using a private key of the cellular network authentication network element.

Step S1015: The relay node receives the second response message and relays the second response message to the UE 1.

Step S1016: The UE 1 receives the second response message, decrypts the fresh parameter Nonce_AU of the cellular network authentication network element from the second response message by using the symmetric key between the UE 1 and the cellular network authentication network element, and verifies the signature Sig_AU in the second response message with reference to the information in the second response message; if the signature Sig_AU is verified successfully and the second response message carries the fresh parameter Nonce 1 of the UE 1, it indicates that the information in the second response message is correct; and then the UE 1 generates a session key between the UE 1 and the cellular network authentication network element with reference to the first identity of the cellular network authentication network element, the second identity of the UE 1, the fresh parameter of the cellular network authentication network element, and the fresh parameter of the UE 1. For example, the session key is K1'=KDF(K1, Nonce 1, Nonce_AU) and K1=e(xH(ID_UE1), H(ID_AU)), where xH(ID_UE1) is the private key of the UE 1 that is obtained based on the second identity of the UE 1, and H(ID_AU) is a public key of the cellular network authentication network element that is obtained based on the first identity of the cellular network authentication network element. Therefore, it may also be understood that the session key between the UE 1 and the cellular network authentication network element is generated based on the public key of the cellular network authentication network element, the private key of the UE 1, the fresh parameter of the cellular network authentication network element, and the fresh parameter of the UE 1.

Step S1017: The UE 1 sends a second authentication message to the relay node, where the second authentication message may be (m1, Sig_UE1, . . . ), where m1 is the fresh parameter Nonce_AU of the cellular network authentication network element that is encrypted by using the symmetric key between the UE 1 and the cellular network authentication network element, " . . . " indicates that the second authentication message may further include other information, and Sig_UE1 is a signature affixed to all or a part of information other than the Sig_UE1 in the second authentication message by using the private key of the UE 1.

Step S1018: The relay node receives the second authentication message and relays the second authentication message to the cellular network authentication network element.

Step S1019: The cellular network authentication network element receives the second authentication message, decrypts the network-side fresh parameter nonce from the second authentication message by using a symmetric key between the cellular network authentication network element and the UE 1, and verifies the signature Sig_UE1 in the second authentication message with reference to the information in the second authentication message; if the signature Sig_UE1 is verified successfully and the decrypted network-side fresh parameter is the fresh parameter Nonce_AU of the cellular network authentication network element, it indicates that the information in the second authentication message is correct; and then the cellular network authentication network element calculates a session key between the cellular network authentication network element and the UE 1 based on the first identity of the cellular network authentication network element, the fresh parameter of the cellular network authentication network element, the second identity of the UE 1, and the fresh parameter of the UE 1. For example, the session key is K1'=KDF(K1, Nonce 1, Nonce_AU) and K1=e(xH(ID_AU), H(ID_UE1)), where xH(ID_AU) is the private key of the cellular network authentication network element that is obtained through calculation based on the first identity of the cellular network authentication network element, H(ID_UE1) is a public key of the UE 1 that is obtained based on the second identity of the UE 1, Nonce 1 is the fresh parameter nonce of the UE 1, and Nonce_AU is the fresh parameter nonce of the cellular network authentication network element. Therefore, it may also be understood that the cellular network authentication network element calculates the session key between the cellular network authentication network element and the UE 1 based on the private key of the cellular network authentication network element, the fresh parameter of the cellular network authentication network element, the public key of the UE 1, and the fresh parameter of the UE 1.

It may be understood that, in the solution described in steps S801 to S819, the second identity may be not only used to identify a source and a destination of a corresponding message, but also used to calculate a session key between the user equipment and the cellular network authentication network element; the first identity may be not only used to identify a source and a destination of a corresponding message, but also used to calculate a session key between the user equipment and the cellular network authentication network element; both the first verification identifier and the second verification identifier are fresh parameters nonces, so that a parameter exchanged between the user equipment and the cellular network authentication network element is updated as time changes, and that security performance is improved; the information carrying the second verification identifier is encrypted by using a symmetric key in an exchange process, so that security performance is further improved.

It should be noted that, when no session key is successfully created between the user equipment and the cellular network authentication network element after the relay node performs an aggregation operation on the first password identifiers in the plurality of first authentication messages, the foregoing solution may be performed again to create a session key. The relay node may further adjust a network authentication policy. There are a lot of adjusted policies. The following uses a policy 1 and a policy 2 as an example for description.

Figure 3Q:
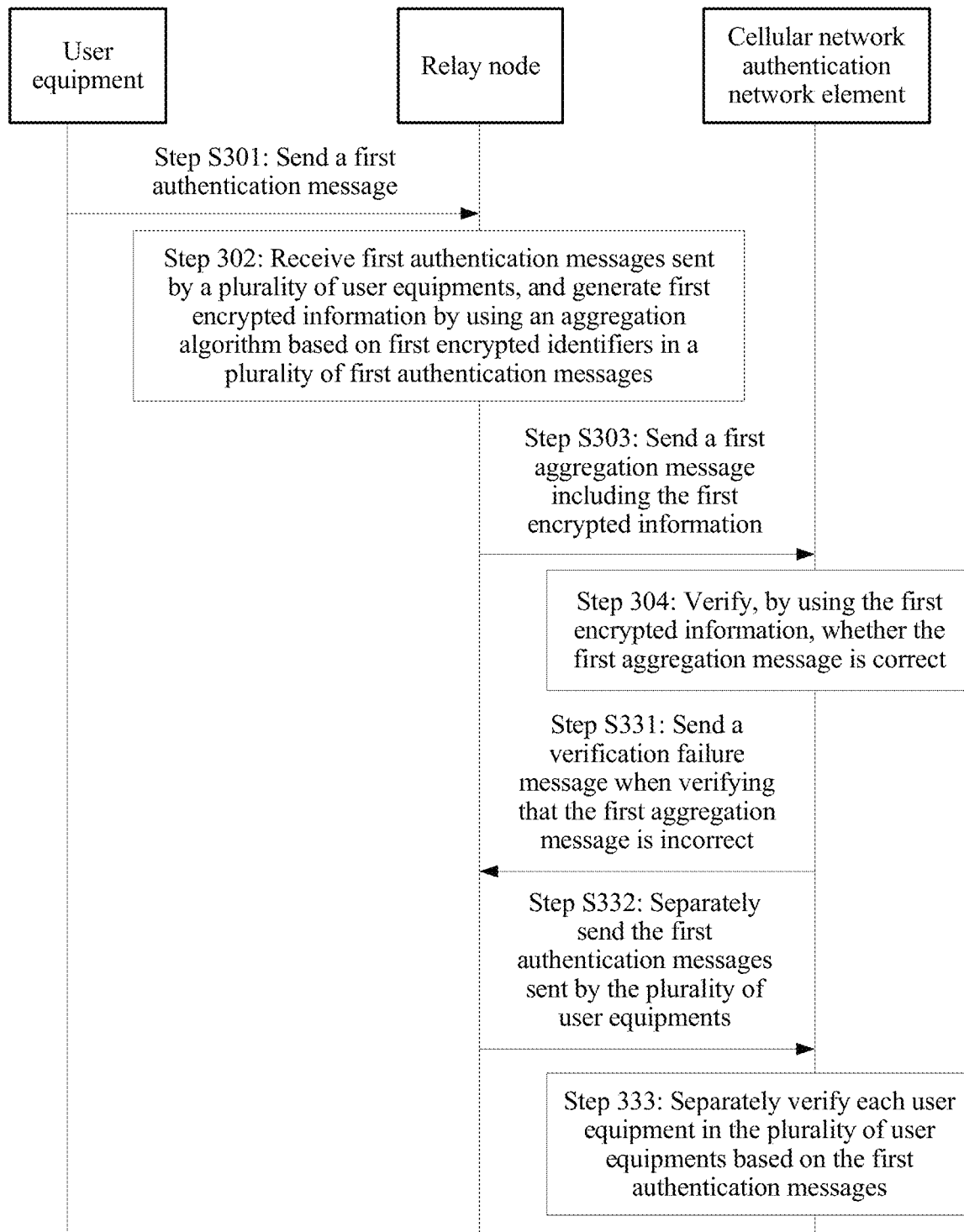
FIG. 3Q is a schematic flowchart of another network authentication method according to an embodiment of the present disclosure.

Policy 1: Perform steps S331 to S333 shown in FIG. 3Q.

Step S331: The cellular network authentication network element sends a verification failure message to the relay node when verifying that the information in the first aggregation message is incorrect.

Step S332: The relay node receives the verification failure message, and separately relays, to the cellular authentication network element based on the verification failure message, the first authentication messages sent by the plurality of user equipments.

Specifically, when the relay node learns, from the verification failure message, that the cellular network authentication network element verifies that the information in the second aggregation message is incorrect, the relay node separately relays, to the cellular network authentication network element, the first authentication messages that should have been aggregated to the first aggregation message. For example, if the first password information in the first aggregation message is obtained by aggregating first password identifiers in three first authentication messages, the relay node separately relays the three first authentication messages to the cellular network authentication network element, without aggregating information in the three first authentication messages.

Step S333: The cellular network authentication network element separately verifies each user equipment in the plurality of user equipments based on the first authentication messages.

Specifically, the cellular network authentication network element receives the first authentication messages instead of the first aggregation message. Because the cellular network authentication network element receives the first authentication messages corresponding to the plurality of user equipments, the cellular network authentication network element separately verifies each user equipment based on each first authentication message, and if the verification succeeds, sends a third response message to the relay node, where the third response message differs from the first response message in that the third response message includes a first verification identifier of a single user equipment but the first response message includes first verification identifiers of the plurality of user equipments.

Policy 2: Perform steps S333 to S337 shown in FIG. 3R.

Step S334: The cellular network authentication network element sends a verification failure message to the relay node when verifying that the information in the first aggregation message is incorrect.

Step S335: The relay node receives the verification failure message, and generates fourth encrypted information by using the aggregation algorithm based on the verification failure message and based on the third encrypted identifiers in a part of the first authentication messages sent by the plurality of user equipments.

Step S336: The relay node sends a third aggregation message to the cellular network authentication network element, where the third aggregation message includes the fourth encrypted information, the second identities in the part of the first authentication messages, and the first verification identifiers in the part of the first authentication messages.

Specifically, when the relay node learns, from the verification failure message, that the cellular network authentication network element verifies that the information in the second aggregation message is incorrect, the relay node divides the first authentication messages that should have been aggregated to the first aggregation message, into a plurality of parts, where each part may form a third aggregation message; and the relay node sends the third aggregation message to the cellular network authentication network element for performing authentication.

Step S337: The cellular network authentication network element is further configured to receive the third aggregation message, and verify, by using the fourth encrypted information, whether information in the third aggregation message is correct.

Specifically, the cellular network authentication network element receives the third aggregation message instead of the first aggregation message. Therefore, the cellular network authentication network element verifies a part of user equipments based on the third aggregation message, and if the verification succeeds, sends a fourth response message to the relay node, where the fourth response message differs from the first response message in that a quantity of first verification identifiers of user equipments included in the fourth response message is less than a quantity of first verification identifiers of user equipments included in the first response message.

In the foregoing method embodiments, the user equipment sends the first authentication message required for network authentication to the relay node first; the relay node performs an aggregation budget on the signatures or the message authentication codes in the first authentication messages sent by the plurality of user equipments, to obtain the aggregated signature or the aggregated authentication code; and the relay node sends, to the cellular network authentication network element in a unified manner, the information in the first authentication messages sent by the plurality of users other than the signatures and the authentication codes. For the messages sent in the unified manner, message correctness is ensured based on the aggregated signature and the aggregated authentication code. Correspondingly, the cellular network synchronously authenticates the plurality of user equipments based on the received information. Therefore, data overheads in the authentication process are reduced.

The methods in the embodiments of the present disclosure are described in detail above. For ease of better implementing the foregoing solutions in the embodiments of the present disclosure, correspondingly, the following provides an apparatus in an embodiment of the present disclosure.

Figure 4:
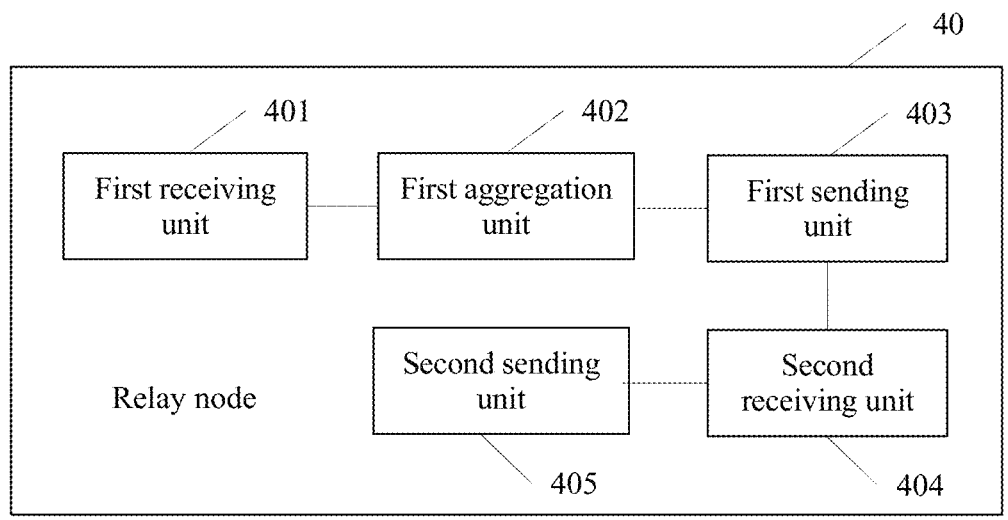
FIG. 4 is a schematic structural diagram of a relay node according to an embodiment of the present disclosure.

FIG. 4 is a schematic structural diagram of a relay node 40 according to an embodiment of the present disclosure. The relay node 40 may include a first receiving unit 401, a first aggregation unit 402, a first sending unit 403, a second receiving unit 404, and a second sending unit 405. Detailed descriptions of each unit are as follows:

The first receiving unit 401 is configured to receive a first authentication message sent by each user equipment in a plurality of user equipments, where the first authentication message sent by each user equipment includes a first verification identifier of the user equipment and a first encrypted identifier, the first verification identifier is used by a cellular network authentication network element to verify an identity of the user equipment, and the first encrypted identifier is an encrypted sequence of information other than the first encrypted identifier in the first authentication message.

The first aggregation unit 402 is configured to generate first encrypted information by using an aggregation algorithm based on the first encrypted identifiers in the first authentication messages sent by the plurality of user equipments.

The first sending unit 403 is configured to send a first aggregation message to the cellular network authentication network element, where the first aggregation message includes the first encrypted information and the first verification identifiers in the first authentication messages sent by the plurality of user equipments.

The second receiving unit 404 is configured to receive a first response message sent by the cellular network authentication network element, where the first response message is generated by the cellular network authentication network element after the cellular network authentication network element verifies, based on the first encrypted message, that information in the first aggregation message is correct, the first response message includes a second verification identifier of the cellular network authentication network element, a second encrypted identifier, and the first verification identifiers in the first authentication messages sent by the plurality of user equipments, and the second encrypted identifier is an encrypted sequence of information other than the second verification identifier in the first response message.

The second sending unit 405 is configured to relay the first response message to the user equipment, where the first verification identifier in the first response message is used by the user equipment to verify whether an identity of the cellular network authentication network element is secure, and the user equipment relays the second verification identifier in the first response message to the cellular network authentication network element, so that the cellular network authentication network element verifies whether an identity of the user equipment is secure.

By running the foregoing units, the user equipment sends the first authentication message required for network authentication to the relay node first; the relay node performs an aggregation budget on the signatures or the message authentication codes in the first authentication messages sent by the plurality of user equipments, to obtain the aggregated signature or the aggregated authentication code; and the relay node sends, to the cellular network authentication network element in a unified manner, the information in the first authentication messages sent by the plurality of users other than the signatures and the authentication codes. For the messages sent in the unified manner, message correctness is ensured based on the aggregated signature and the aggregated authentication code. Correspondingly, the cellular network synchronously authenticates the plurality of user equipments based on the received information. Therefore, data overheads in the authentication process are reduced.

In an optional solution, the relay node 40 further includes:

a third receiving unit, configured to receive second authentication messages sent by the plurality of user equipments, where the second authentication message is generated by the user equipment after the user equipment determines that the first response message includes the first verification identifier of the user equipment and verifies, based on the second encrypted identifier, that the information in the first response message is correct, the second authentication message includes the second verification identifier and a third encrypted identifier, and the third encrypted identifier is an encrypted sequence of information other than the third encrypted identifier in the second authentication message;

a second aggregation unit, configured to generate third encrypted information by using the aggregation algorithm based on the third encrypted identifiers in the second authentication messages sent by the plurality of user equipments; and a third sending unit, configured to send a second aggregation message to the cellular network authentication network element, where the second aggregation message includes the third encrypted information and the second verification identifier that is carried in the second authentication message, and the second verification identifier in the second aggregation message is used by the cellular network authentication network element to verify whether identities of the plurality of user equipments are secure.

In another optional solution, the first response message includes a first identity of the cellular network authentication network element, and the second verification identifier in the second authentication message is encrypted by using the first identity of the cellular network authentication network element.

In another optional solution, the second verification identifier in the second authentication message is encrypted by using a symmetric key between the cellular network authentication network element and the user equipment.

In another optional solution, the first verification identifier is a DH public key of the user equipment, and the first encrypted identifier is a signature affixed to the information other than the first encrypted identifier in the first authentication message by using a private key of the user equipment.

In another optional solution, the second verification identifier is a DH public key of the cellular network authentication network element, and the second encrypted identifier is a signature affixed to the information other than the second encrypted identifier in the first response message by using a private key of the cellular network authentication network element.

In another optional solution, the first verification identifier is a fresh parameter nonce of the user equipment, and the first encrypted identifier is a signature affixed to the information other than the first encrypted identifier in the first authentication message by using a private key of the user equipment.

In another optional solution, the second verification identifier is a fresh parameter nonce of the cellular network authentication network element, and the second encrypted identifier is a signature affixed to the information other than the second encrypted identifier in the first response message by using a private key of the cellular network authentication network element.

In another optional solution, the first verification identifier is a fresh parameter nonce of the user equipment, the first aggregation message includes a second identity of each user equipment in the plurality of user equipments, and the first authentication message includes the first identity of the cellular network authentication network element; and the first sending unit is specifically configured to send, based on the first identity in the first authentication message, the first aggregation message to the cellular network authentication network element corresponding to the first identity; where the first verification identifier in the first authentication message is encrypted by using the first identity of the cellular network authentication network element, the first verification identifier in the first response message is encrypted by using the second identity of the user equipment, and the first encrypted identifier is a signature affixed to the information other than the first encrypted identifier in the first authentication message by using a private key of the user equipment.

In another optional solution, the second verification identifier is the nonce of the cellular network authentication network element, and the second encrypted identifier is a signature affixed to the information other than the second encrypted identifier in the first response message by using a private key of the cellular network authentication network element.

In another optional solution, the first verification identifier is a nonce of the user equipment, and the first authentication message includes the first identity of the cellular network authentication network element; and the first sending unit is specifically configured to send, based on the first identity in the first verification message, the first aggregation message to the cellular network authentication network element corresponding to the first identity; where the first verification identifier in the first authentication message is encrypted by using a prestored symmetric key between the user equipment and the cellular network authentication network element, the first verification identifier in the first response message is encrypted by using the prestored symmetric key between the user equipment and the cellular network authentication network element, and the first encrypted identifier is a signature affixed to the information other than the first encrypted identifier in the first authentication message by using a private key of the user equipment.

In another optional solution, the second verification identifier is the nonce of the cellular network authentication network element, and the second encrypted identifier is a signature affixed to the information other than the second encrypted identifier in the first response message by using a private key of the cellular network authentication network element.

In another optional solution, the first verification identifier is a fresh parameter nonce of the user equipment, and the first authentication message includes the first identity of the cellular network authentication network element; and the first sending unit is specifically configured to send, based on the first identity in the first authentication message, the first aggregation message to the cellular network authentication network element corresponding to the first identity; where the first verification identifier in the first authentication message is encrypted by using a prestored symmetric key between the user equipment and the cellular network authentication network element, the first verification identifier in the first response message is encrypted by using the prestored symmetric key between the user equipment and the cellular network authentication network element, and the first encrypted identifier is a message authentication code MAC of the first authentication message.

In another optional solution, the second verification identifier is the nonce of the cellular network authentication network element, and the second encrypted identifier is a signature affixed to the information other than the second encrypted identifier in the first response message by using a private key of the cellular network authentication network element.

In another optional solution, the first authentication message includes an aggregation indicator used to represent whether to perform an aggregation operation based on the first encrypted identifier, and the relay node 40 further includes:

a determining unit, configured to determine, based on the aggregation indicator, whether the aggregation operation needs to be performed on the first encrypted identifier; where the first aggregation unit 402 is specifically configured to generate, by the first aggregation unit if a determining result of the determining unit is yes, the first encrypted information by using the aggregation algorithm based on the first encrypted identifiers in the first authentication messages sent by the plurality of user equipments;

a fourth sending unit, configured to relay the first authentication message to the cellular network authentication network element if a determining result of the determining unit is no;

a fourth receiving unit, configured to receive a second response message sent by the cellular network authentication network element, where the second response message is generated by the cellular network authentication network element when the cellular network authentication network element verifies, by using the first encrypted identifier, that the information in the first authentication message is correct, the second response message includes a fourth encrypted identifier, the second verification identifier, and the first verification identifier of the user equipment, and the fourth encrypted identifier is an encrypted sequence of information other than the fourth encrypted identifier in the second response message; and a fifth sending unit, configured to relay the second response message to the user equipment, where the first verification identifier in the second response message is used by the user equipment to verify whether the identity of the cellular network authentication network element is secure, and the user equipment relays the second verification identifier in the first response message to the cellular network authentication network element, so that the cellular network authentication network element verifies whether the identity of the user equipment is secure.

In another optional solution, the relay node 40 further includes:

a fifth receiving unit, configured to receive a second authentication message sent by the user equipment, where the second authentication message is generated by the user equipment after the user equipment determines that the second response message includes the first verification identifier of the user equipment and verifies, based on the second encrypted identifier, that the information in the second response message is correct, the second authentication message includes the second verification identifier and a third encrypted identifier, and the third encrypted identifier is an encrypted sequence of information other than the third encrypted identifier in the second authentication message; and a sixth sending unit, configured to relay the second authentication message to the cellular network authentication network element, where the second verification identifier in the second authentication message is used by the cellular network authentication network element to verify whether the identities of the plurality of user equipments are secure.

In another optional solution, the relay node 40 further includes:

a sixth receiving unit, configured to receive a verification failure message sent by the cellular network authentication network element when the cellular network authentication network element verifies that the information in the first aggregation message is incorrect;

a seventh sending unit, configured to separately relay, to the cellular authentication network element based on the verification failure message, the first authentication messages sent by the plurality of user equipments, so that the cellular network authentication network element separately verifies each user equipment in the plurality of user equipments.

In another optional solution, the relay node 40 further includes:

a seventh receiving unit, configured to receive a verification failure message sent by the cellular network authentication network element when the cellular network authentication network element verifies that the information in the first aggregation message is incorrect;

a third aggregation unit, configured to generate fourth encrypted information by using the aggregation algorithm based on the verification failure message and based on the third encrypted identifiers in a part of the first authentication messages sent by the plurality of user equipments; and an eighth sending unit, configured to send a third aggregation message to the cellular network authentication network element, where the third aggregation message includes the fourth encrypted information and the first verification identifiers in the part of the first authentication messages.

Figure 3R:
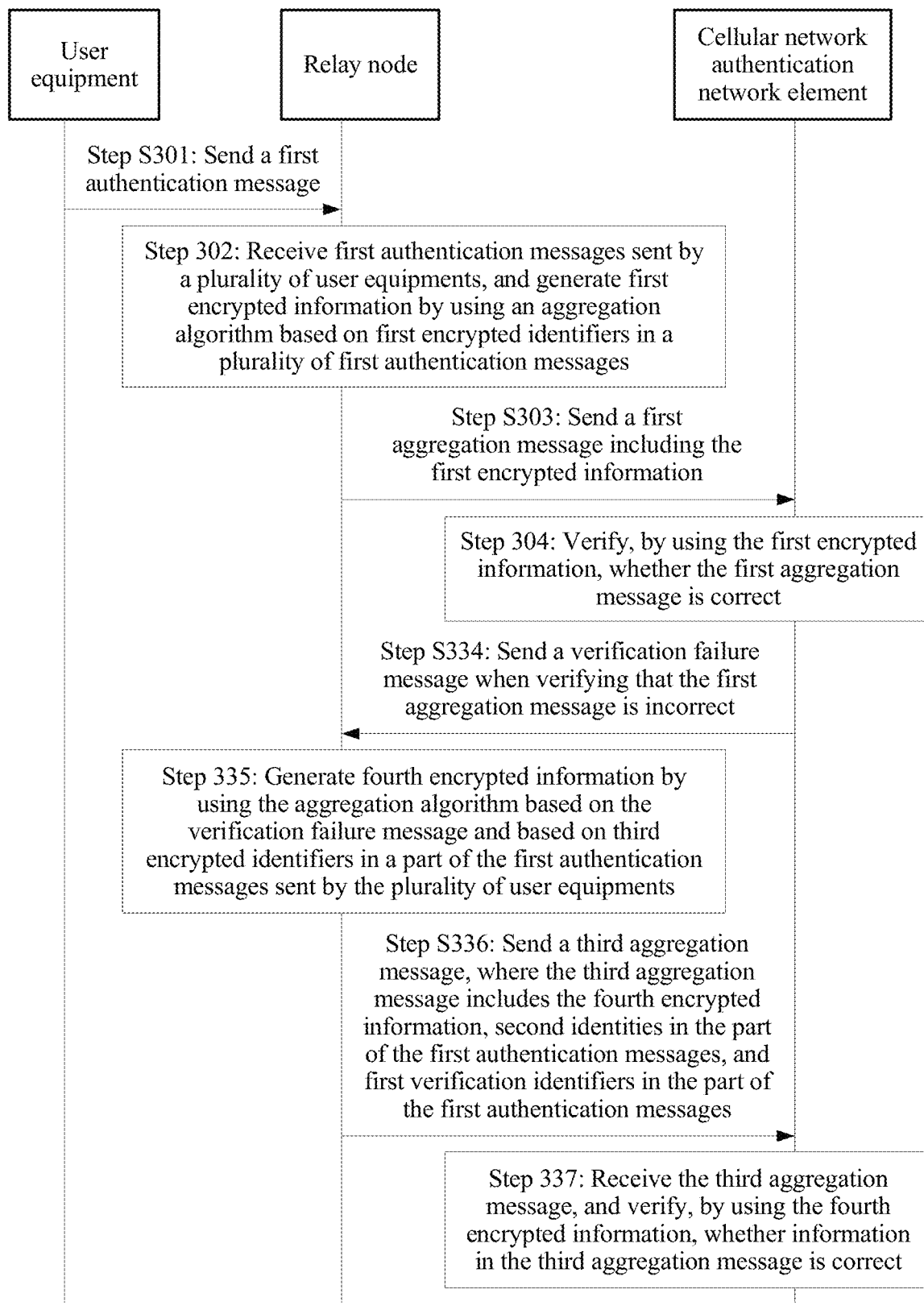
FIG. 3R is a schematic flowchart of another network authentication method according to an embodiment of the present disclosure.

It should be noted that, for a specific implementation of the relay node shown in FIG. 4, reference may be correspondingly made to specific descriptions of the embodiments of the manners shown in FIG. 3A-1 to FIG. 3R.

In the relay node 40 described in FIG. 4, the user equipment sends the first authentication message required for network authentication to the relay node first; the relay node performs an aggregation budget on the signatures or the message authentication codes in the first authentication messages sent by the plurality of user equipments, to obtain the aggregated signature or the aggregated authentication code; and the relay node sends, to the cellular network authentication network element in a unified manner, the information in the first authentication messages sent by the plurality of users other than the signatures and the authentication codes. For the messages sent in the unified manner, message correctness is ensured based on the aggregated signature and the aggregated authentication code. Correspondingly, the cellular network synchronously authenticates the plurality of user equipments based on the received information. Therefore, data overheads in the authentication process are reduced.

Figure 5:
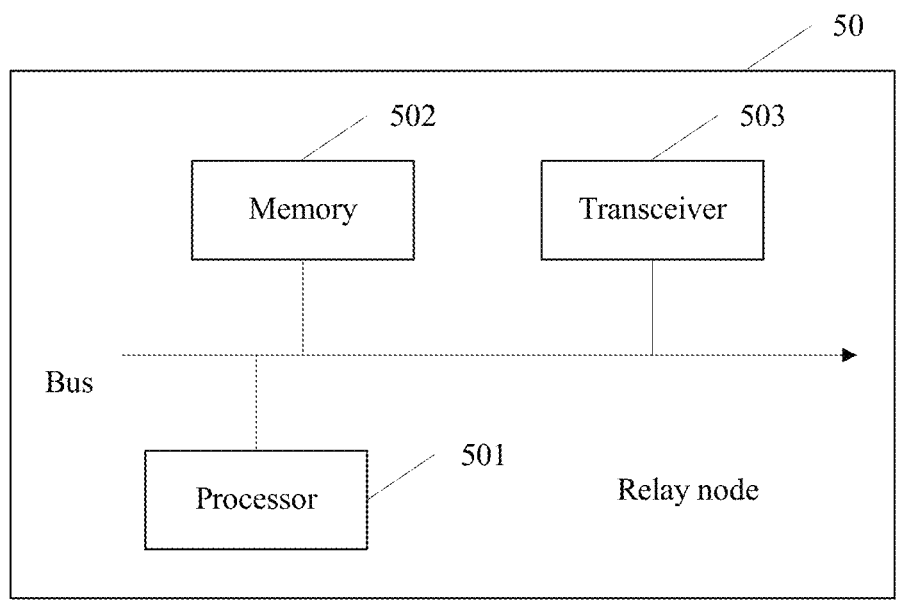
FIG. 5 is a schematic structural diagram of another relay node according to an embodiment of the present disclosure.

FIG. 5 shows another relay node 50 according to an embodiment of the present disclosure. The relay node 50 includes a processor 501, a memory 502, and a transceiver 503. The processor 501, the memory 502, and the transceiver 503 are interconnected by a bus.

The memory 502 includes but is not limited to a random access memory (RAM), a read-only memory (ROM), an erasable programmable read-only memory (an EPROM or a flash memory), or a portable read-only memory (CD-ROM). The memory 502 is configured to store a related instruction and data.

The transceiver 503 is configured to receive and send data.

The processor 501 may be one or more central processing units (CPU). When the processor 501 is a CPU, the CPU may be a single-core CPU, or may be a multi-core CPU.

The processor 501 in the relay node 50 is configured to read program code stored in the memory 502 to perform the following operations:

the processor 501 receives, by using the transceiver 503, a first authentication message sent by each user equipment in a plurality of user equipments, where the first authentication message sent by each user equipment includes a first verification identifier of the user equipment and a first encrypted identifier, the first verification identifier is used by a cellular network authentication network element to verify an identity of the user equipment, and the first encrypted identifier is an encrypted sequence of information other than the first encrypted identifier in the first authentication message;

the processor 501 generates first encrypted information by using an aggregation algorithm based on the first encrypted identifiers in the first authentication messages sent by the plurality of user equipments;

the processor 501 sends, by using the transceiver 503, a first aggregation message to the cellular network authentication network element, where the first aggregation message includes the first encrypted information and the first verification identifiers in the first authentication messages sent by the plurality of user equipments;

the processor 501 receives, by using the transceiver 503, a first response message sent by the cellular network authentication network element, where the first response message is generated by the cellular network authentication network element after the cellular network authentication network element verifies, based on the first encrypted message, that information in the first aggregation message is correct, the first response message includes a second verification identifier of the cellular network authentication network element, a second encrypted identifier, and the first verification identifiers in the first authentication messages sent by the plurality of user equipments, and the second encrypted identifier is an encrypted sequence of information other than the second verification identifier in the first response message; and the processor 501 relays, by using the transceiver 503, the first response message to the user equipment, where the first verification identifier in the first response message is used by the user equipment to verify whether an identity of the cellular network authentication network element is secure, and the user equipment relays the second verification identifier in the first response message to the cellular network authentication network element, so that the cellular network authentication network element verifies whether an identity of the user equipment is secure.

By performing the foregoing operations, the user equipment sends the first authentication message required for network authentication to the relay node first; the relay node performs an aggregation budget on the signatures or the message authentication codes in the first authentication messages sent by the plurality of user equipments, to obtain the aggregated signature or the aggregated authentication code; and the relay node sends, to the cellular network authentication network element in a unified manner, the information in the first authentication messages sent by the plurality of users other than the signatures and the authentication codes. For the messages sent in the unified manner, message correctness is ensured based on the aggregated signature and the aggregated authentication code. Correspondingly, the cellular network synchronously authenticates the plurality of user equipments based on the received information. Therefore, data overheads in the authentication process are reduced.

In an optional solution, after the processor 501 relays, by using the transceiver 503, the first response message to the user equipment, the processor 501 is further configured to:

receive, by using the transceiver 503, second authentication messages sent by the plurality of user equipments, where the second authentication message is generated by the user equipment after the user equipment determines that the first response message includes the first verification identifier of the user equipment and verifies, based on the second encrypted identifier, that the information in the first response message is correct, the second authentication message includes the second verification identifier and a third encrypted identifier, and the third encrypted identifier is an encrypted sequence of information other than the third encrypted identifier in the second authentication message;

generate third encrypted information by using the aggregation algorithm based on the third encrypted identifiers in the second authentication messages sent by the plurality of user equipments; and send, by using the transceiver 503, a second aggregation message to the cellular network authentication network element, where the second aggregation message includes the third encrypted information and the second verification identifier that is carried in the second authentication message, and the second verification identifier in the second aggregation message is used by the cellular network authentication network element to verify whether identities of the plurality of user equipments are secure.

In another optional solution, the first response message includes a first identity of the cellular network authentication network element, and the second verification identifier in the second authentication message is encrypted by using the first identity of the cellular network authentication network element.

In another optional solution, the second verification identifier in the second authentication message is encrypted by using a symmetric key between the cellular network authentication network element and the user equipment.

In another optional solution, the first verification identifier is a DH public key of the user equipment, and the first encrypted identifier is a signature affixed to the information other than the first encrypted identifier in the first authentication message by using a private key of the user equipment.

In another optional solution, the second verification identifier is a DH public key of the cellular network authentication network element, and the second encrypted identifier is a signature affixed to the information other than the second encrypted identifier in the first response message by using a private key of the cellular network authentication network element.

In another optional solution, the first verification identifier is a fresh parameter nonce of the user equipment, and the first encrypted identifier is a signature affixed to the information other than the first encrypted identifier in the first authentication message by using a private key of the user equipment.

In another optional solution, the second verification identifier is a fresh parameter nonce of the cellular network authentication network element, and the second encrypted identifier is a signature affixed to the information other than the second encrypted identifier in the first response message by using a private key of the cellular network authentication network element.

In another optional solution, the first verification identifier is a fresh parameter nonce of the user equipment, the first aggregation message includes a second identity of each user equipment in the plurality of user equipments, and the first authentication message includes the first identity of the cellular network authentication network element; and that the processor 501 sends, by using the transceiver 503, a second aggregation message to the cellular network authentication network element is specifically:

the processor 501 sends, by using the transceiver 503 based on the first identity in the first authentication message, the first aggregation message to the cellular network authentication network element corresponding to the first identity; where the first verification identifier in the first authentication message is encrypted by using the first identity of the cellular network authentication network element, the first verification identifier in the first response message is encrypted by using the second identity of the user equipment, and the first encrypted identifier is a signature affixed to the information other than the first encrypted identifier in the first authentication message by using a private key of the user equipment.

In another optional solution, the second verification identifier is the nonce of the cellular network authentication network element, and the second encrypted identifier is a signature affixed to the information other than the second encrypted identifier in the first response message by using a private key of the cellular network authentication network element.

In another optional solution, the first verification identifier is a nonce of the user equipment, and the first authentication message includes the first identity of the cellular network authentication network element; and that the processor 501 sends, by using the transceiver 503, a second aggregation message to the cellular network authentication network element is specifically:

the processor 501 sends, by using the transceiver 503 based on the first identity in the first verification message, the first aggregation message to the cellular network authentication network element corresponding to the first identity; where the first verification identifier in the first authentication message is encrypted by using a prestored symmetric key between the user equipment and the cellular network authentication network element, the first verification identifier in the first response message is encrypted by using the prestored symmetric key between the user equipment and the cellular network authentication network element, and the first encrypted identifier is a signature affixed to the information other than the first encrypted identifier in the first authentication message by using a private key of the user equipment.

In another optional solution, the second verification identifier is the nonce of the cellular network authentication network element, and the second encrypted identifier is a signature affixed to the information other than the second encrypted identifier in the first response message by using a private key of the cellular network authentication network element.

In another optional solution, the first verification identifier is a fresh parameter nonce of the user equipment, and the first authentication message includes the first identity of the cellular network authentication network element; and that the processor 501 sends, by using the transceiver 503, a second aggregation message to the cellular network authentication network element is specifically:

the processor 501 sends, by using the transceiver 503 based on the first identity in the first authentication message, the first aggregation message to the cellular network authentication network element corresponding to the first identity; where the first verification identifier in the first authentication message is encrypted by using a prestored symmetric key between the user equipment and the cellular network authentication network element, the first verification identifier in the first response message is encrypted by using the prestored symmetric key between the user equipment and the cellular network authentication network element, and the first encrypted identifier is a message authentication code MAC of the first authentication message.

In another optional solution, the second verification identifier is the nonce of the cellular network authentication network element, and the second encrypted identifier is a signature affixed to the information other than the second encrypted identifier in the first response message by using a private key of the cellular network authentication network element.

In another optional solution, the first authentication message includes an aggregation indicator used to represent whether to perform an aggregation operation based on the first encrypted identifier, and the processor 501 is further configured to:

determine, based on the aggregation indicator, whether the aggregation operation needs to be performed on the first encrypted identifier; and if a determining result is yes, perform the operation of generating the first encrypted information by using the aggregation algorithm based on the first encrypted identifiers in the first authentication messages sent by the plurality of user equipments; or if a determining result is no, relay, by using the transceiver 503, the first authentication message to the cellular network authentication network element;

receive, by the processor 501 by using the transceiver 503, a second response message sent by the cellular network authentication network element, where the second response message is generated by the cellular network authentication network element when the cellular network authentication network element verifies, by using the first encrypted identifier, that the information in the first authentication message is correct, the second response message includes a fourth encrypted identifier, the second verification identifier, and the first verification identifier of the user equipment, and the fourth encrypted identifier is an encrypted sequence of information other than the fourth encrypted identifier in the second response message; and relay, by the processor 501 by using the transceiver 503, the second response message to the user equipment, where the first verification identifier in the second response message is used by the user equipment to verify whether an identity of the cellular network authentication network element is secure, and the user equipment relays the second verification identifier in the first response message to the cellular network authentication network element, so that the cellular network authentication network element verifies whether an identity of the user equipment is secure.

In another optional solution, after the processor 501 relays, by using the transceiver 503, the second response message to the user equipment, the processor 501 is further configured to:

receive, by using the transceiver 503, a second authentication message sent by the user equipment, where the second authentication message is generated by the user equipment after the user equipment determines that the second response message includes the first verification identifier of the user equipment and verifies, based on the second encrypted identifier, that the information in the second response message is correct, the second authentication message includes the second verification identifier and a third encrypted identifier, and the third encrypted identifier is an encrypted sequence of information other than the third encrypted identifier in the second authentication message; and relay, by using the transceiver 503, the second authentication message to the cellular network authentication network element, where the second verification identifier in the second authentication message is used by the cellular network authentication network element to verify whether the identities of the plurality of user equipments are secure.

In another optional solution, the processor 501 is further configured to:

receive, by using the transceiver 503, a verification failure message sent by the cellular network authentication network element when the cellular network authentication network element verifies that the information in the first aggregation message is incorrect; and separately relay, by using the transceiver 503 to the cellular authentication network element based on the verification failure message, the first authentication messages sent by the plurality of user equipments, so that the cellular network authentication network element separately verifies each user equipment in the plurality of user equipments.

In another optional solution, the processor 501 is further configured to:

receive, by using the transceiver 503, a verification failure message sent by the cellular network authentication network element when the cellular network authentication network element verifies that the information in the first aggregation message is incorrect;

generate fourth encrypted information by using the aggregation algorithm based on the verification failure message and based on the third encrypted identifiers in a part of the first authentication messages sent by the plurality of user equipments; and send, by using the transceiver 503, a third aggregation message to the cellular network authentication network element, where the third aggregation message includes the fourth encrypted information and the first verification identifiers in the part of the first authentication messages.

It should be noted that, for the relay node 50 shown in FIG. 5, reference may be made to corresponding descriptions of the method embodiments shown in FIG. 3A-1 to FIG. 3R.

In the relay node 50 described in FIG. 5, the user equipment sends the first authentication message required for network authentication to the relay node first; the relay node performs an aggregation budget on the signatures or the message authentication codes in the first authentication messages sent by the plurality of user equipments, to obtain the aggregated signature or the aggregated authentication code; and the relay node sends, to the cellular network authentication network element in a unified manner, the information in the first authentication messages sent by the plurality of users other than the signatures and the authentication codes. For the messages sent in the unified manner, message correctness is ensured based on the aggregated signature and the aggregated authentication code. Correspondingly, the cellular network synchronously authenticates the plurality of user equipments based on the received information. Therefore, data overheads in the authentication process are reduced.

In conclusion, in the embodiments of the present disclosure, the user equipment sends the first authentication message required for network authentication to the relay node first; the relay node performs an aggregation budget on the signatures or the message authentication codes in the first authentication messages sent by the plurality of user equipments, to obtain the aggregated signature or the aggregated authentication code; and the relay node sends, to the cellular network authentication network element in a unified manner, the information in the first authentication messages sent by the plurality of users other than the signatures and the authentication codes. For the messages sent in the unified manner, message correctness is ensured based on the aggregated signature and the aggregated authentication code. Correspondingly, the cellular network synchronously authenticates the plurality of user equipments based on the received information. Therefore, data overheads in the authentication process are reduced.

A person of ordinary skill in the art may understand that all or some of the processes of the methods in the embodiments may be implemented by a computer program instructing relevant hardware. The program may be stored in a computer readable storage medium. When the program runs, the processes of the methods in the embodiments are performed. The foregoing storage medium includes: any medium that can store program code, such as a ROM, a RAM, a magnetic disk, or an optical disc.

What is claimed is:

1. A network authentication system, comprising:

user equipment configured to send a first authentication message comprising a first verification identifier and a first encrypted identifier, wherein the first encrypted identifier is an encrypted sequence of information other than the first encrypted identifier in the first authentication message;

a relay node configured to:

receive the first authentication message sent by the user equipment, and generate first encrypted information by using an aggregation algorithm based on the first encrypted identifier in the first authentication message, and send a first aggregation message comprising the first encrypted information and the first verification identifier in the first authentication message received from the user equipment;

a cellular network authentication network element configured to:

receive the first aggregation message sent by the relay node, and verify, by using the first encrypted information, whether information in the first aggregation message is correct, and send a first response message to the relay node after verifying that the information in the first aggregation message is correct, wherein the first response message comprises a second verification identifier of the cellular network authentication network element, a second encrypted identifier, and the first verification identifier in the first authentication message sent by the user equipment, and the second encrypted identifier is an encrypted sequence of information other than the second verification identifier in the first response message;

wherein the relay node is configured to receive the first response message, and relay the first response message to the user equipment; and wherein the user equipment is further configured to:

receive the first response message relayed by the relay node, verify, by using the second encrypted identifier, whether information in the first response message is correct, verify whether the first response message carries the first verification identifier of the user equipment, and generate a session key between the user equipment and the cellular network authentication network element after verifying that the information in the first response message is correct and carries the first verification identifier of the user equipment.

2. The system according to claim 1, wherein:
the user equipment is further configured to send a second authentication message to the relay node after verifying that the information in the first response message is correct and carries the first verification identifier of the user equipment, wherein the second authentication message comprises the second verification identifier of the cellular network authentication network element and a third encrypted identifier, and the third encrypted identifier is an encrypted sequence of information other than the third encrypted identifier in the second authentication message;
the relay node is configured to:
receive the second authentication message sent by the user equipment, and generate third encrypted information by using the aggregation algorithm based on the third encrypted identifier in the second authentication message, and
send a second aggregation message to the cellular network authentication network element, wherein the second aggregation message comprises the third encrypted information and the second verification identifier that is carried in the second authentication message; and
the cellular network authentication network element is further configured to:
receive the second aggregation message,
verify, by using the third encrypted information, whether information in the second aggregation message is correct,
verify whether the second aggregation message carries the second verification identifier of the cellular network authentication network element; and
generate a session key between the cellular network authentication network element and the user equipment after verifying that the information in the second aggregation message is correct and carries the second verification identifier of the cellular network authentication network element.

3. The system according to claim 2, wherein the first response message comprises a first identity of the cellular network authentication network element, and the second verification identifier in the second authentication message is encrypted by using the first identity of the cellular network authentication network element.

4. The system according to claim 2, wherein the cellular network authentication network element is further configured to generate a symmetric key between the cellular network authentication network element and the user equipment, and the second verification identifier in the second authentication message is encrypted by using the symmetric key between the cellular network authentication network element and the user equipment.

5. The system according to claim 1, wherein:
the first verification identifier is a Diffie-Hellman (DH) public key of the user equipment, and the first encrypted identifier is a signature affixed to information other than the first encrypted identifier in the first authentication message by using a private key of the user equipment; and
to generate the session key between the user equipment and the cellular network authentication network element, the user equipment is configured to:
generate the session key between the user equipment and the cellular network authentication network element based on a random number of the user equipment and the second verification identifier in the first response message.

6. The system according to claim 5, wherein the second verification identifier is a DH public key of the cellular network authentication network element, and the second encrypted identifier is a signature affixed to information other than the second encrypted identifier in the first response message by using a private key of the cellular network authentication network element.

7. The system according to claim 1, wherein:
the first verification identifier is a fresh parameter nonce of the user equipment, and the first encrypted identifier is a signature affixed to information other than the first encrypted identifier in the first authentication message by using a private key of the user equipment; and
to generate the session key between the user equipment and the cellular network authentication network element, the user equipment is configured to:
generate the session key between the user equipment and the cellular network authentication network element based on the private key of the user equipment and the second verification identifier in the first response message.

8. The system according to claim 7, wherein the second verification identifier is a fresh parameter nonce of the cellular network authentication network element, and the second encrypted identifier is a signature affixed to information other than the second encrypted identifier in the first response message by using a private key of the cellular network authentication network element.

9. The system according to claim 1, wherein:
the first verification identifier is a fresh parameter nonce of the user equipment;
the first aggregation message comprises a second identity of the user equipment;
the first authentication message comprises a first identity of the cellular network authentication network element; and
to send the first aggregation message to the cellular network authentication network element, the relay node is configured to:
send, based on the first identity, the first aggregation message to the cellular network authentication network element corresponding to the first identity;
the first verification identifier in the first authentication message is encrypted by using the first identity of the cellular network authentication network element;
the cellular network authentication network element is further configured to decrypt the first verification identifier in the first authentication message by using the first identity of the cellular network authentication network element;
the first verification identifier in the first response message is encrypted by using the second identity of the user equipment;
the user equipment is further configured to decrypt the first verification identifier in the first response message by using the second identity of the user equipment;
the first encrypted identifier is a signature affixed to information other than the first encrypted identifier in the first authentication message by using a private key of the user equipment; and
to generate the session key between the user equipment and the cellular network authentication network element, the user equipment is configured to:

generate the session key between the user equipment and the cellular network authentication network element based on the private key of the user equipment, the first verification identifier of the user equipment, the second verification identifier in the first response message, and the first identity.

10. The system according to claim 9, wherein the second verification identifier is a nonce of the cellular network authentication network element, and the second encrypted identifier is a signature affixed to information other than the second encrypted identifier in the first response message by using a private key of the cellular network authentication network element.

11. The system according to claim 1, wherein:
the first verification identifier is a nonce of the user equipment;
the first authentication message comprises a first identity of the cellular network authentication network element;
to send the first aggregation message to the cellular network authentication network element, the relay node is configured to:
send, based on the first identity, the first aggregation message to the cellular network authentication network element corresponding to the first identity;
the first verification identifier in the first authentication message is encrypted by using a prestored symmetric key between the user equipment and the cellular network authentication network element;
the cellular network authentication network element is configured to decrypt the first verification identifier by using the prestored symmetric key between the user equipment and the cellular network authentication network element;
the first verification identifier in the first response message is encrypted by using the prestored symmetric key between the user equipment and the cellular network authentication network element;
the user equipment is configured to decrypt the first verification identifier by using the prestored symmetric key between the user equipment and the cellular network authentication network element;
the first encrypted identifier is a signature affixed to information other than the first encrypted identifier in the first authentication message by using a private key of the user equipment; and
to generate the session key between the user equipment and the cellular network authentication network element, the user equipment is configured to:
generate the session key between the user equipment and the cellular network authentication network element based on the private key of the user equipment, the first verification identifier of the user equipment, the second verification identifier in the first response message, and the first identity.

12. The system according to claim 11, wherein the second verification identifier is a nonce of the cellular network authentication network element, and the second encrypted identifier is a signature affixed to information other than the second encrypted identifier in the first response message by using a private key of the cellular network authentication network element.

13. The system according to claim 1, wherein:
the first verification identifier is a fresh parameter nonce of the user equipment;
the first authentication message comprises a first identity of the cellular network authentication network element;
to send the first aggregation message to the cellular network authentication network element, the relay node is configured to:
send, based on the first identity, the first aggregation message to the cellular network authentication network element corresponding to the first identity;
the first verification identifier in the first authentication message is encrypted by using a prestored symmetric key between the user equipment and the cellular network authentication network element;
the cellular network authentication network element is configured to decrypt the first verification identifier by using the prestored symmetric key between the user equipment and the cellular network authentication network element;
the first verification identifier in the first response message is encrypted by using the prestored symmetric key between the user equipment and the cellular network authentication network element;
the user equipment is configured to decrypt the first verification identifier by using the prestored symmetric key between the user equipment and the cellular network authentication network element;
the first encrypted identifier is a message authentication code (MAC) of the first authentication message; and
to generate the session key between the user equipment and the cellular network authentication network element, the user equipment is configured to:
generate the session key between the user equipment and the cellular network authentication network element based on a private key of the user equipment, the first verification identifier, the second verification identifier in the first response message, and the first identity.

14. The system according to claim 13, wherein the second verification identifier is a nonce of the cellular network authentication network element, and the second encrypted identifier is a signature affixed to information other than the second encrypted identifier in the first response message by using a private key of the cellular network authentication network element.

15. The system according to claim 1, wherein:
the first authentication message comprises an aggregation indicator used to represent whether to perform an aggregation operation based on the first encrypted identifier;
the relay node is further configured to:
determine, based on the aggregation indicator, whether the aggregation operation needs to be performed on the first encrypted identifier;
when the aggregation operation needs to be performed, perform an operation of generating the first encrypted information by using the aggregation algorithm based on the first encrypted identifier in the first authentication message sent by the user equipment, and
when the aggregation operation does not need to be performed, relay the first authentication message to the cellular network authentication network element;
the cellular network authentication network element is further configured to:
receive the first authentication message, and verify, by using the first encrypted identifier, whether information in the first authentication message is correct,
send a second response message to the relay node after verifying that the information in the first authentication message is correct, wherein the second response message comprises a fourth encrypted identifier, the second verification identifier, and the first verification identifier of the user equipment, and the fourth encrypted identifier is an encrypted sequence of information other than the fourth encrypted identifier in the second response message;

the relay node is further configured to receive the second response message, and relay the second response message to the user equipment; and the user equipment is further configured to:

receive the second response message relayed by the relay node, verify, by using the fourth encrypted identifier, whether information in the second response message is correct, and verify whether the second response message carries the first verification identifier of the user equipment, and generate the session key between the user equipment and the cellular network authentication network element after verifying that the information in the second response message is correct and carries the first verification identifier of the user equipment.

16. A relay node, comprising:

a first receiver, configured to receive a first authentication message sent by user equipment, wherein the first authentication message comprises a first verification identifier of the user equipment and a first encrypted identifier, and the first encrypted identifier is an encrypted sequence of information other than the first encrypted identifier in the first authentication message;

a first aggregation unit, configured to generate first encrypted information by using an aggregation algorithm based on the first encrypted identifier in the first authentication message sent by the user equipment;

a first transmitter, configured to send a first aggregation message to a cellular network authentication network element, wherein the first aggregation message comprises the first encrypted information and the first verification identifier in the first authentication message;

a second receiver, configured to receive a first response message sent by the cellular network authentication network element, wherein the first response message comprises a second verification identifier of the cellular network authentication network element, a second encrypted identifier, and the first verification identifier in the first authentication message, and the second encrypted identifier is an encrypted sequence of information other than the second verification identifier in the first response message, wherein the first response message is received after the first aggregation message is verified to be correct by the cellular network authentication network element using the first encrypted information; and a second transmitter, configured to relay the first response message to the user equipment for verifying whether an identity of the cellular network authentication network element is secure by verifying, using the second encrypted identifier, that information in the first response message is correct and carries the first verification identifier of the user equipment, and for relaying the second verification identifier in the first response message to the cellular network authentication network element to enable the cellular network authentication network element to verify whether an identity of the user equipment is secure.

17. The relay node according to claim 16, wherein:

the first receiver is further configured to receive a second authentication message sent by the user equipment, the second authentication message comprises the second verification identifier and a third encrypted identifier, and the third encrypted identifier is an encrypted sequence of information other than the third encrypted identifier in the second authentication message;

the first aggregation unit is configured to generate third encrypted information by using the aggregation algorithm based on the third encrypted identifier in the second authentication message; and the first transmitter is configured to send a second aggregation message to the cellular network authentication network element, wherein the second aggregation message comprises the third encrypted information and the second verification identifier that is carried in the second authentication message.

18. The relay node according to claim 17, wherein the first response message comprises a first identity of the cellular network authentication network element, and the second verification identifier in the second authentication message is encrypted by using the first identity of the cellular network authentication network element.

19. The relay node according to claim 17, wherein the second verification identifier in the second authentication message is encrypted by using a symmetric key between the cellular network authentication network element and the user equipment.

20. The relay node according to claim 19, wherein the first verification identifier is a Diffie-Hellman (DH) public key of the user equipment, and the first encrypted identifier is a signature affixed to information in the first authentication message other than the first encrypted identifier by using a private key of the user equipment.

* * * * *